United States Patent
Takano

(10) Patent No.: US 10,681,726 B2
(45) Date of Patent: Jun. 9, 2020

(54) METHOD AND APPARATUS FOR NETWORK ALLOCATION VECTOR FREQUENCY BAND SHARING BETWEEN WIRELESS COMMUNICATION OF THE CELLULAR SYSTEM AND OTHER WIRELESS COMMUNICATION

(71) Applicant: Sony Corporation, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 137 days.

(21) Appl. No.: 15/122,849

(22) PCT Filed: Jan. 29, 2015

(86) PCT No.: PCT/JP2015/052584
§ 371 (c)(1),
(2) Date: Aug. 31, 2016

(87) PCT Pub. No.: WO2015/141292
PCT Pub. Date: Sep. 24, 2015

(65) Prior Publication Data
US 2017/0079066 A1 Mar. 16, 2017

(30) Foreign Application Priority Data

Mar. 18, 2014 (JP) ................................ 2014-055143

(51) Int. Cl.
*H04W 74/08* (2009.01)
*H04W 84/12* (2009.01)
(Continued)

(52) U.S. Cl.
CPC ............. *H04W 74/004* (2013.01); *H04L 5/14* (2013.01); *H04W 16/14* (2013.01);
(Continued)

(58) Field of Classification Search
None
See application file for complete search history.

(56) References Cited

U.S. PATENT DOCUMENTS

| 7,336,670 B1* | 2/2008 | Calhoun ................. H04L 63/10 370/252 |
| 2002/0114303 A1* | 8/2002 | Crosbie .................. H04B 7/269 370/338 |

(Continued)

FOREIGN PATENT DOCUMENTS

| EP | 3 119 120 A1 | 1/2017 |
| JP | 2006-94001 A | 4/2006 |

(Continued)

OTHER PUBLICATIONS

International Search Report dated Apr. 7, 2015 in PCT/JP2015/052584 filed Jan. 29, 2015.

(Continued)

*Primary Examiner* — Angel T Brockman
(74) *Attorney, Agent, or Firm* — Xsensus LLP

(57) ABSTRACT

There is provided a device including a control unit configured to control a wireless communication device for performing wireless communication of a cellular system so that the wireless communication device transmits a frame including duration information for setting a network allocation vector (NAV) using a frequency band shared between the wireless communication of the cellular system and wireless communication conforming to a wireless local area network (LAN) standard. The control unit controls a base station of the cellular system so that the wireless communication of the cellular system is performed using the frequency band in a period after the transmission of the frame.

18 Claims, 32 Drawing Sheets

(51) Int. Cl.
  *H04L 5/14* (2006.01)
  *H04W 74/00* (2009.01)
  *H04W 16/14* (2009.01)
  *H04W 72/04* (2009.01)

(52) U.S. Cl.
  CPC ... *H04W 72/0453* (2013.01); *H04W 74/0816* (2013.01); *H04W 84/12* (2013.01)

(56) References Cited

U.S. PATENT DOCUMENTS

| | | | |
|---|---|---|---|
| 2005/0163150 A1* | 7/2005 | Yang | H04W 74/0808 370/445 |
| 2006/0034217 A1* | 2/2006 | Kwon | H04W 40/248 370/328 |
| 2007/0036170 A1* | 2/2007 | Gonikberg | H04W 16/14 370/431 |
| 2011/0134895 A1 | 6/2011 | Sakaguchi et al. | |
| 2013/0070605 A1 | 3/2013 | Ghosh et al. | |
| 2013/0294356 A1* | 11/2013 | Bala | H04W 16/14 370/329 |
| 2013/0315152 A1 | 11/2013 | Ratasuk et al. | |
| 2014/0031054 A1 | 1/2014 | Zou et al. | |
| 2014/0044105 A1 | 2/2014 | Bontu et al. | |
| 2014/0313949 A1 | 10/2014 | Lilleberg et al. | |
| 2015/0341962 A1 | 11/2015 | Zou et al. | |
| 2016/0066322 A1 | 3/2016 | Bontu et al. | |

FOREIGN PATENT DOCUMENTS

| | | |
|---|---|---|
| JP | 2010-178228 A | 8/2010 |
| JP | 2011-120064 A | 6/2011 |
| JP | 20140049931 A | 3/2014 |
| WO | WO 2013/013409 A1 | 1/2013 |

OTHER PUBLICATIONS

Qualcomm, Ericsson: "Introducing LTE in Unlicensed Spectrum", 3GPP RAN #62, RP-131635, Dec. 3-7, 2013 (8 pages).
ETRI: "Unicast, groupcast/broadcast, and relay for public safety D2D communications", 3GPP TSG-RAN1 Meeting #74, R1-133181, Aug. 19-23, 2013 (3 pages).
Extended European Search Report dated Oct. 20, 2017 in corresponding European Patent Application No. 15765457.5, 11 pages.
Office Action issued in European Application 15 765 457.5-1214 dated Jun. 16, 2019.
Japanese Office Action issued in corresponding JP Application No. 2016-508574, dated Oct. 30, 2018, 4 pages.
Jarkko Kneckt (Nokia Corporation), Resolutions to static RTS CTS comments, IEEE 802. 11-11/0383r1, dated Mar. 16, 2011 (25 pages).

* cited by examiner

FIG. 21
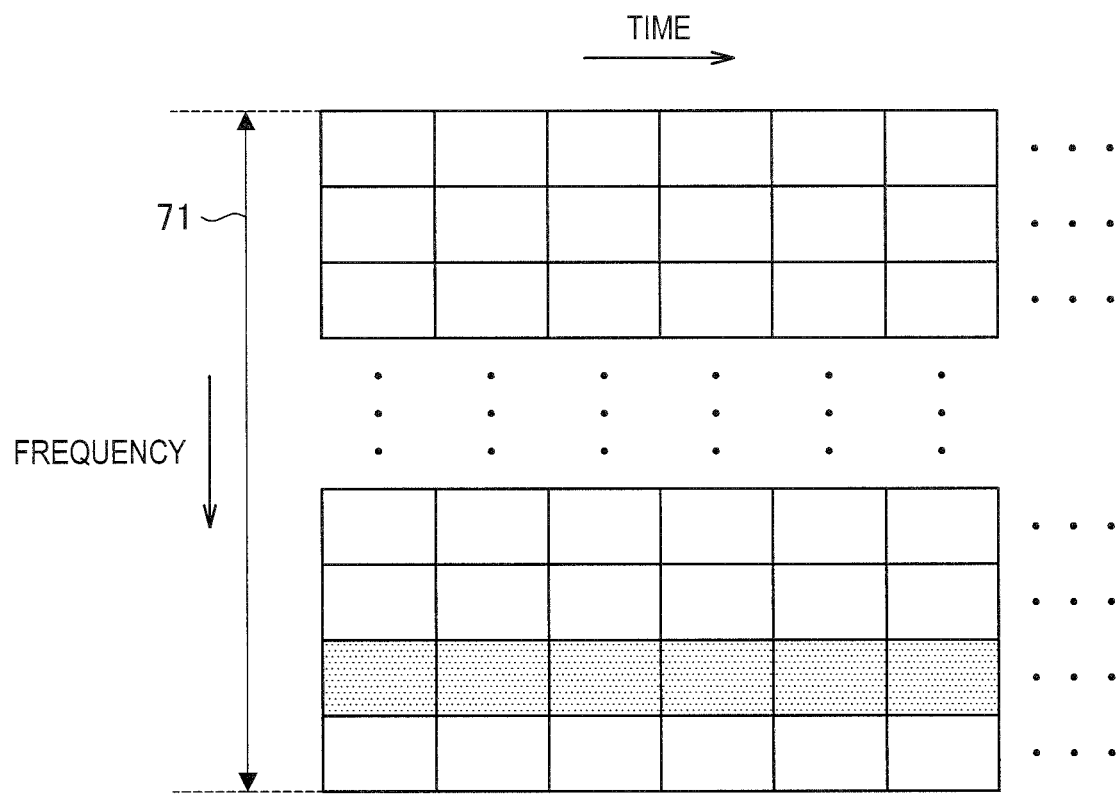
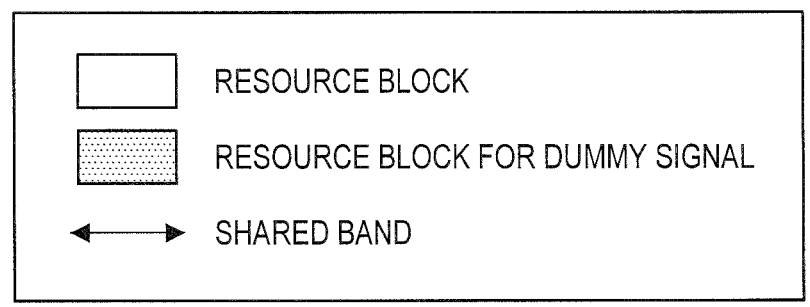

FIG. 22
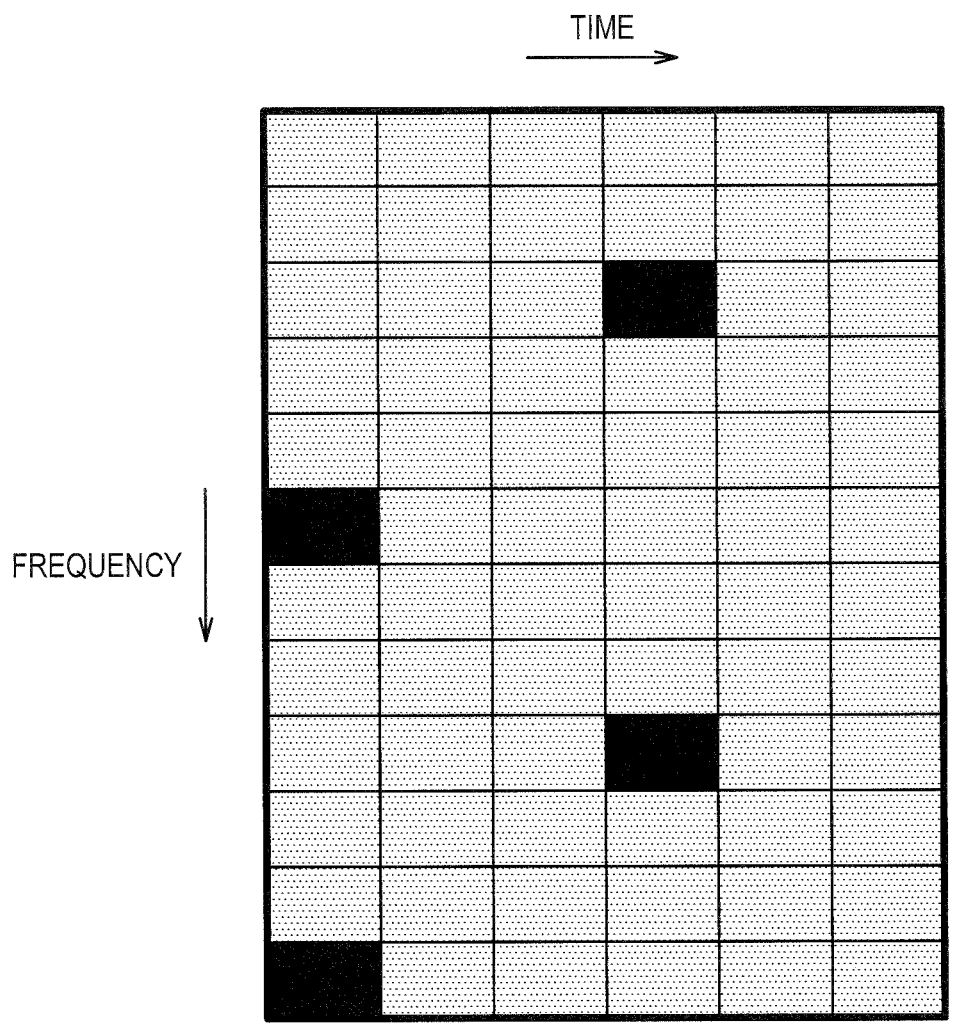
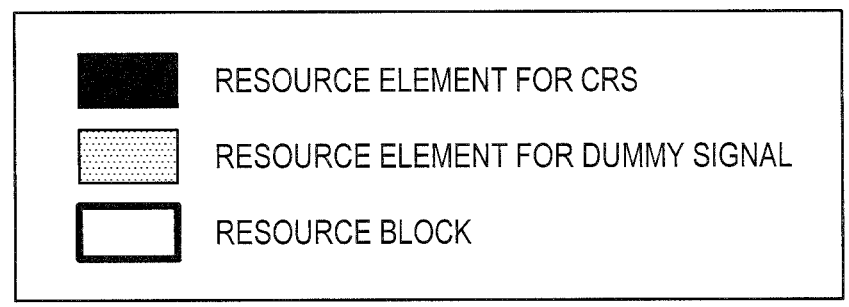

FIG. 23
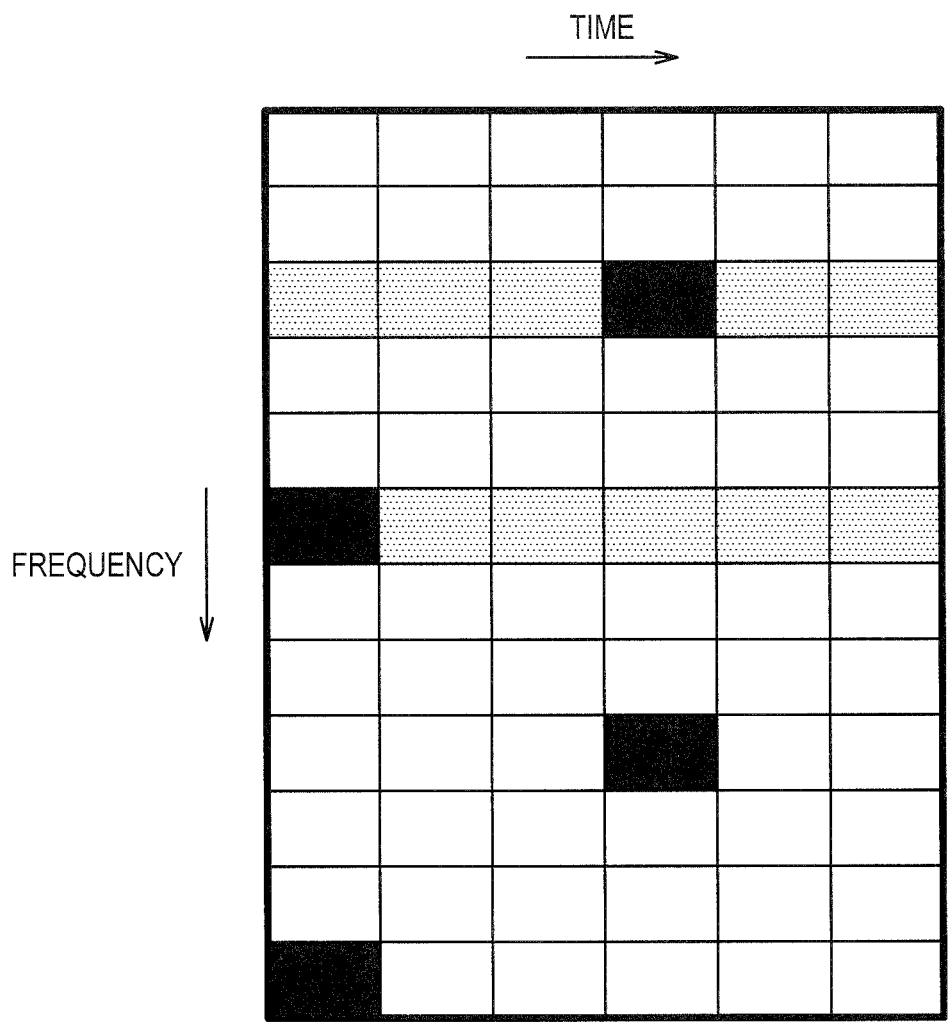
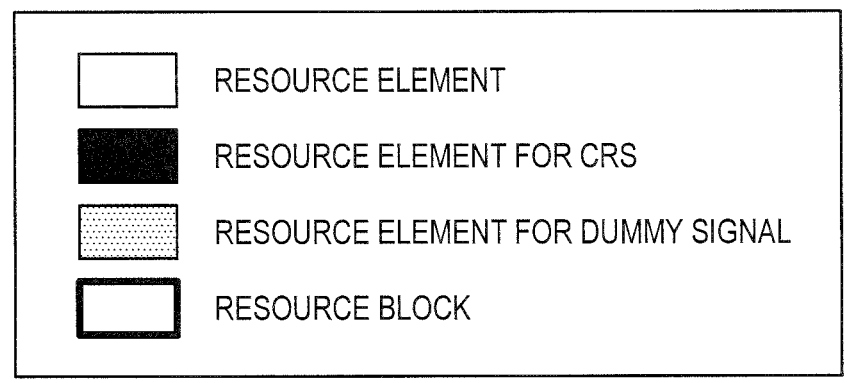

FIG. 24
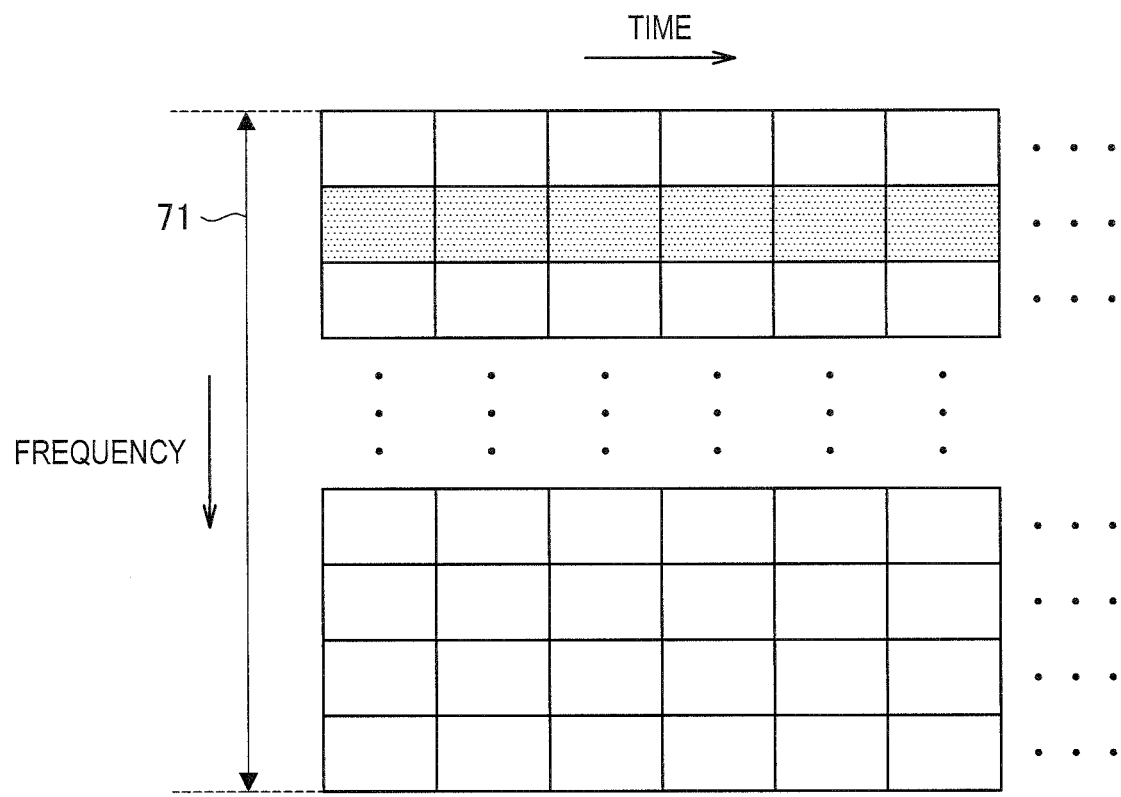
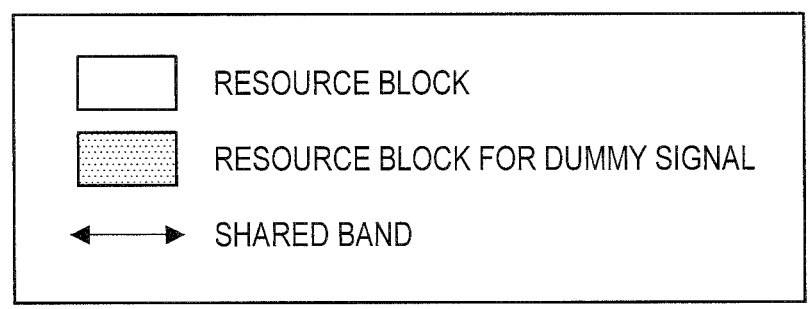

FIG. 25
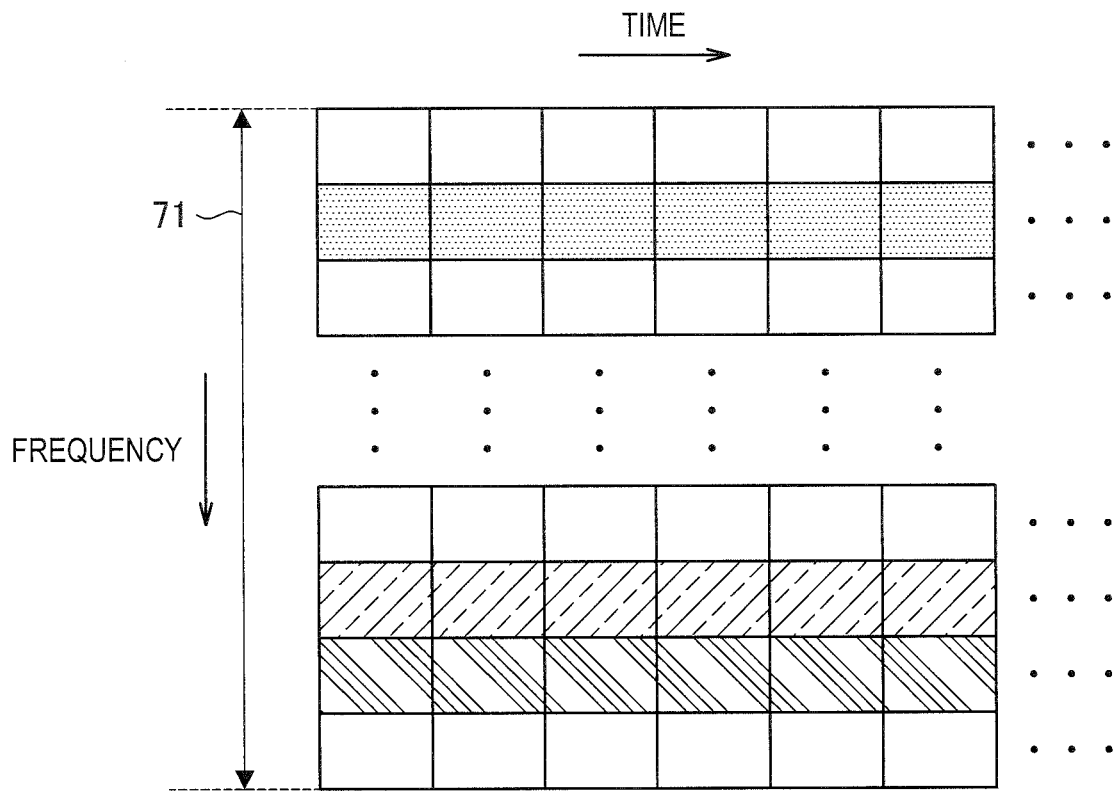
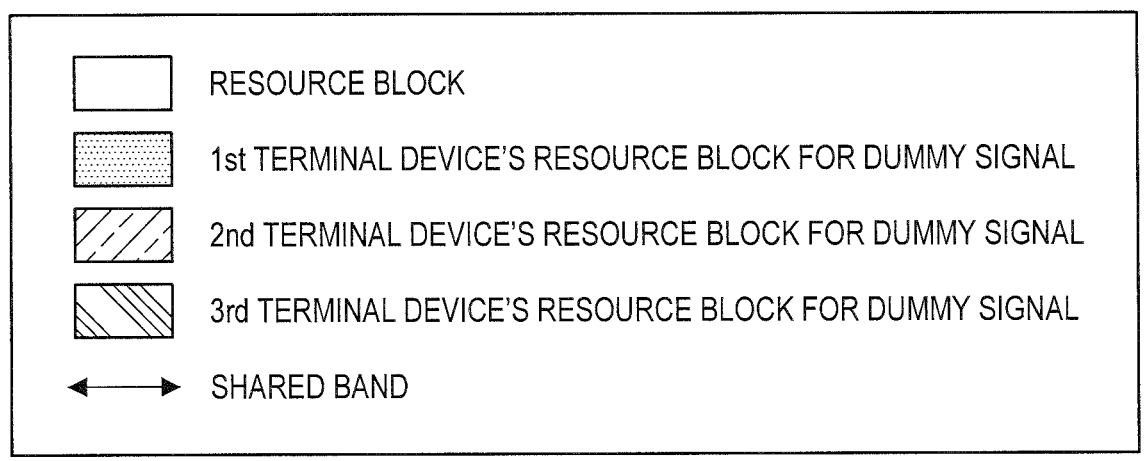

METHOD AND APPARATUS FOR NETWORK ALLOCATION VECTOR FREQUENCY BAND SHARING BETWEEN WIRELESS COMMUNICATION OF THE CELLULAR SYSTEM AND OTHER WIRELESS COMMUNICATION

TECHNICAL FIELD

The present disclosure relates to a device.

BACKGROUND ART

In the 3$^{rd}$ Generation Partnership Project (3GPP), various technologies for improving system throughput have been discussed. It may be said that a first shortcut for improving the system throughput is increasing a frequency to be used. In the 3GPP, the technology of carrier aggregation (CA) has been considered in Release 10 and Release 11. CA is a technology for improving the system throughput and a maximum data rate by aggregating component carriers (CCs) having a bandwidth of 20 MHz for use. A frequency band available as a CC must adopt the technology of such CA. Thus, a frequency band available for wireless communication of a cellular system is required.

For example, in Patent Literature 1, technology which enables a registered frequency band available for a registered provider and an unlicensed band available when a predetermined condition is satisfied to be used in addition to a dedicated frequency band allocated to each provider for exclusive use is disclosed.

CITATION LIST

Patent Literature

Patent Literature 1: JP 2006-094001A

SUMMARY OF INVENTION

Technical Problem

However, for example, when a frequency band to be used in other wireless communication (for example, wireless communication of a wireless local area network (LAN)) is also used in wireless communication of a cellular system, a variety of undesired results can be caused. That is, when a frequency band is shared between wireless communication of the cellular system and other wireless communication, a variety of undesired results can be caused.

As an example, when the above-mentioned frequency band is used in the above-mentioned cellular system, interference between the wireless communication of the above-mentioned cellular system and the other wireless communication (for example, wireless communication of the wireless LAN) is likely to occur in the above-mentioned frequency band. Thus, communication quality of the wireless communication of the above-mentioned cellular system and/or the above-mentioned other wireless communication can deteriorate.

Therefore, it is desirable to provide a mechanism which enables a frequency band shared between wireless communication of a cellular system and other wireless communication to be more appropriately used in the cellular system.

Solution to Problem

According to the present disclosure, there is provided a device including: a control unit configured to control a wireless communication device for performing wireless communication of a cellular system so that the wireless communication device transmits a frame including duration information for setting a network allocation vector (NAV) using a frequency band shared between the wireless communication of the cellular system and wireless communication conforming to a wireless local area network (LAN) standard. The control unit controls a base station of the cellular system so that the wireless communication of the cellular system is performed using the frequency band in a period after the transmission of the frame.

Also, according to the present disclosure, there is provided a device including: a control unit configured to control a terminal device for performing wireless communication of a cellular system so that the terminal device transmits a frame including duration information for setting an NAV using a frequency band shared between the wireless communication of the cellular system and wireless communication conforming to a wireless LAN standard according to an instruction from a base station of the cellular system.

Also, according to the present disclosure, there is provided a device including: a control unit configured to control a wireless communication device for performing wireless communication of a cellular system so that the wireless communication device transmits a frame including duration information for setting an NAV using a frequency band shared between the wireless communication of the cellular system and wireless communication conforming to a wireless LAN standard. The control unit controls a terminal device for performing wireless communication of the cellular system so that the wireless communication of the cellular system is performed using the frequency band in a period after the transmission of the frame.

Also, according to the present disclosure, there is provided a device including: a control unit configured to control a wireless communication device for performing wireless communication of a cellular system so that the wireless communication device transmits a signal using a frequency band shared between the wireless communication of the cellular system and other wireless communication at any time.

Advantageous Effects of Invention

According to the above-described present disclosure, a frequency band shared between wireless communication of a cellular system and other wireless communication can be more appropriately used in the cellular system. Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 21 is an explanatory diagram illustrating an example of some resource blocks (RBs) in which a dummy signal is transmitted.

FIG. 22 is an explanatory diagram illustrating an example of a resource element (RE) in which a dummy signal is transmitted among some RBs.

FIG. 23 is an explanatory diagram illustrating an example of some REs in which a dummy signal is transmitted in each RB.

FIG. 24 is an explanatory diagram illustrating a first example of radio resources in which dummy signals are transmitted by a plurality of terminal devices.

FIG. 25 is an explanatory diagram illustrating a second example of radio resources in which dummy signals are transmitted by a plurality of terminal devices.

DESCRIPTION OF EMBODIMENT(S)

Figure 1:
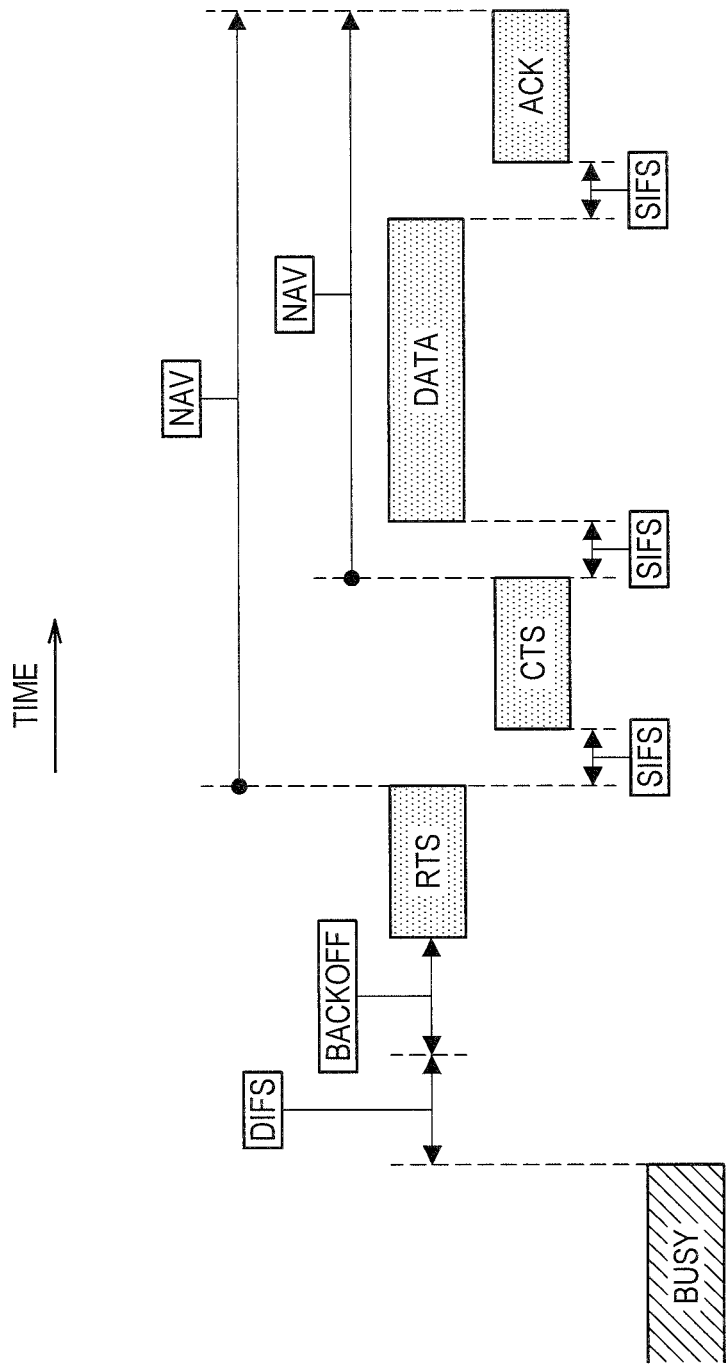
FIG. 1 is an explanatory diagram illustrating a frame format of Institute of Electrical and Electronics Engineers (IEEE) 802.11.

Hereinafter, preferred embodiments of the present disclosure will be described in detail and with reference to the attached drawings. Note that, in this specification and the appended drawings, structural elements that have substantially the same function and structure are denoted with the same reference numerals, and repeated explanation of these structural elements is omitted.

Also, in the present description and drawings, a plurality of elements having substantially the same functional configuration may be distinguished from each other by each of the elements having a different alphabetical letter added to the end of the same reference numeral. For example, a plurality of elements having substantially the same functional configuration may be distinguished from each other as necessary, such as terminal devices 200A, 200B, and 200C. However, if it is not particularly necessary to distinguish each of a plurality of structural elements having substantially the same functional configuration, only the same reference numeral is assigned. For example, if it is not particularly necessary to distinguish between the terminal devices 200A, 200B, and 200C, they are simply referred to as the terminal device 200.

Also, the description will be given in the following order.
1. Introduction
2. Schematic configuration of system
3. First Embodiment
3.1. Summary
3.2. Configuration of base station
3.3. Configuration of terminal device
3.4. Flow of process
3.5. First modified example
3.6. Second modified example
3.7 Third modified example
4. Second Embodiment
4.1. Summary
4.2. Configuration of base station
4.3. Flow of process
5. Third Embodiment
5.1. Summary
5.2. Configuration of base station
5.3. Configuration of terminal device
5.4. Flow of process
5.5. Modified example
6. Application example
6.1. Application example related to base station
6.2. Application example related to terminal device
7. Conclusion

1. INTRODUCTION

Figure 2:
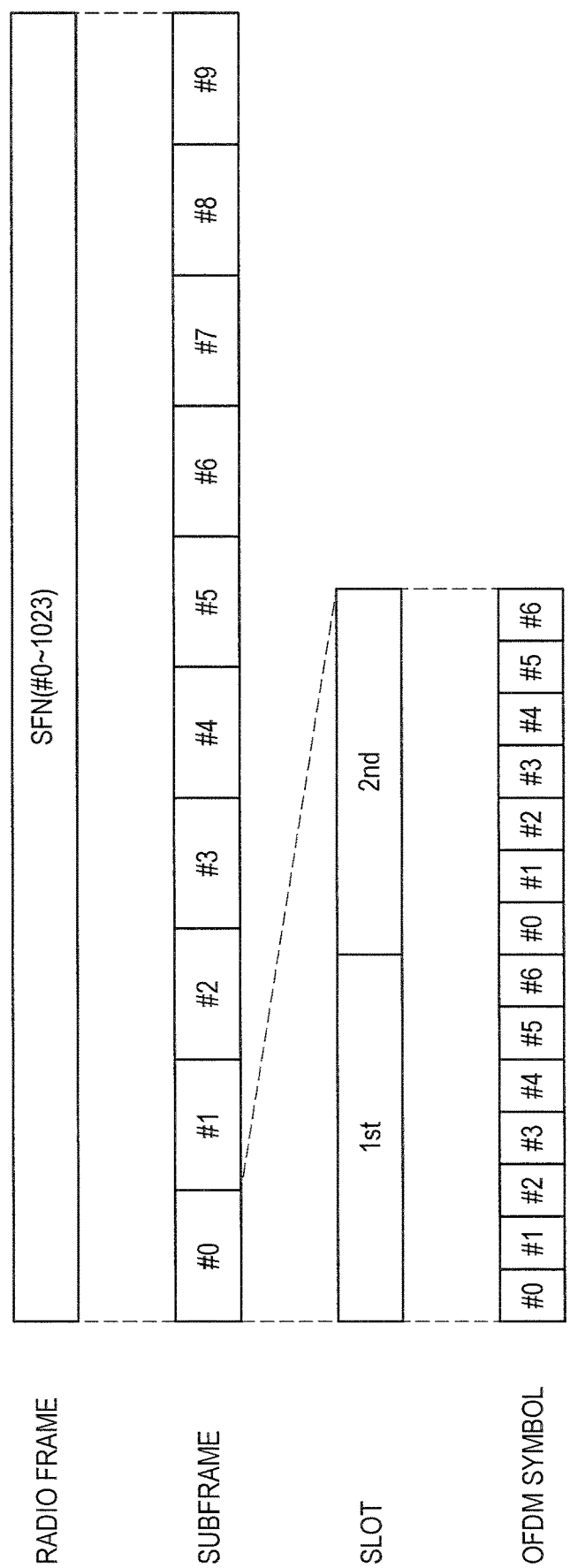
FIG. 2 is an explanatory diagram illustrating a frame format of long-term evolution (LTE).

First, sharing of a frequency band, technology of wireless communication conforming to a wireless local area network (LAN) standard, and technology of wireless communication of a cellular system will be described with reference to FIGS. 1 and 2.

(Sharing of Frequency Band)

A frequency band available for the wireless communication of the cellular system is required. For example, a band of 5 GHz is considered as a frequency band for use in wireless communication of the cellular system (hereinafter referred to as "cellular communication").

However, the band of 5 GHz is used in wireless communication conforming to the wireless LAN standard (hereinafter referred to as "wireless LAN communication"). Thus, when the cellular system uses the band of 5 GHz, for example, the band of 5 GHz is shared between cellular communication and wireless LAN communication. Specifically, for example, a frequency band of 5 GHz (for example, a channel of a wireless LAN) is used in the wireless LAN communication at a certain time and used in the cellular communication at another time. Thereby, frequency utilization efficiency of the band of 5 GHz is improved. Also, the wireless LAN standard includes Institute of Electrical and Electronics Engineers (IEEE) 802.11a, 11b, 11g, 11n, 11ac, and 11ad, etc. and these standards are characterized in that IEEE 802.11 is adopted for a media access control (MAC) layer.

Devices for performing wireless LAN communication are already widespread in the world. Thus, from the viewpoint of backward compatibility, a mechanism for sharing a frequency band between cellular communication and wireless LAN communication without changing an operation of the device for performing the wireless LAN communication is considered as the technology of Long Term Evolution (LTE) and is desired to be defined as a new standard of LTE. Also, a terminal device conforming to the above-mentioned new standard uses the shared frequency band, but a terminal device which does not conform to the above-mentioned new standard is considered as a terminal device not using the shared frequency band.

In LTE, LTE-Advanced, or a cellular system conforming to a communication standard equivalent thereto, the shared frequency band will be used as, for example, a component carrier (CC). Further, it is assumed that the frequency band of the cellular system is used as a primary component carrier (PCC) and the shared frequency band is used as a secondary component carrier (SCC). Also, a control signal and a data signal can be transmitted and received using a frequency band of the cellular system and the data signal can be transmitted and received using the shared frequency band.

(Technology of Wireless Communication Conforming to Wireless LAN Standard)

A frame format of IEEE 802.11 will be described as the technology of wireless communication conforming to the wireless LAN standard with reference to FIG. 1. FIG. 1 is an explanatory diagram illustrating a frame format of IEEE 802.11.

In IEEE 802.11, a DATA frame and an acknowledgement (ACK) frame are basic frames. When the DATA frame is correctly received, the ACK frame is a frame which causes a transmitting side to know the success of reception of the DATA frame. Although wireless LAN communication can be performed only by the DATA frame and the ACK frame, two frames such as a request to send (RTS) frame and a clear to send (CTS) frame are generally further used.

Before the RTS frame is transmitted, each terminal device which performs the wireless LAN communication confirms that no signal is transmitted during a period referred to as a distributed coordination function (DCF) inter-frame space (DIFS). This is referred to as carrier sense. When terminal devices simultaneously start to transmit signals at a point in time at which the DIFS has elapsed, the signals may collide with each other. Thus, each terminal device waits for a backoff time randomly set for each terminal device and transmits a signal if no signal is transmitted for the backoff time.

Basically, the terminal device cannot transmit the signal while any signal is detected. However, because there is a hidden terminal problem, an RTS frame and a CTS frame including a duration field for setting a value referred to as a network allocation vector (NAV) are added. The NAV is set on the basis of a value included in the duration field. The terminal device setting the NAV avoids transmitting a signal during a period of the NAV.

First, a first terminal device for transmitting the DATA frame transmits the RTS frame. Then, another terminal device located around the first terminal device receives the RTS frame and acquires a value included in the duration field in the RTS frame. The other terminal device sets, for example, its own NAV to the above-mentioned acquired value and avoids transmitting a signal during the period of the NAV. For example, the period of the NAV is a period from the end of the RTS frame to the end of the ACK frame.

Also, a second terminal device for receiving the DATA frame transmits the CTS frame after only a short inter-frame space (SIFS) from the end of the RTS frame according to the reception of the RTS frame. Then, another terminal device located around the above-mentioned second terminal device receives the CTS frame and acquires a value included in the duration field in the CTS frame. The other terminal device sets, for example, its own NAV to the above-mentioned acquired value and avoids transmitting a signal during the period of the NAV. The period of the NAV is a period from the end of the CTS frame to the end of the ACK frame. Thereby, for example, it is possible to prevent the other terminal device (that is, a hidden terminal for the above-mentioned first terminal device) close to the above-mentioned second terminal device without being close to the above-mentioned first terminal device from transmitting a signal during communication of the above-mentioned first terminal device and the above-mentioned second terminal device.

Also, the RTS frame includes a frame control field, a reception address field, a transmission address field, and a frame check sequence (FCS) in addition to the duration field. Also, the CTS frame includes a frame control field, a reception address field, and an FCS in addition to the duration field.

Also, the DIFS and the DIFS in the standard of the IEEE 802.11 series have, for example, the following lengths.

TABLE 1

|  | 802.11 b | 802.11 g | 802.11 a | 802.11 n | 802.11 ac |
| --- | --- | --- | --- | --- | --- |
| SIFS | 10 us | 10 us | 16 us | 16 us | 16 us |
| DIFS | 50 us | 28 us | 34 us | 34 us | 34 us |

(Technology of Wireless Communication of Cellular System)

(a) Frame Format

The frame format of LTE will be described with reference to FIG. 2. FIG. 2 is an explanatory diagram illustrating the frame format of LTE.

First, a unit of time such as a radio frame is used in LTE. One radio frame is 10 ms. Each radio frame is identified by a system frame number (SFN) which is any one of 0 to 1023.

The radio frame includes 10 sub-frames identified by #0 to #9. Each sub-frame is 1 ms. Further, each sub-frame includes two slots and each slot includes, for example, seven orthogonal frequency division multiplexing (OFDM) symbols.

That is, each sub-frame includes 14 OFDM symbols. Also, the frame format illustrated in FIG. 2 is a frame format of a downlink and the frame format of an uplink includes a single carrier frequency division multiple access (SC-FDMA) symbol in place of an OFDM symbol.

(b) Carrier Aggregation

Component Carriers

With carrier aggregation in Release 10, up to a maximum of five CCs are aggregated for use by user equipment (UE). Each CC is a band with a maximum width of 20 MHz. Carrier aggregation includes a case in which successive CCs in the frequency direction are used, and a case in which separated CCs in the frequency direction are used. With carrier aggregation, the CCs to be used may be set for each UE.

PCC and SCC

In carrier aggregation, one of the multiple CCs used by a UE is a special CC. This special CC is called the primary component carrier (PCC). Also, the remaining CCs among the multiple CCs are called secondary component carriers (SCCs). The PCC may be different depending on the UE.

Since the PCC is the most important CC among the multiple CCs, it is desirable for the PCC to be the CC with the most stable communication quality.

Note that in actual practice, which CC to treat as the PCC depends on the implementation.

The SCC is added to the PCC. In addition, an existing SCC that has been added may also be removed. Note that changing an SCC is conducted by removing an existing SCC and adding a new SCC.

PCC Determination Method and Changing Method

When a UE connection is initially established and the status of the UE goes from Radio Resource Control (RRC) Idle to RRC Connected, the CC that the UE used during the establishment of the connection becomes the PCC for that UE. More specifically, a connection is established through a connection establishment procedure. At this point, the status of the UE goes from RRC Idle to RRC Connected. Also, the CC used in the procedure becomes the PCC for the above UE. Note that the above procedure is a procedure initiated from the UE side.

Additionally, PCC changing is conducted by a handover between frequencies. More specifically, if a handover is specified in a connection reconfiguration procedure, a PCC handover is conducted, and the PCC is changed. Note that the above procedure is a procedure initiated from the network side.

Adding SCC

As discussed above, the SCC is added to the PCC. As a result, the SCC is associated with the PCC. In other words, the SCC is subordinate to the PCC. SSC addition may be conducted through a connection reconfiguration procedure. Note that this procedure is a procedure initiated from the network side.

Removing SSC

As discussed above, an SCC may be removed. SSC removal may be conducted through a connection reconfiguration procedure. Specifically, a specific SCC specified in a message is removed. Note that the above procedure is a procedure initiated from the network side.

In addition, the removal of all SCCs may be conducted through a connection re-establishment procedure.

Special Role of PCC

The connection establishment procedure, the transmitting and receiving of non-access stratum (NAS) signaling, and the transmitting and receiving of uplink control signals on the physical uplink control channel (PUCCH) are conducted only by the PCC, and not by the SCCs.

In addition, the detection of a radio link failure (RLF) and a subsequent connection re-establishment procedure are also conducted only by the PCC, and not by the SCCs.

(Conditions of Backhauling for Carrier Aggregation)

For example, an ACK of a downlink signal on an SCC is transmitted by the PUCCH of the PCC. Since the ACK is used for the retransmission of data by the evolved Node B (eNB), a delay of the ACK is not acceptable. Consequently, when a first eNB using a CC that acts as the PCC for a UE is different from a second eNB using a CC that acts as an SCC for the UE, a backhaul delay of approximately 10 ms between the first eNB and the second eNB is desirable.

2. SCHEMATIC CONFIGURATION OF CELLULAR SYSTEM

Figure 3:
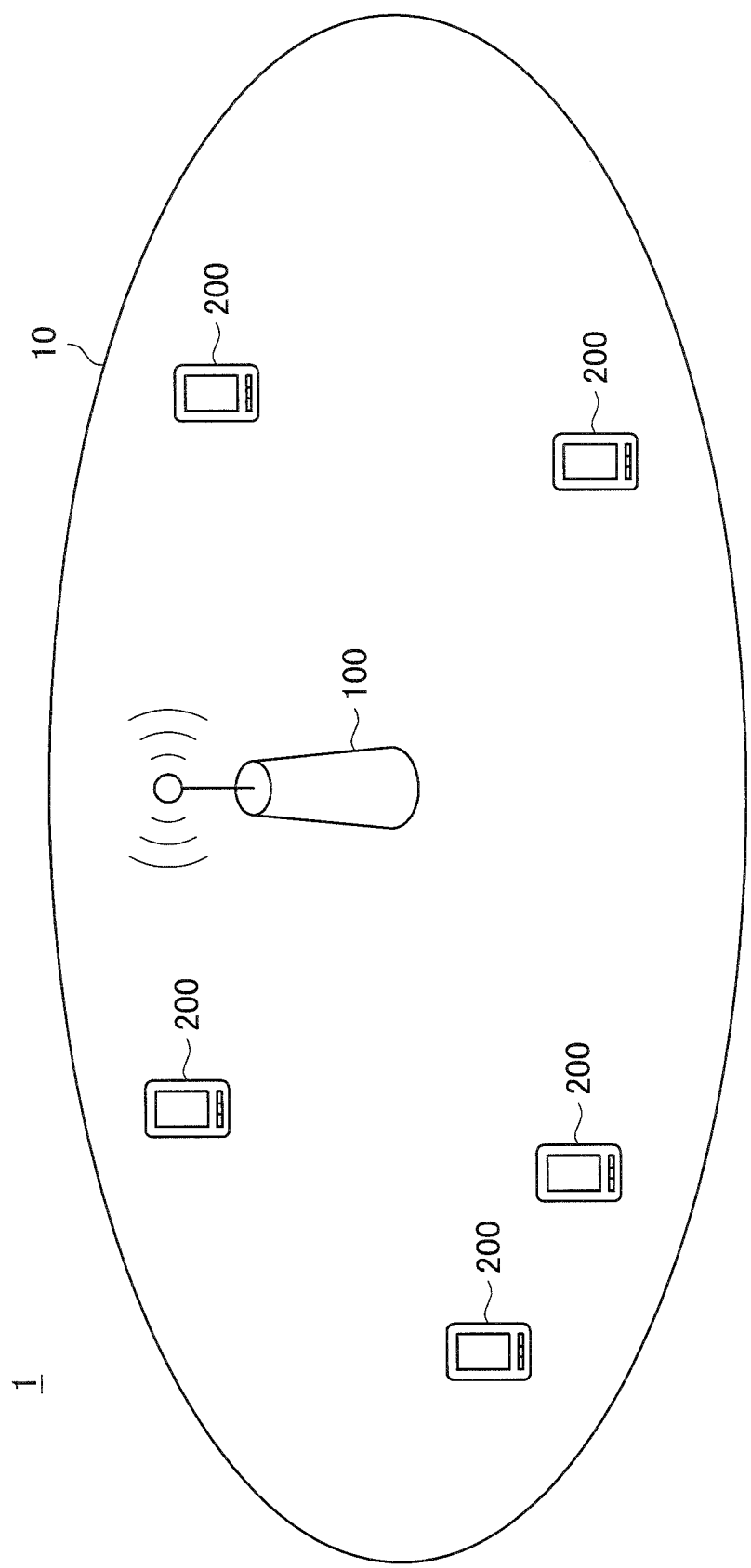
FIG. 3 is an explanatory diagram illustrating an example of a schematic configuration of a cellular system according to an embodiment of the present disclosure.

Next, a schematic configuration of a cellular system 1 according to an embodiment of the present disclosure will be described with reference to FIGS. 3 to 5. FIG. 3 is an explanatory diagram illustrating an example of the schematic configuration of the cellular system 1 according to the embodiment of the present disclosure. Referring to FIG. 3, the system 1 includes a base station 100 and a terminal device 200. The cellular system 1 is, for example, LTE, LTE-Advanced, or a system conforming to a communication standard equivalent thereto.

(Base Station 100)

The base station 100 performs wireless communication (cellular communication) of the cellular system 1. That is, the base station 100 performs wireless communication with the terminal device 200. For example, the base station 100 performs wireless communication with the terminal device 200 located within a cell 10 which is a communication area of the base station 100. Specifically, for example, the base station 100 transmits a downlink signal to the terminal device 200 and receives an uplink signal from the terminal device 200.

As an example, the base station 100 is a small base station and the cell 10 is a small cell. As another example, the base station 100 may be a macro base station and the cell 10 may be a macro cell.

(Terminal Device 200)

The terminal device 200 performs wireless communication (cellular communication) of the cellular system.

For example, the terminal device 200 performs wireless communication with the base station 100. For example, when the terminal device 200 is located within the cell 10 of the base station 100, the terminal device 200 performs wireless communication with the base station 100. Specifically, for example, the terminal device 200 receives the downlink signal from the base station 100 and transmits the uplink signal to the base station 100.

Also, the terminal device 200 can perform wireless communication with another terminal device (for example, another terminal device 200 or the like). For example, the terminal device 200 can perform device-to-device (D2D) communication. Also, the terminal device 200 can perform wireless communication within a localized network (LN) formed by the terminal device.

Also, the terminal device 200 may perform other wireless communication. For example, the terminal device 200 may perform wireless communication (wireless LAN communication) conforming to the wireless LAN standard.

(Frequency Band to be Used)

In wireless communication (that is, cellular communication) of the cellular system 1, the frequency band of the cellular system 1 is used. The frequency band is, for example, a band allocated to a provider of the cellular system 1, and can be referred to as a licensed band.

In particular, in the embodiment of the present disclosure, a frequency band to be used in other wireless communication is also used in the cellular communication. That is, a frequency band shared between the cellular communication and the above-mentioned other wireless communication (hereinafter referred to as a "shared band") is also used in the cellular communication. The above-mentioned other wireless communication is, for example, wireless communication conforming to a wireless LAN standard (that is, wireless LAN communication). Also, the above-mentioned shared band is, for example, a channel of a wireless LAN. As an example, the above-mentioned shared band is a channel of 20 MHz.

(Other Wireless Communication)

A communication area of the above-mentioned other wireless communication may be located within the cell 10. That is, the cell 10 can overlap a communication area of the above-mentioned other wireless communication.

For example, the other wireless communication is wireless LAN communication and a communication area of the wireless LAN can be located within the cell 10. That is, the cell 10 can overlap the communication area of the wireless LAN. Hereinafter, in this regard, a specific example will be described with reference to FIGS. 4 and 5.

Figure 4:
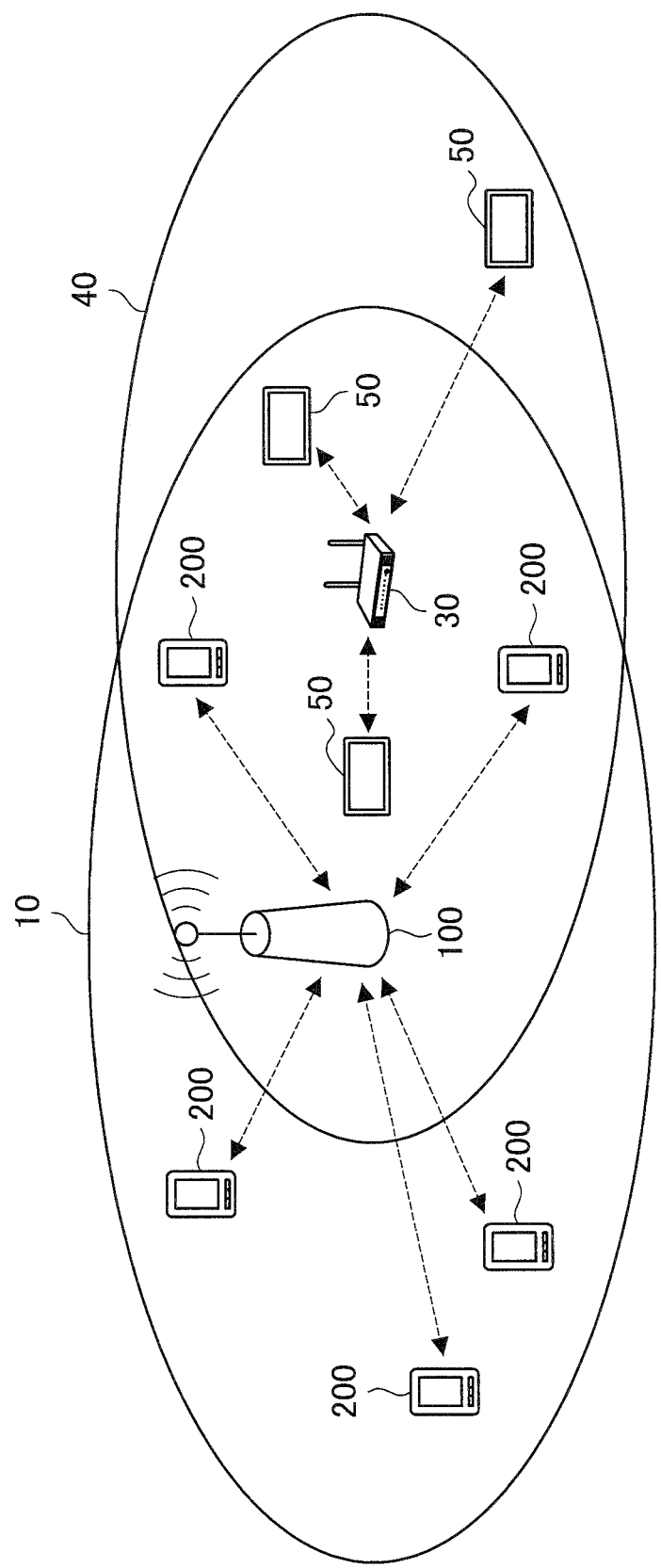
FIG. 4 is an explanatory diagram illustrating an example of a communication area of a wireless local area network (LAN) overlapping a small cell.

FIG. 4 is an explanatory diagram illustrating an example of a communication area of a wireless LAN overlapping a small cell. Referring to FIG. 4, the base station 100 which is a small base station and the terminal device 200 are illustrated. Further, an access point 30 of a wireless LAN and a terminal device 50 for performing wireless LAN communication are located around the base station 100 and the terminal device 200. A communication area 40 of the access point 30 overlaps the cell 10 which is a small cell.

Figure 5:
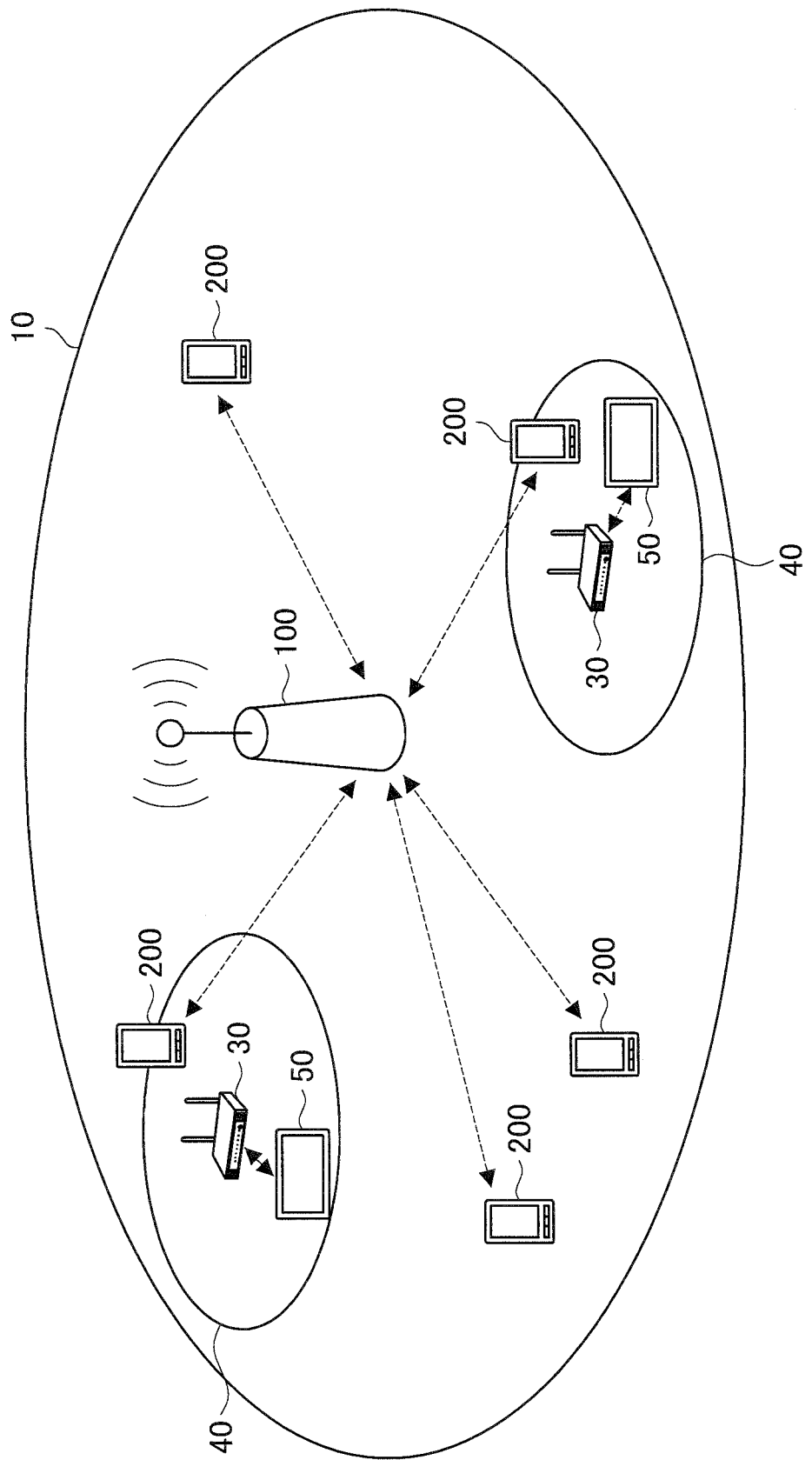
FIG. 5 is an explanatory diagram illustrating an example of a communication area of a wireless LAN overlapping a macro cell.

FIG. 5 is an explanatory diagram illustrating an example of a communication area of a wireless LAN overlapping a macro cell. Referring to FIG. 5, the base station 100 which is a macro base station and the terminal device 200 are illustrated. Further, the access point 30 of a wireless LAN and the terminal device 50 for performing wireless LAN communication are located around the base station 100 and the terminal device 200. The communication area 40 of the access point 30 overlaps the cell 10 which is a macro cell.

Also, the wireless LAN communication can include wireless communication conforming to a wireless LAN standard between terminal devices which perform the wireless LAN communication in addition to wireless communication between the wireless LAN access point and the terminal device (which perform wireless LAN communication). As an example, the wireless LAN communication can also include wireless communication according to Wi-Fi Direct.

The cellular system 1 according to the embodiment of the present disclosure has been described above. Also, the cellular system 1 can include a plurality of base stations 100 as well as one base station 100. Also, the cellular system 1 can include another device in addition to the base station 100 and the terminal device 200. For example, the cellular system 1 can include core network nodes (for example, a mobility management entity (MME), a serving gateway (S-GW), and a packet data network gateway (P-GW), etc.).

3. FIRST EMBODIMENT

Next, the first embodiment of the present disclosure will be described with reference to FIGS. 6 to 19.

3.1. Summary

First, the summary of the first embodiment will be described.

Problem According to First Embodiment

In the wireless LAN standard, carrier sense multiple access with collision avoidance (CSMA/CA) is adopted and each of devices for performing wireless LAN communication (that is, wireless conforming to the wireless LAN standard) (hereinafter referred to as a "wireless LAN devices") transmits a signal by its own determination according to the CSMA/CA.

For example, a frequency band used in the wireless LAN communication (for example, a channel of a wireless LAN) is also used in cellular communication. That is, a frequency band is shared between the cellular communication and the wireless LAN communication. In this case, for example, even while the above-mentioned frequency band is used in cellular communication, the wireless LAN device can transmit a signal using the above-mentioned frequency band by its own determination according to the CSMA/CA. Thus, interference between the cellular communication and the wireless LAN communication occurs in the above-mentioned frequency band, and communication quality of the above-mentioned cellular communication and/or wireless LAN communication is likely to deteriorate.

Therefore, it is desirable to provide a mechanism which enables the frequency band shared between the cellular communication and the other wireless communication to be more appropriately used in the cellular system. More specifically, it is desirable to provide a mechanism capable of preventing a frequency band shared between the cellular communication and the wireless LAN communication from being used in the wireless LAN communication while the above-mentioned frequency band is used in the cellular communication.

Characteristics of First Embodiment

According to the first embodiment, through control by the base station 100-1, the wireless communication device for performing the cellular communication transmits a frame including duration information for setting an NAV using the frequency band shared between the cellular communication and the wireless LAN communication. Through control by the base station 100-1, the cellular communication is performed using the above-mentioned frequency band in the period after the transmission of the above-mentioned frame. Also, the above-mentioned wireless communication device is the base station 100-1 or a terminal device 200-1.

Thereby, for example, while the frequency band shared between the cellular communication and the wireless LAN communication is used in the cellular communication, the above-mentioned frequency band can be prevented from being used in wireless LAN communication.

3.2. Configuration of Base Station

Figure 6:
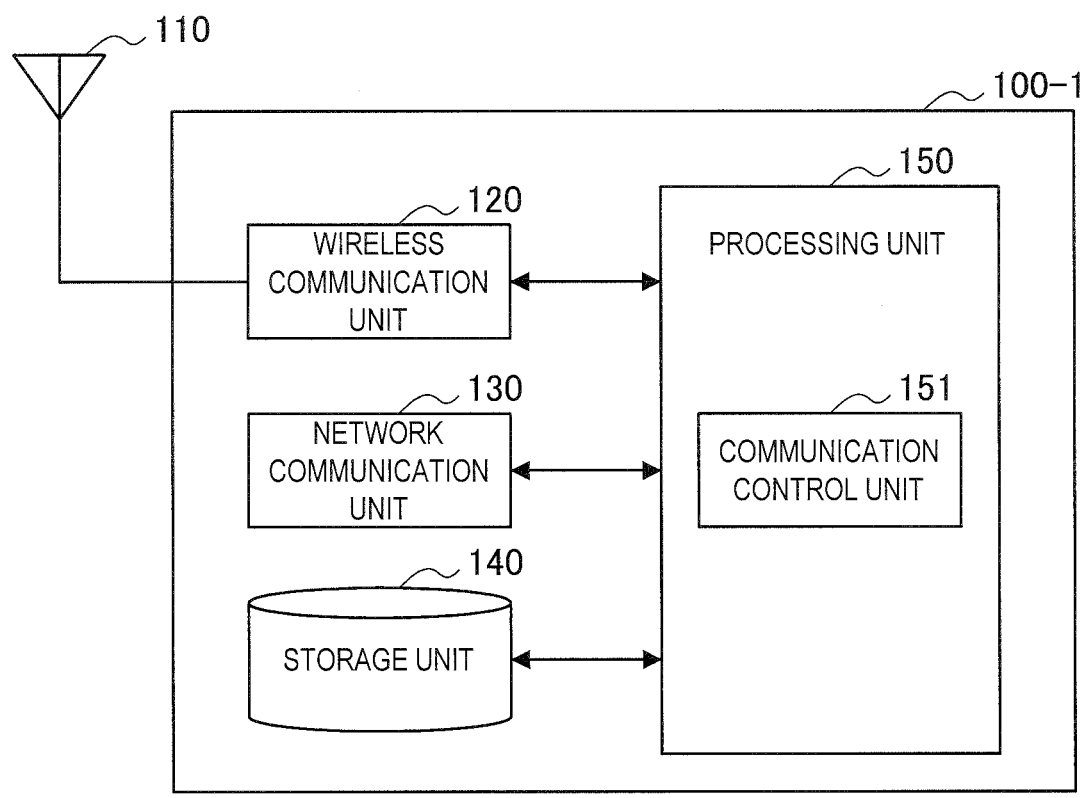
FIG. 6 illustrates an example of a configuration of a base station according to a first embodiment.

Next, an example of the configuration of a base station 100-1 according to the first embodiment will be described with reference to FIGS. 6 to 10. FIG. 6 is a block diagram illustrating an example of the configuration of the base station 100-1 according to the first embodiment. Referring to FIG. 6, the base station 100-1 is equipped with an antenna unit 110, a wireless communication unit 120, a network communication unit 130, a storage unit 140, and a processing unit 150.

(Antenna Unit 110)

The antenna unit 110 emits a signal output by the wireless communication unit 120 into space as a radio wave. Additionally, the antenna unit 110 converts a radio wave from space into a signal, and outputs the signal to the wireless communication unit 120.

(Wireless Communication Unit 120)

The wireless communication unit 120 transmits and receives signals. For example, the wireless communication unit 120 transmits a downlink signal to a terminal device 200-1 positioned within the cell 10, and receives an uplink signal from the terminal device 200-1 positioned within the cell 10.

For example, the wireless communication unit 120 transmits and receives a signal using the frequency band of the cellular system 1. Also, particularly, in the embodiment of the present disclosure, the wireless communication unit 120 transmits and receives a signal using the frequency band shared between the cellular communication and the other wireless communication (for example, wireless LAN communication) (that is, a shared band).

(Network Communication Unit 130)

The network communication unit 130 communicates with other nodes. For example, the network communication unit 130 communicates with core network nodes (for example, MME, S-GA, P-GW, etc.). Also, the network communication unit 130 communicates with another base station 100-1.

(Storage Unit 140)

The storage unit 140 temporarily or permanently stores programs and data for the operation of the base station 100-1.

(Processing Unit 150)

The processing unit 150 provides various functions of the base station 100-1. The processing unit 150 includes a communication control unit 151. Also, the processing unit 150 can further include another component in addition to the communication control unit 151.

(Communication Control Unit 151)

(a) Frame Transmission Using Shared Band

The communication control unit 151 controls a wireless communication device for performing cellular communication so that the above-mentioned wireless communication device transmits a frame including duration information for setting the NAV using a frequency band shared between the cellular communication and wireless LAN communication (that is, a shared band).

Wireless Communication Device

For example, the above-mentioned wireless communication device includes the base station 100-1. That is, the communication control unit 151 controls the base station 100-1 so that the base station 100-1 transmits the above-mentioned frame using the above-mentioned shared band.

Specifically, for example, the communication control unit 151 triggers the transmission of a frame including duration information for setting the NAV. Then, the processing unit 160 (the communication control unit 151 or another constituent element) generates a frame including duration information for setting the NAV. Also, for example, the processing unit 160 (the communication control unit 151 or another constituent element) generates a signal of a physical layer of the above-mentioned frame according to scrambling, encoding, interleaving, symbol mapping, and/or modulation, etc. and causes the wireless communication unit 120 to transmit the signal.

According to the transmission of the above-mentioned frame by the above-mentioned base station 100-1, for example, it is possible to cause the wireless LAN device positioned within a region (for example, a cell 10) around the base station 100-1 to receive the above-mentioned frame.

Frame

For example, the above-mentioned frame has a duration field and includes the above-mentioned duration information in the duration field.

As an example, the above-mentioned frame is an RTS frame. As another example, the above-mentioned frame may be a CTS frame. As still another example, the above-mentioned frame may be another type of frame similar to the RTS frame and the CTS frame.

Duration Information

As described above, the above-mentioned duration information is information for setting the NAV. For example, the above-mentioned duration information indicates a duration. Also, the duration is a period after the transmission of the above-mentioned frame and covers a period in which the cellular communication is performed using the above-mentioned shared band. For example, the duration is determined by the communication control unit 151.

According to the transmission of the frame including such duration information, for example, it is possible to cause the wireless LAN device for receiving the frame to set the NAV to cover the period in which the cellular communication is performed using the above-mentioned shared band. Consequently, the use of the above-mentioned shared band by the wireless LAN device can be prevented during the period in which the cellular communication is performed using the above-mentioned shared band.

Also, the duration indicated by the above-mentioned duration information may cover a part of the above-mentioned period in which the cellular communication is performed using the above-mentioned shared band. An additional frame including the duration information for setting the NAV may be transmitted through control by the communication control unit 151 at any timing after the transmission of the above-mentioned frame. Also, another additional frame may be transmitted at any timing after the transmission of the additional frame. One or more additional frames may be transmitted at different timings as described above through control by the communication control unit 151. Every time an additional frame is transmitted, the wireless LAN device can receive the additional frame and update the NAV on the basis of the duration information included in the additional frame. As a result, the above-mentioned time in which the cellular communication is performed using the above-mentioned shared band can be covered according to the duration information included in the above-mentioned frame and the above-mentioned one or more additional frames. Also, according to this technique, for example, it is possible to further lengthen a period in which the above-mentioned shared band is used in the cellular communication.

Timing of Transmission

The above-mentioned frame is transmitted, for example, at a timing at which a period in which no signal is transmitted using the above-mentioned shared band becomes a sum of a DIFS and a backoff time. For example, the communication control unit 151 controls the above-mentioned frame to start to be transmitted as described above.

Also, the above-mentioned frame may start to be transmitted before the period in which no signal is transmitted using the above-mentioned shared band becomes the DIFS. Thereby, for example, it is possible to more reliably transmit the above-mentioned frame using the above-mentioned shared band. Further, the above-mentioned frame may start to be transmitted after the period in which no signal is transmitted using the above-mentioned shared band is longer than an SIFS (but before the period becomes the DIFS). Thereby, for example, the collision of a signal of the above-mentioned frame with a signal of wireless LAN communication can be avoided.

(b) Cellular Communication Using Shared Band

The communication control unit 151 controls the base station 100-1 so that the cellular communication is performed using the above-mentioned shared band in the period after the transmission of the above-mentioned frame.

Period

Period Covered by Duration Information

As described above, for example, the above-mentioned duration information included in the above-mentioned frame indicates the duration. Also, the duration is the period after the transmission of the above-mentioned frame and covers the period in which the cellular communication is performed using the above-mentioned shared band. In other words, the above-mentioned period after the transmission of the above-mentioned frame is a period which is covered by the duration indicated by the duration information included in the above-mentioned frame.

Start Time-Point of Period

For example, the above-mentioned period after the transmission of the above-mentioned frame is a period which starts from a point in time at which the SIFS has elapsed from an end time-point of transmission of the above-mentioned frame. Thereby, for example, it is possible to avoid the collision of a signal of the above-mentioned fame with a signal of the wireless LAN communication. Also, thereby, for example, it is possible to further lengthen a time in which the above-mentioned shared band is used in the cellular communication.

Length of Period

For example, the above-mentioned period after the transmission of the above-mentioned frame is a period of one or more radio frames of the cellular system 1. Thereby, for example, the cellular communication can be enabled using the above-mentioned shared band.

Specific Example

Figure 7:
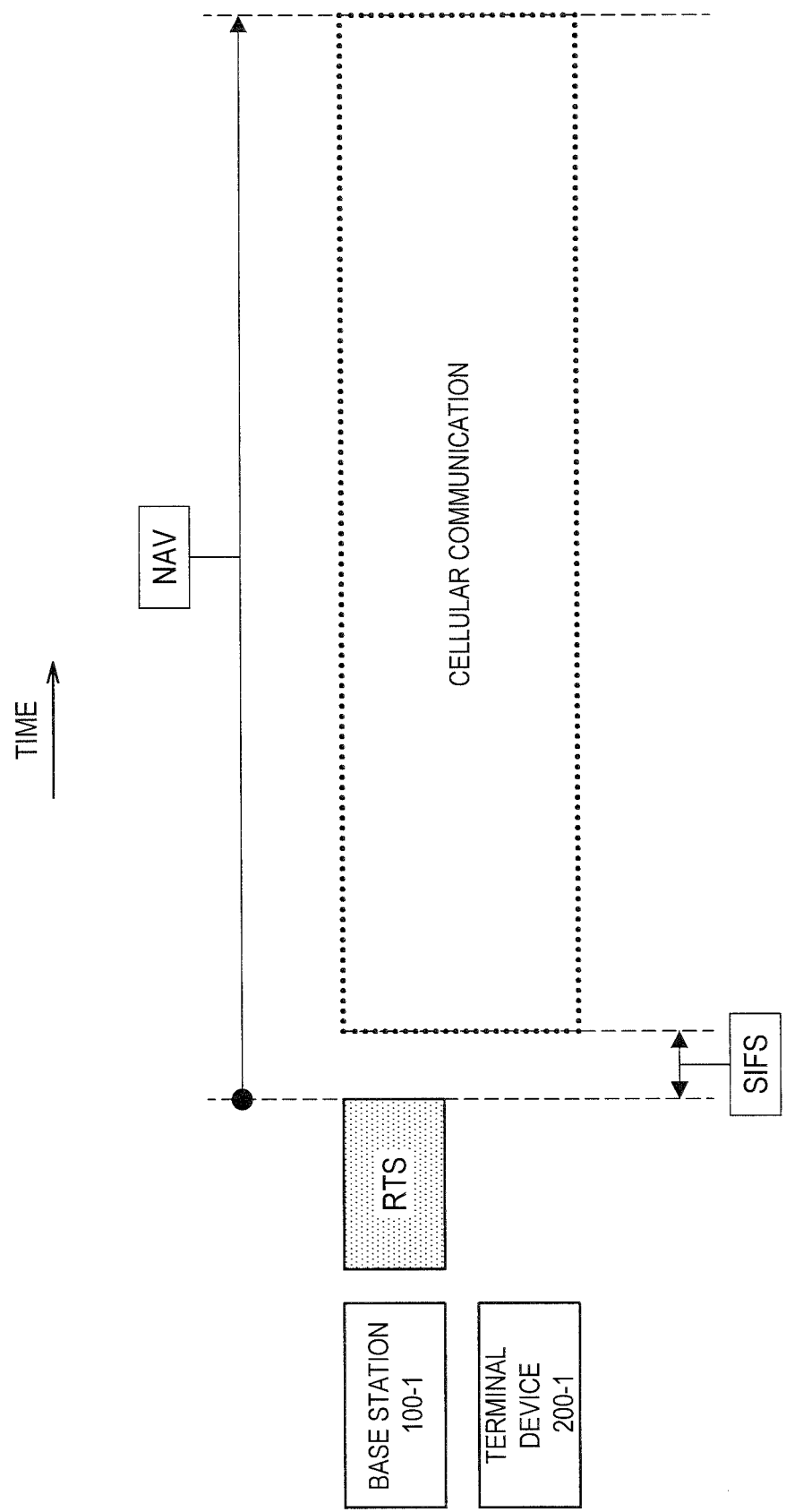
FIG. 7 is an explanatory diagram illustrating an example of a period in which cellular communication is performed using a shared band in the first embodiment.

FIG. 7 is an explanatory diagram illustrating an example of a period in which cellular communication is performed using a shared band in the first embodiment. Referring to FIG. 7, first, the base station 100-1 transmits an RTS frame. The base station 100-1 starts cellular communication with the terminal device 200-1 using the shared band at a point in time at which the SIFS has elapsed from an end time-point of transmission of the RTS frame. Also, the base station 100-1 terminates the cellular communication before the passage of the period of the NAV set according to the RTS frame.

Also, no ACK frame is transmitted in the example of FIG. 7, but an ACK frame may be transmitted before the passage of the period of the above-mentioned NAV. In this case, the cellular communication may be terminated before the transmission start of the ACK frame. This is also applied to FIGS. 8, 9, 10, 13, 15, 17, and 20 which will be described below as well as FIG. 7.

Also, FIG. 7 is not Intended to Describe a Length of the Period and it should be noted that the period in which the cellular communication is performed using the shared band can be greater than the length illustrated in FIG. 7 in comparison to the length of the RTS frame and the length of the SIFS. This is applied to FIGS. 8, 9, 10, 13, 15, 17, and 20 to be described below as well as FIG. 7.

Duplex Operation

In the cellular system 1, TDD and FDD are adopted as the duplex operation. That is, the duplex operation of the cellular system 1 is the TDD or FDD.

TDD

As a first example, the TDD is adopted as the duplex operation in the cellular system 1. That is, the duplex operation of the cellular system 1 is the TDD. In this case, the above-mentioned shared band is used as a band for both a downlink and an uplink in the cellular system 1. Hereinafter, an example of the cellular communication when the TDD is adopted will be described with reference to FIG. 8.

Figure 8:
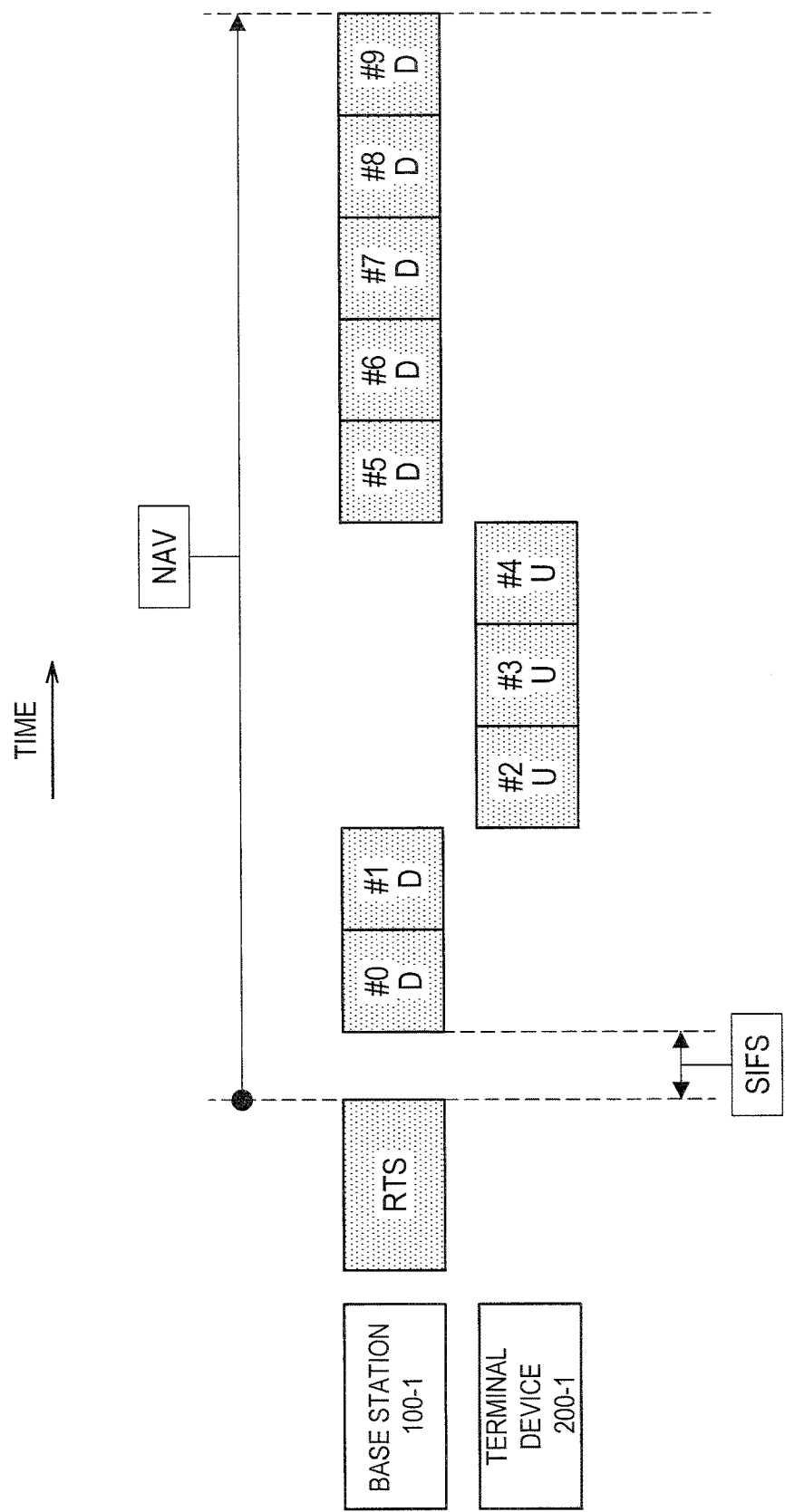
FIG. 8 is an explanatory diagram illustrating an example of cellular communication when time division duplex (TDD) is adopted.

FIG. 8 is an explanatory diagram illustrating an example of cellular communication when the TDD is adopted. Referring to FIG. 8, for example, in a downlink subframe within a period in which the cellular communication is performed using a shared band, the base station 100-1 transmits a signal to the terminal device 200-1 using the shared band, and the terminal device 200-1 receives the signal. Also, in an uplink subframe within the above-mentioned period, the terminal device 200-1 transmits a signal to the base station 1000-1 using the above-mentioned shared band, and the base station 100-1 receives the signal.

Also, cellular communication of only one radio frame is illustrated in the example of FIG. 8, but, of course, cellular communication of two or more frames may be performed. This is also applied to FIGS. 9 and 10 which will be described below as well as FIG. 8.

FDD

As a second example, the FDD is adopted as the duplex operation in the cellular system 1. That is, the duplex operation of the cellular system 1 is the FDD.

For example, a partial band included in the above-mentioned shared band in the cellular system 1 is used as a downlink band and another partial band included in the above-mentioned shared band is used as an uplink band. Hereinafter, an example of cellular communication when the FDD is adopted will be described with reference to FIG. 9.

Figure 9:
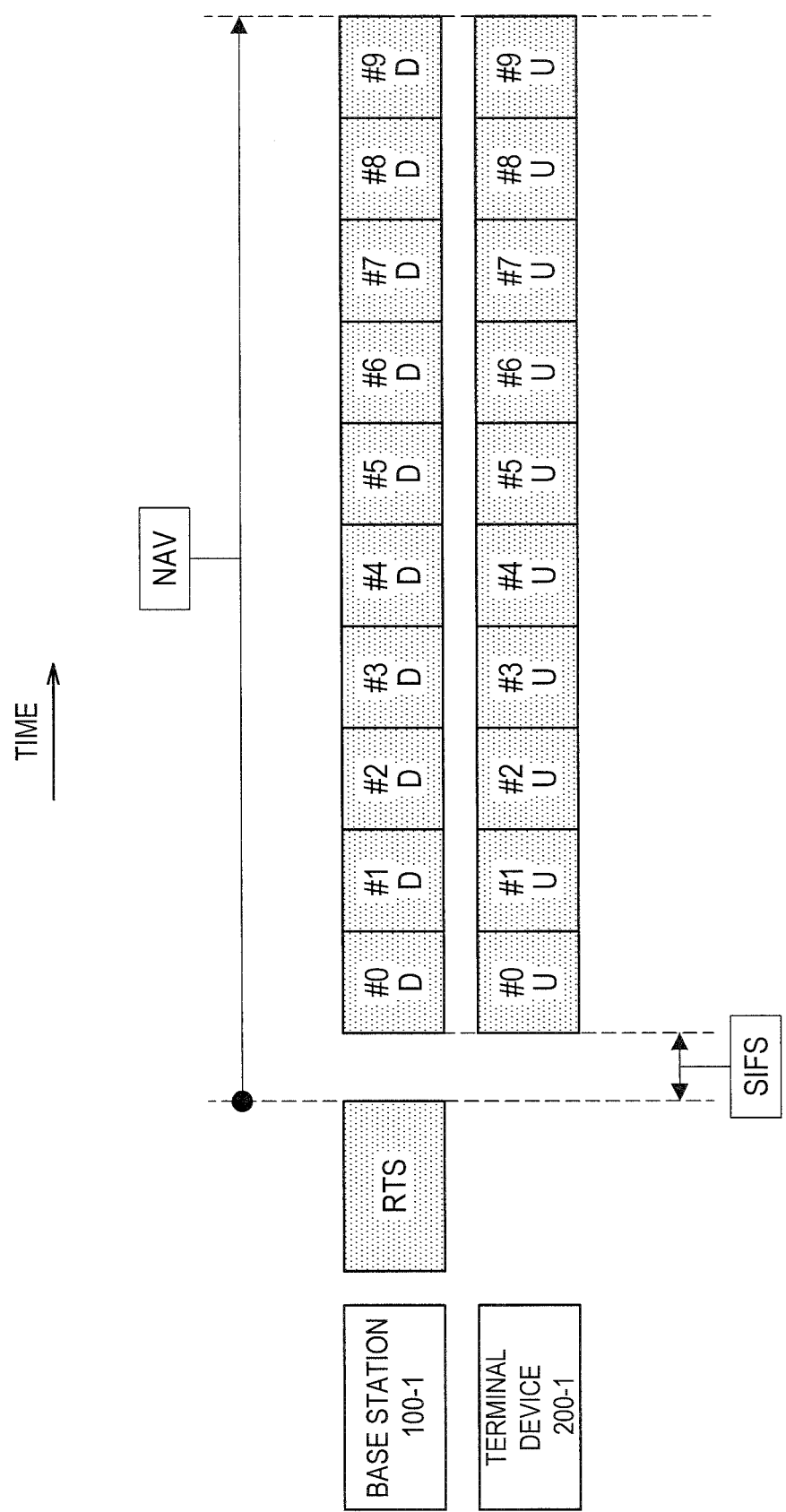
FIG. 9 is an explanatory diagram illustrating an example of cellular communication when frequency division duplex (FDD) is adopted.

FIG. 9 is an explanatory diagram illustrating an example of cellular communication when the FDD is adopted. Referring to FIG. 9, for example, within a period in which the cellular communication is performed using a shared band, the base station 100-1 transmits a signal to the terminal device 200-1 using a partial band of the shared band as the downlink band, and the terminal device 200-1 receives the signal. Also, within the above-mentioned period, the terminal device 200-1 transmits a signal to the base station 100-1 using another partial band of the above-mentioned shared band as the uplink band and the base station 100-1 receives the signal.

Also, two shared bands may be used in place of using the partial band of the shared band as the downlink band and using the other partial band of the shared band as the uplink band. In this case, in the cellular system 1, one of the two shared bands may be used as the downlink band and the other of the two shared bands may be used as the uplink band.

Also, the shared band may be used as one of the downlink band and the uplink band. For example, the shared band may be used as the downlink band in the cellular system 1. The frequency band of the cellular system 1 may be used as the uplink band corresponding to the above-mentioned shared band. That is, an uplink control signal associated with the shared band may be transmitted to the base station 100-1 by the terminal device 200-1 using the frequency band of the cellular system 1. Hereinafter, in this regard, a specific example will be described with reference to FIG. 10.

Figure 10:
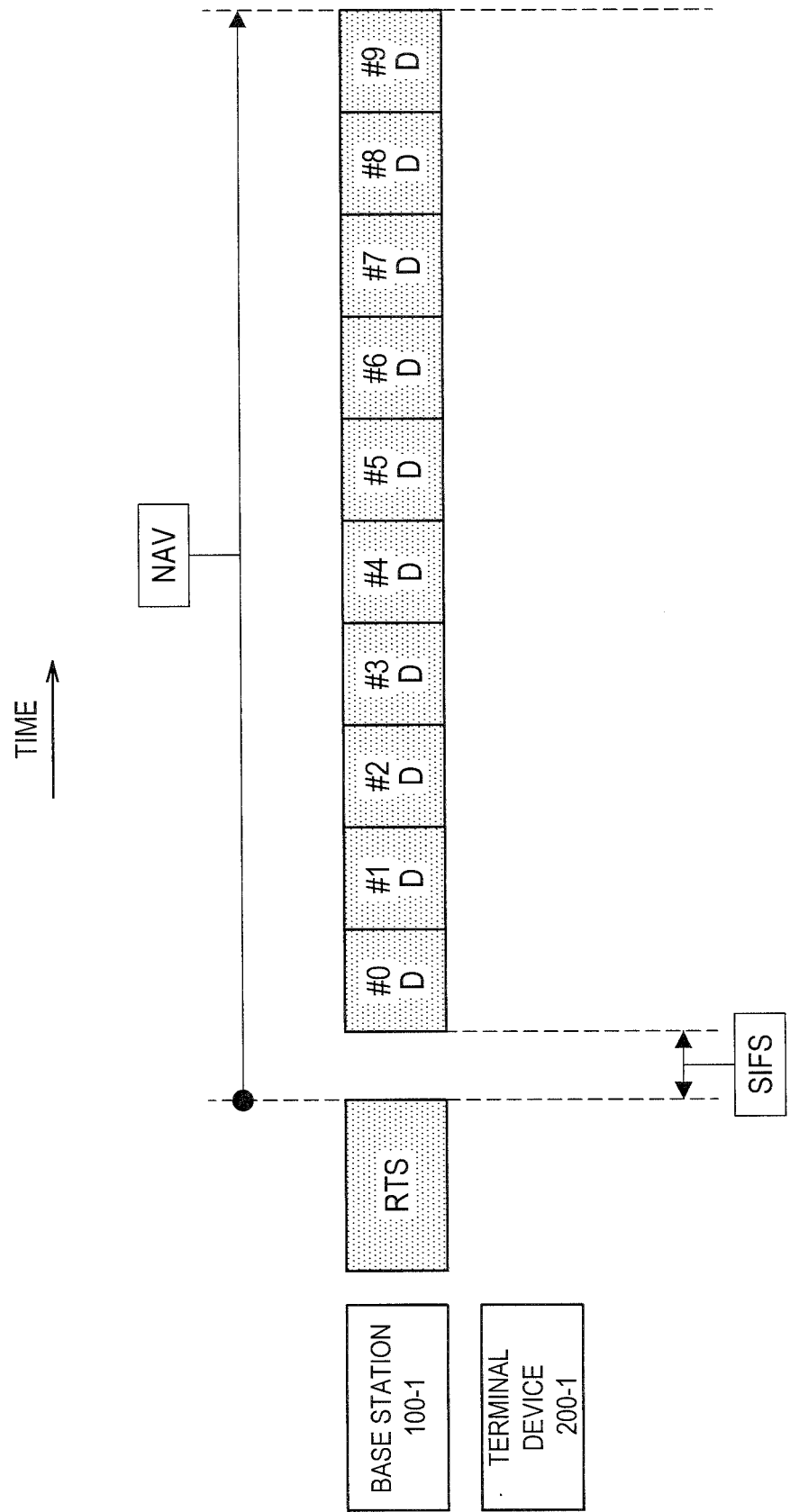
FIG. 10 is an explanatory diagram illustrating another example of cellular communication when FDD is adopted.

FIG. 10 is an explanatory diagram illustrating another example of cellular communication when the FDD is adopted. Referring to FIG. 10, for example, within a period in which the cellular communication is performed using the shared band, the base station 100-1 may transmit a signal to the terminal device 200-1 using the shared band as the downlink band, and the terminal device 200 may receive the signal. Also, an uplink control signal associated with the shared band may be transmitted to the base station 100-1 by the terminal device 200-1 using the frequency band of the cellular system 1.

By using the shared band as the downlink band, for example, a hidden terminal problem can be reduced. Specifically, for example, because the terminal device 200-1 does not transmit an uplink signal using the above-mentioned shared band, interference to wireless LAN communication of the wireless LAN device positioned in the periphery of the terminal device 200-1 is suppressed.

3.3. Configuration of Terminal Device

Figure 11:
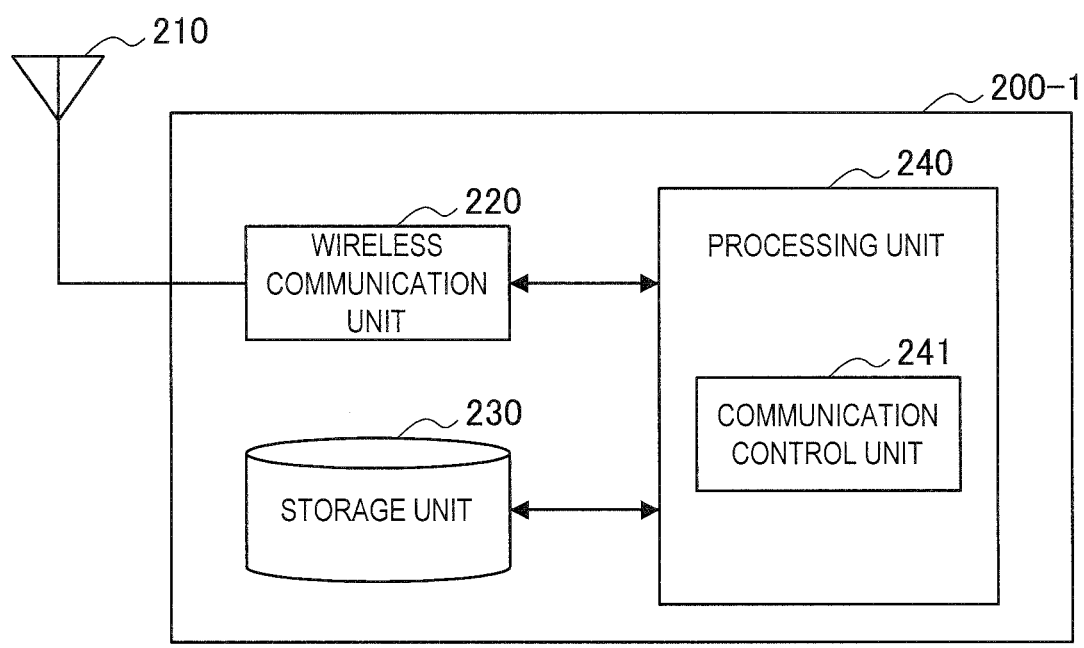
FIG. 11 is a block diagram illustrating an example of a configuration of a terminal device according to the first embodiment.

Next, an example of a configuration of the terminal device 200-1 according to the first embodiment will be described with reference to FIG. 11. FIG. 11 is a block diagram illustrating the example of the configuration of the terminal device 200-1 according to the first embodiment. Referring to FIG. 11, the terminal device 200-1 includes an antenna unit 210, a wireless communication unit 220, a storage unit 230, and a processing unit 240.

(Antenna Unit 210)

The antenna unit 210 emits a signal output by the wireless communication unit 220 into space as a radio wave. Additionally, the antenna unit 210 converts a radio wave from space into a signal, and outputs the signal to the wireless communication unit 220.

(Wireless Communication Unit 220)

The wireless communication unit 220 transmits and receives a signal. For example, the wireless communication unit 220 receives a downlink signal from the base station 100-1 and transmits an uplink signal to the base station 100-1 when the terminal device 200-1 is located within the cell 10.

For example, the wireless communication unit 220 transmits and receives a signal using a frequency band of the cellular system 1. Also, particularly, in the embodiment of the present disclosure, the wireless communication unit 220 transmits and receives a signal using a frequency band shared between cellular communication and other wireless communication (for example, wireless LAN communication) (that is, a shared band).

(Storage Unit 230)

The storage unit 230 temporarily or permanently stores programs and data for the operation of the terminal device 200-1.

(Processing Unit 240)

The processing unit 240 provides various functions of the terminal device 200-1. The processing unit 240 includes a communication control unit 241. Also, the processing unit 240 can further include other components in addition to the communication control unit 241.

(Communication Control Unit 241)

The communication control unit 241 controls the terminal device 200-1.

3.4. Flow of Process

Figure 12:
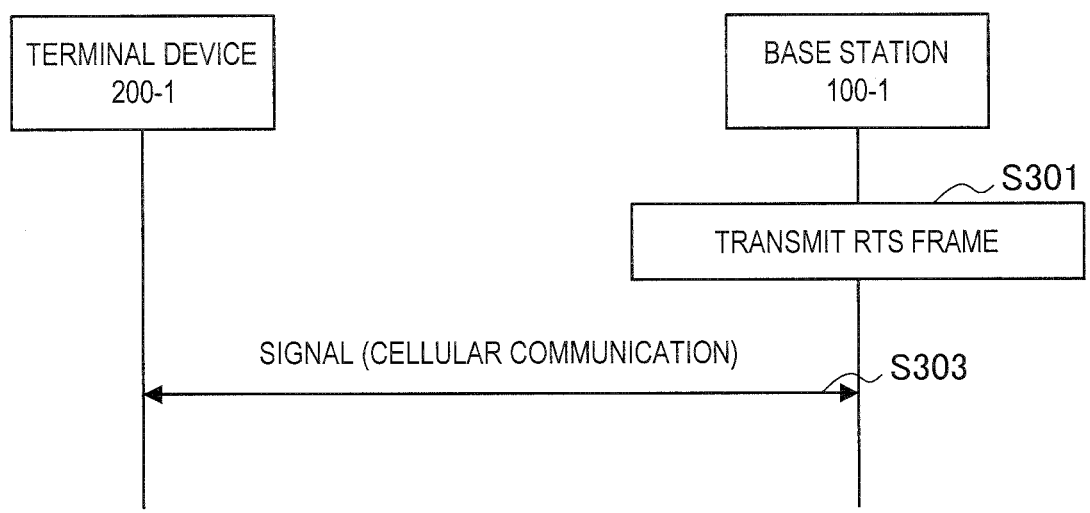
FIG. 12 is a sequence diagram illustrating an example of a schematic flow of a process according to the first embodiment.

Next, an example of the process according to the first embodiment will be described with reference to FIG. 12. FIG. 12 is a sequence diagram illustrating an example of a schematic flow of the process according to the first embodiment. Also, the process is executed, for example, when it is determined (for example, by the base station 100-1) that the shared band (that is, a frequency band shared between the cellular communication and other wireless communication) is used in the cellular communication.

The base station 100-1 transmits an RTS frame using a shared band (S301).

The base station 100-1 and the terminal device 200-1 perform cellular communication using the above-mentioned shared band in a period after the transmission of the RTS frame (S303). That is, the base station 100-1 and the terminal device 200-1 transmit a signal of the cellular communication in the period.

Also, as described, the base station 100-1 may transmit another type of frame in place of the RTS frame.

3.5. First Modified Example

Hereinafter, the first modified example of the first embodiment will be described with reference to FIGS. 13 and 14.

Summary

In the above-mentioned example of the first embodiment, only the base station 100-1 transmits a frame (that is, a frame including duration information for setting an NAV).

On the other hand, in the first modified example of the first embodiment, the base station 100-1 transmits the frame (that is, the frame including the duration information for setting the NAV), and the terminal device 200-1 transmits another frame including the duration information for setting the NAV according to the reception of the above-mentioned frame.

Thereby, for example, a hidden terminal problem can be solved.

(Base Station 100-1: Communication Control Unit 151)

(a) Frame Transmission Using Shared Band

As described above, the communication control unit 151 controls a wireless communication device for performing cellular communication so that the wireless communication device transmits a frame including duration information for setting the NAV using the above-mentioned shared band.

Wireless Communication Device

Even in the first modified example, the above-mentioned wireless communication device includes the base station 100-1. That is, the communication control unit 151 controls the base station 100-1 so that the base station 100-1 transmits the above-mentioned frame using the above-mentioned shared band.

Frame

As described above, for example, the above-mentioned frame has a duration field and includes the above-mentioned duration information in the duration field.

Particularly, in the first modified example, the above-mentioned frame is a frame for causing another frame including the duration information for setting the NAV to be transmitted to a specific device for receiving the above-mentioned frame.

Specific Example of Frame and Other Frame

For example, the above-mentioned frame is an RTS frame and the above-mentioned other frame is a CTS frame. That is, the base station 100 transmits the RTS frame and the above-mentioned specific device transmits the CTS frame according to the reception of the RTS frame.

Also, the above-mentioned frame may not be the RTS frame. For example, the above-mentioned frame may be another type of frame similar to the RTS frame. Also, the above-mentioned other frame may not be the CTS frame. For example, the above-mentioned other frame may be another type of frame similar to the other frame.

Specific Device

The above-mentioned specific device is the terminal device 200-1. That is, the above-mentioned frame is a frame for causing the above-mentioned other frame to be transmitted to the terminal device 200-1 for receiving the above-mentioned frame.

As a first example, the above-mentioned frame has a reception address field and includes a predetermined value in the reception address field. The terminal device 200-1 transmits the above-mentioned other frame using the above-mentioned shared band when the above-mentioned frame including the above-mentioned predetermined value in the reception address field is received using the above-mentioned shared band. Also, a predetermined value may be included in another field (for example, a transmission address field) in place of the reception address field, and the terminal device 200-1 may transmit the above-mentioned other frame using the above-mentioned shared band when the frame including the above-mentioned predetermined value is received using the above-mentioned shared band.

As a second example, the above-mentioned frame has a reception address field and may include an address of a specific terminal device 200-1 in the reception address field. The specific terminal device 200-1 may transmit the above-mentioned other frame using the above-mentioned shared band when a frame including the address of the above-mentioned specific terminal device 200-1 in the reception address field is received using the above-mentioned shared band.

The above-mentioned frame according to the first modified example has been described above. According to the transmission of the above-mentioned frame, for example, a hidden terminal problem can be solved. More specifically, for example, according to the frame (for example, the RTS frame), it is possible to cause the above-mentioned specific device to transmit the frame (for example, the CTS frame) for setting the NAV. Thus, a wireless LAN device capable of receiving the signal transmitted by the terminal device without receiving a signal transmitted by the base station 100-1 can set the NAV. As a result, interference between the cellular communication and the wireless LAN communication can be suppressed.

(b) Cellular Communication Using Shared Band

As described above, the communication control unit 151 controls the base station 100-1 so that the cellular communication is performed using the above-mentioned shared band in the period after the transmission of the above-mentioned frame.

Period

Start Time-Point of Period

For example, the above-mentioned period after the transmission of the above-mentioned fame is a period after the transmission of the above-mentioned other frame. Thereby, for example, it is possible to avoid interference between cellular communication and wireless LAN communication of a wireless LAN device for receiving a signal of the above-mentioned other frame without receiving a signal of the above-mentioned frame.

Specific Example

Figure 13:
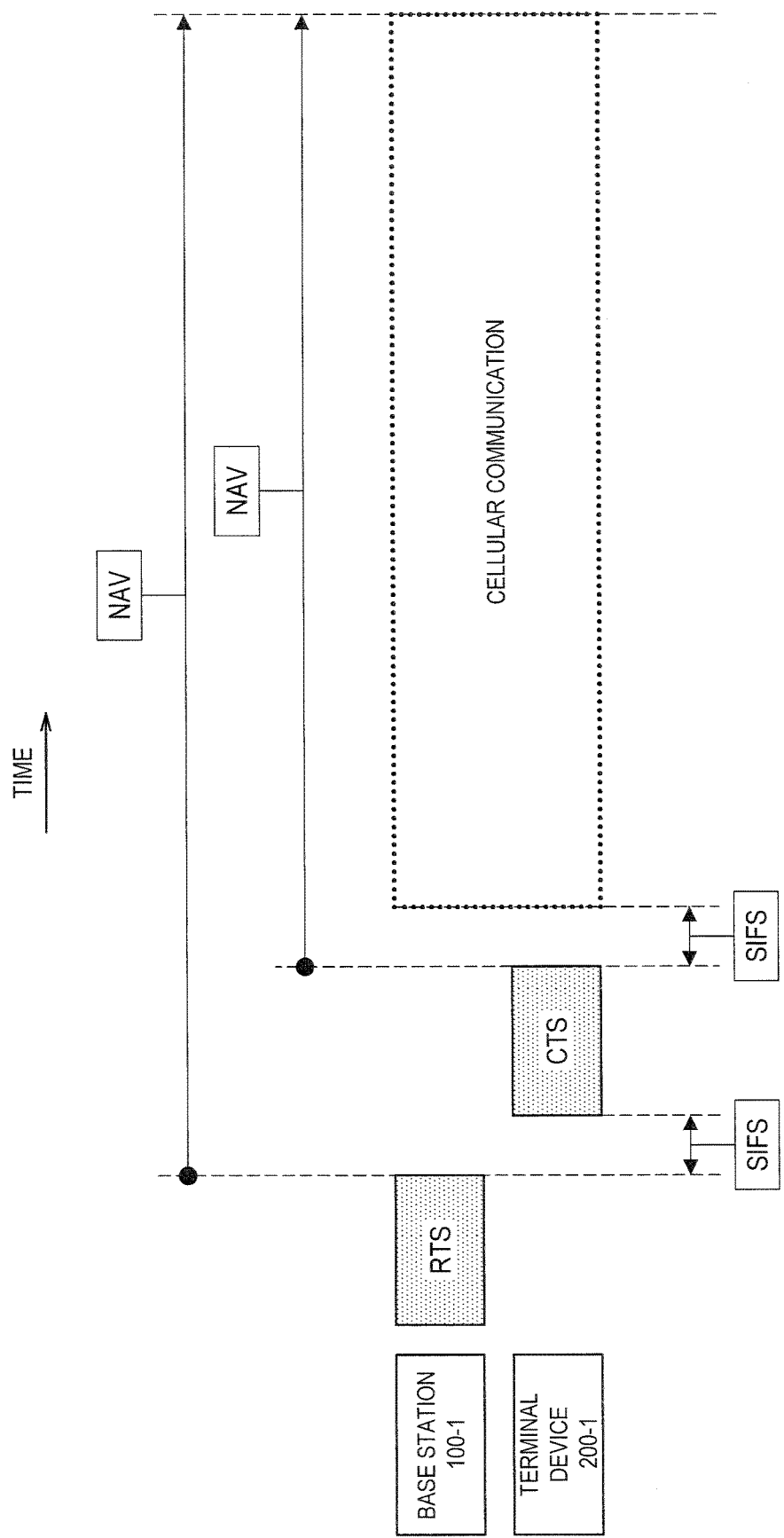
FIG. 13 is an explanatory diagram illustrating a period in which cellular communication is performed using a shared band in a first modified example of the first embodiment.

FIG. 13 is an explanatory diagram illustrating a period in which cellular communication is performed using a shared band in the first modified example of the first embodiment. Referring to FIG. 13, first, the base station 100-1 transmits an RTS frame. Then, the terminal device 200-1 transmits a CTS frame according to the reception of the RTS frame. At a point in time at which the SIFS has elapsed from an end time-point of the transmission (or the reception) of the above-mentioned CTS frame, the base station 100-1 starts the cellular communication with the terminal device 200-1 using the shared band. Also, the base station 100-1 terminates the cellular communication before the passage of a period of the NAV set according to the RTS frame (or the period of the NAV set according to the CTS frame).

(Terminal Device 200-1: Communication Control Unit 241)

In the first modified example, the communication control unit 241 controls the terminal device 200-1 so that the terminal device 200-1 transmits another frame including duration information for setting the NAV using the shared band according to the reception of the above-mentioned frame transmitted using the above-mentioned shared band by the base station 100-1.

Frame

The above-mentioned frame and the above-mentioned other frame have been described in relation to the communication control unit 151 of the base station 100-1. Consequently, redundant description will be omitted here.

Duration Information

As described above, the above-mentioned duration information included in the above-mentioned other frame is information for setting the NAV. For example, the above-mentioned duration information indicates the duration. Also, the duration is a period after the transmission of the above-mentioned frame and covers the period in which the cellular communication is performed using the above-mentioned shared band.

For example, the duration is determined on the basis of the duration information included in the above-mentioned frame (for example, by the communication control unit 241). As an example, a period which is a sum of a length of the above-mentioned other frame and a length of the SIFS shorter than the duration indicated by the duration information included in the above-mentioned frame is determined to be the duration indicated by the above-mentioned duration included in the above-mentioned other frame.

According to the transmission of the above-mentioned other frame including such duration information, for example, it is possible to cause a wireless LAN device for receiving the above-mentioned other frame to set the NAV to cover the period in which the cellular communication is performed using the above-mentioned shared band. Consequently, the use of the above-mentioned frequency band by the wireless LAN device can be prevented while the cellular communication is performed using the above-mentioned shared band.

Timing of Transmission

The above-mentioned other frame, for example, starts to be transmitted at a point in time at which the SIFS has elapsed from an end time-point of the reception of the above-mentioned frame. For example, the communication control unit 241 performs control so that the above-mentioned other frame starts to be transmitted as described above.

(Flow of Process)

Figure 14:
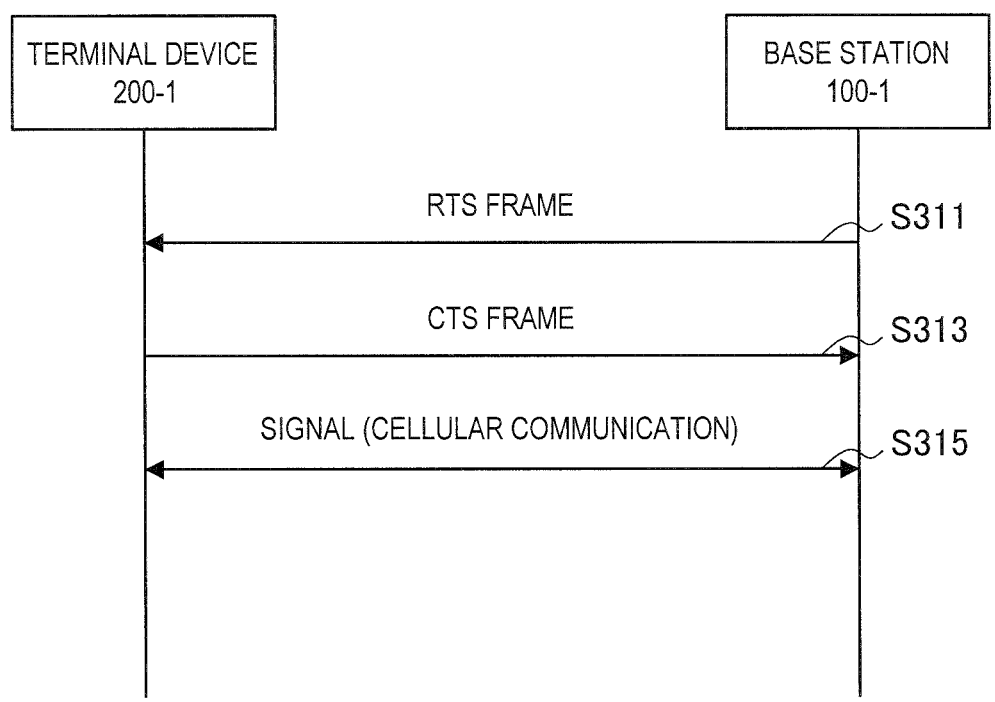
FIG. 14 is a sequence diagram illustrating an example of a schematic flow of a process according to the first modified example of the first embodiment.

FIG. 14 is a sequence diagram illustrating an example of a schematic flow of the process according to the first modified example of the first embodiment. Also, the process is executed, for example, when it is determined that a shared band (that is, a frequency band shared between the cellular communication and the other wireless communication) is used in the cellular communication (for example, by the base station 100-1).

The base station 100-1 transmits an RTS frame using a shared band (S311).

The terminal device 200-1 transmits a CTS frame using the shared band according to the reception of the above-mentioned RTS (S313).

The base station 100-1 and the terminal device 200-1 perform cellular communication using the above-mentioned shared band in a period after the transmission of the CTS frame (S315). That is, the base station 100-1 and the terminal device 200-1 transmit a signal of the cellular communication in the period.

Also, a group of terminal devices 200-1 for transmitting the CTS frame and a group of terminal devices 200-1 for performing cellular communication may be the same, may partially overlap, or may not overlap.

Also, as described above, the base station 100-1 may transmit another type of frame in place of the RTS frame. Also, the terminal device 200-1 may transmit another type of frame in place of the CTS frame.

3.6. Second Modified Example

Hereinafter, the second modified example of the first embodiment will be described with reference to FIGS. 15 and 16.

Summary

In the above-mentioned first embodiment, only the base station 100-1 transmits a frame including duration information for setting an NAV.

On the other hand, in the second modified example of the first embodiment, the base station 100-1 transmits a first frame including duration information for setting the NAV and instructs the terminal device 200-1 to transmit a second frame including duration information for setting the NAV. Also, the terminal device 200-1 transmits the above-mentioned second frame according to the instruction from the base station 100-1. Thereby, for example, a hidden terminal problem can be solved.

Thereby, for example, the hidden terminal problem can be solved. Also, for example, the terminal device 200-1 may not decrypt a frame transmitted by the base station 100-1, and a burden on the terminal device 200-1 can be reduced. Also, for example, the base station 100-1 can freely select the terminal device 200-1 for transmitting the above-mentioned other frame.

(Base Station 100-1: Communication Control Unit 151)

(a) Frame Transmission Using Shared Band

As described above, the communication control unit 151 controls a wireless communication device for performing cellular communication so that the above-mentioned wireless communication device transmits the frame including the duration information for setting the NAV using the above-mentioned shared band.

Wireless Communication Device

Base Station 100-1

Even in the second modified example, the above-mentioned wireless communication device includes the base station 100-1. That is, the communication control unit 151 controls the base station 100-1 so that the base station 100-1 transmits the frame including the duration information for setting the NAV using the above-mentioned shared band. Also, in the second modified example, the above-mentioned frame transmitted by the base station 100-1 is referred to as a "first frame."

Terminal Device 200-1

Particularly, in the second modified example, the above-mentioned wireless communication device includes the terminal device 200-1. That is, the communication control unit 151 controls the terminal device 200-1 so that the terminal device 200-1 transmits a frame including duration information for setting the NAV using the above-mentioned shared band. Also, in the second modified example, the above-mentioned frame transmitted by the terminal device 200-1 is referred to as a "second frame."

Instruction for Terminal Device 200-1

Specifically, for example, the communication control unit 151 instructs the terminal device 200-1 to transmit the second frame using the above-mentioned shared band. For example, the communication control unit 151 uses another frequency band for the cellular system 1 to instruct the terminal device 200-1 to transmit the second frame using the above-mentioned shared band.

As an example, through control by the communication control unit 151, the base station 100-1 transmits a frame transmission instruction message to the terminal device 200-1 using the above-mentioned other frequency band. Thereby, the terminal device 200-1 transmits the above-mentioned second frame using the above-mentioned shared band.

According to the transmission of the above-mentioned second frame by the terminal device 200-1, for example, the hidden terminal problem can be solved.

This is identical to the description of the first modified example.

Also, according to an instruction for the terminal device 200-1, for example, it is unnecessary for the terminal device 200-1 to decrypt the first frame transmitted by the base station 100-1, and a burden of the terminal device 200-1 can be reduced. Also, for example, the base station 100-1 can freely select the terminal device 200-1 which transmits the above-mentioned second frame.

Provision of Timing Information

For example, the communication control unit 151 provides the terminal device 200-1 with information which specifies a timing at which the above-mentioned second frame is transmitted (hereinafter referred to as "timing information").

Specifically, for example, through control by the communication control unit 151, the base station 100-1 transmits the frame transmission instruction message including the above-mentioned timing information to the terminal device 200-1 using the above-mentioned other frequency band.

For example, the above-mentioned timing is any timing after the base station 100-1 transmits the above-mentioned first frame.

According to the provision of the above-mentioned timing information, for example, the base station 100-1 can control the timing of transmission of the second frame by the terminal device 200-1. Also, according to the provision of the above-mentioned timing information, for example, it is possible to cause a plurality of terminal devices 200-1 to simultaneously transmit second frames.

Provision of Duration Information

Also, for example, the communication control unit 151 provides the terminal device 200-1 with the above-mentioned duration information included in the above-mentioned second frame. Alternatively, the communication control unit 151 provides the terminal device 200-1 with information which specifies the duration information.

Specifically, for example, through control by the communication control unit 151, the base station 100-1 transmits a frame transmission instruction message including the above-mentioned duration information included in the above-mentioned second frame (or information which specifies the above-mentioned duration information) to the terminal device 200-1 using the above-mentioned other frequency band.

For example, the duration indicated by the above-mentioned duration information is a duration from a point in time at which the SIFS has elapsed from an end time-point of the transmission of the above-mentioned second frame to a point in time at which the duration indicated by the duration information included in the above-mentioned first frame ends.

According to the provision of the above-mentioned duration information, for example, the base station 100-1 can control a period in which a wireless LAN device for receiving the second frame transmitted by the terminal device 200-1 avoids transmitting a signal.

Frame, Duration Information, Timing of Transmission

The first frame transmitted by the base station 100-1, the duration information included in the first frame, and the transmission timing of the frame are the same as described in the example of the first embodiment. Consequently, redundant description will be omitted here.

Also, the second frame transmitted by the terminal device 200-1, the duration information included in the second frame, and the transmission timing of the frame will be described in relation to the communication control unit 241 of the terminal device 200-2.

(b) Cellular Communication Using Shared Band

As described above, the communication control unit 151 controls the base station 100-1 so that the cellular communication is performed using the above-mentioned shared band in the period after the transmission of the above-mentioned frame.

Period

Start Time-Point of Period

For example, the above-mentioned period after the transmission of the above-mentioned frame is a period after the transmission of the above-mentioned second frame. Thereby, for example, it is possible to avoid interference between cellular communication and wireless LAN communication of a wireless LAN device for receiving a signal of the above-mentioned second frame without receiving a signal of the above-mentioned first frame.

Specific Example

Figure 15:
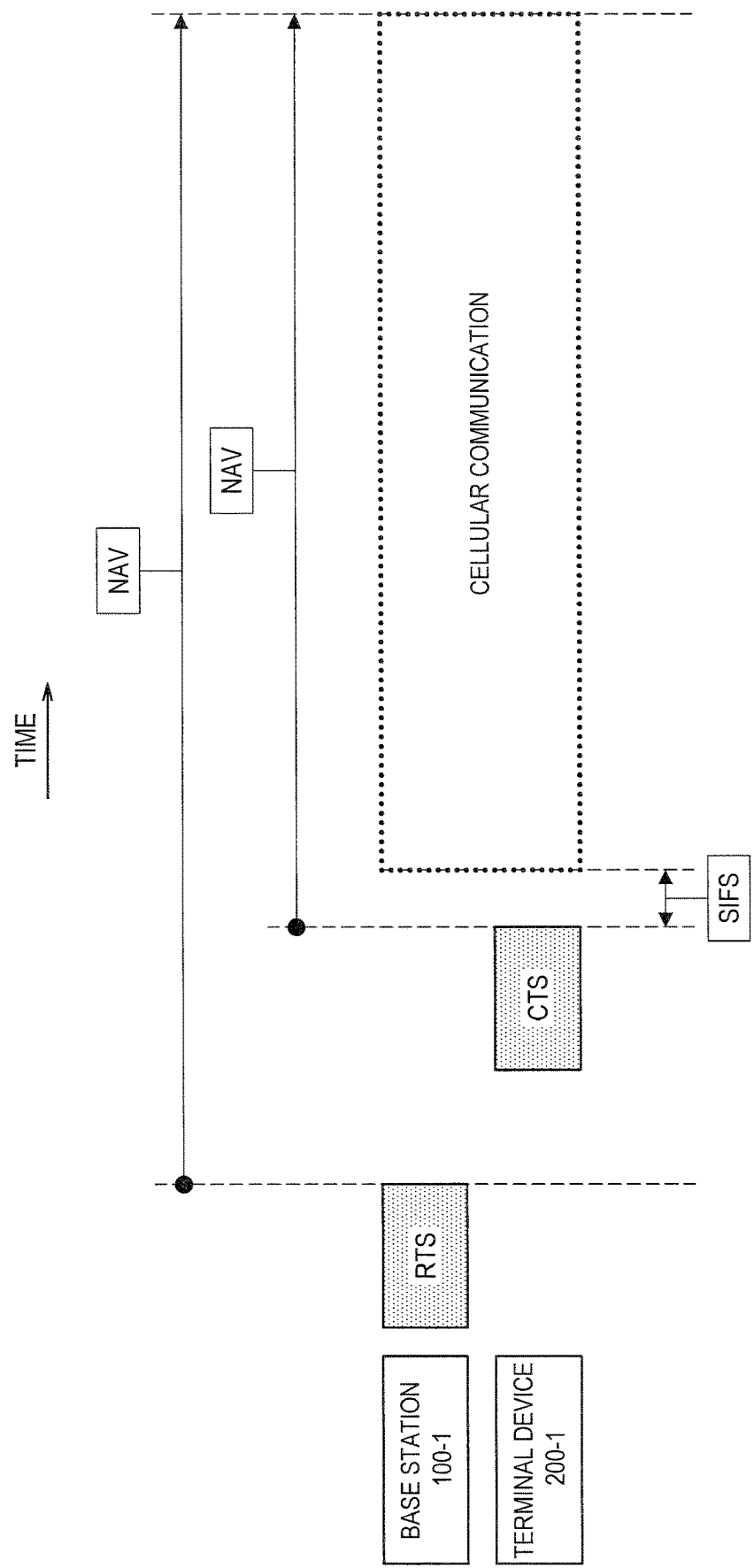
FIG. 15 is an explanatory diagram illustrating a period in which cellular communication is performed using a shared band in a second modified example of the first embodiment.

FIG. 15 is an explanatory diagram illustrating a period in which cellular communication is performed using a shared band in the second modified example of the first embodiment. Referring to FIG. 15, first, the base station 100-1 transmits an RTS frame. Also, the terminal device 200-1 transmits a CTS frame at a timing indicated by timing information provided by the base station 100-1. At a point in time at which the SIFS has elapsed from an end time-point of the transmission (or the reception) of the CTS frame, the base station 100-1 starts the cellular communication with the terminal device 200-1 using the shared band. Also, the base station 100-1 terminates the cellular communication before the passage of a period of an NAV set according to the RTS frame (or the period of the NAV set according to the CTS frame).

(Terminal Device 200-1: Communication Control Unit 241)

In the second modified example, the communication control unit 241 controls the terminal device 200-1 so that the terminal device 200-1 transmits the second frame including the duration information for setting the NAV using the above-mentioned shared band according to an instruction from the base station 100-1.

Frame

For example, the above-mentioned second frame has a duration field and includes the duration information in the duration field.

As an example, the above-mentioned second frame is a CTS frame. As another example, the above-mentioned second frame may be an RTS frame. As still another example, the above-mentioned second frame may be another type of frame similar to the CTS frame and the RTS frame.

Duration Information

As described above, the above-mentioned duration information included in the above-mentioned second frame is information for setting the NAV. For example, the above-mentioned duration information indicates a duration. Also, the duration is a period after the transmission of the above-mentioned second frame and covers the period in which the cellular communication is performed using the above-mentioned shared band. As described above, the above-mentioned duration information is provided, for example, by the base station 100-1.

According to the transmission of the second frame including such duration information, for example, it is possible to cause the wireless LAN device for receiving the second frame to set the NAV to cover the period in which the cellular communication is performed using the above-mentioned shared band. Consequently, the use of the above-mentioned shared band by the wireless LAN device can be prevented while the cellular communication is performed using the above-mentioned shared band.

Also, the duration indicated by the above-mentioned duration information included in the above-mentioned second frame may cover a part of the above-mentioned period in which the cellular communication is performed using the above-mentioned shared band. An additional frame including the duration information for setting the NAV may be transmitted through control by the communication control unit 241 at any timing after the transmission of the above-mentioned second frame. The description of this regard is the same as the corresponding description of the communication control unit 151 according to the first embodiment. Consequently, redundant description will be omitted here.

Timing of Transmission

The above-mentioned second frame is transmitted, for example, at the timing specified from the above-mentioned timing information provided by the base station 100-1.

(Flow of Process)

Figure 16:
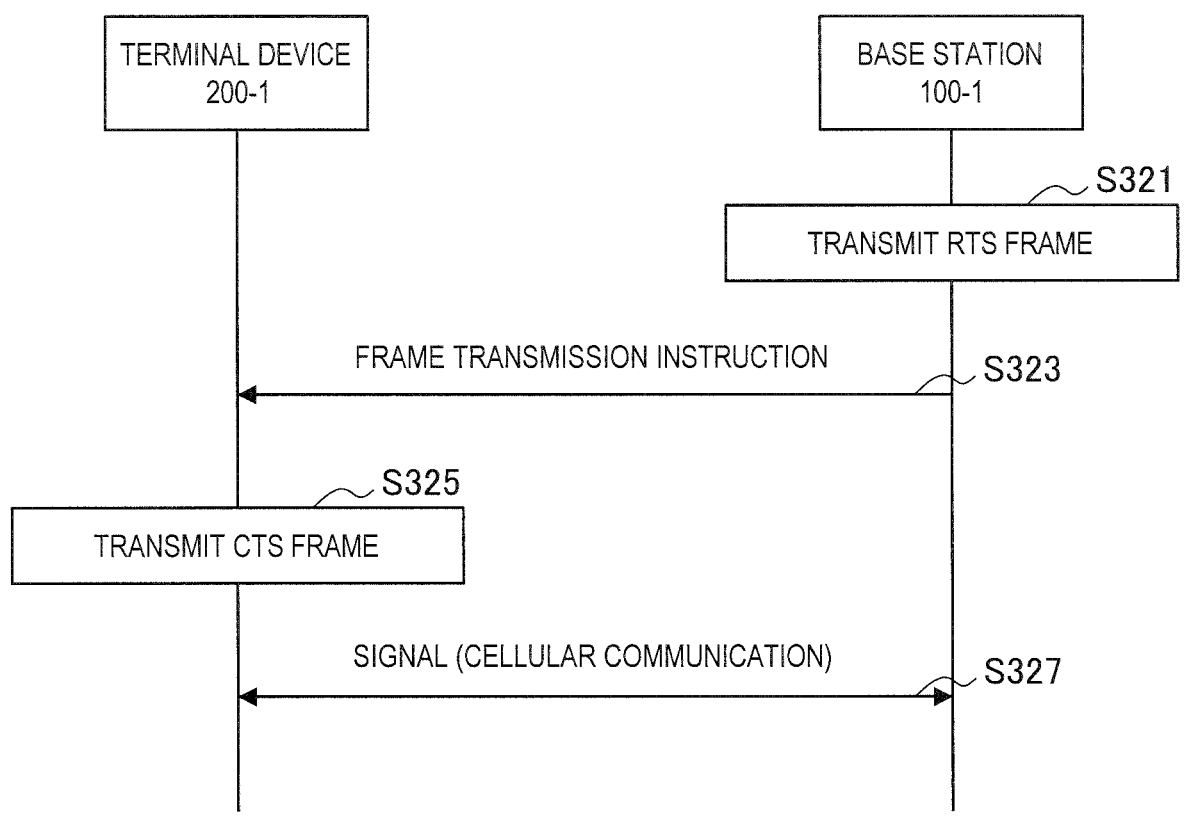
FIG. 16 is a sequence diagram illustrating an example of a schematic flow of a process according to the second modified example of the first embodiment.

FIG. 16 is a sequence diagram illustrating an example of a schematic flow of the process according to the second modified example of the first embodiment. Also, the process is executed, for example, when it is determined (for example, by the base station 100-1) that the shared band (that is, a frequency band shared between the cellular communication and other wireless communication) is used in the cellular communication.

The base station 100-1 transmits an RTS frame using a shared band (S321).

Also, the base station 100-1 transmits a frame transmission instruction message including timing information and duration information to the terminal device 200-1 using another frequency band for the cellular system 1 (S323).

The terminal device 200-1 transmits a CTS frame including the above-mentioned duration information at a timing specified from the above-mentioned timing information (S325).

The base station 100-1 and the terminal device 200-1 perform cellular communication using the above-mentioned shared band in a period after the transmission of the CTS frame (S327). That is, the base station 100-1 and the terminal device 200-1 transmit a signal of the cellular communication in the period.

Also, a group of terminal devices 200-1 for transmitting the CTS frame and a group of terminal devices 200-1 for performing cellular communication may be the same, may partially overlap, or may not overlap.

Also, as described above, the base station 100-1 may transmit another type of frame in place of the RTS frame. Also, the terminal device 200-1 may transmit another type of frame in place of the CTS frame.

3.7. Third Modified Example

Hereinafter, the third modified example of the first embodiment will be described with reference to FIGS. 17 and 18.

Summary

In the above-mentioned example of the first embodiment, only the base station 100-1 transmits a frame including duration information for setting an NAV.

On the other hand, in the third modified example of the first embodiment, the base station 100-1 instructs the terminal device 200-1 to transmit a frame including duration information for setting the NAV. Also, the terminal device 200-1 transmits the above-mentioned frame according to the instruction from the base station 100-1.

(Base Station 100-1: Communication Control Unit 151)

(a) Frame Transmission Using Shared Band

As described above, the communication control unit 151 controls a wireless communication device for performing cellular communication so that the above-mentioned wireless communication device transmits the frame including the duration information for setting the NAV using the above-mentioned shared band.

Wireless Communication Device

Particularly, in the third modified example, the above-mentioned wireless communication device includes the terminal device 200-1. That is, the communication control unit 151 controls the terminal device 200-1 so that the terminal device 200-1 transmits the frame including the duration information for setting the NAV using the above-mentioned shared band.

Also, in the third modified example, the above-mentioned wireless communication device does not include the base station 100-1.

Instruction for Terminal Device 200-1

Specifically, for example, the communication control unit 151 instructs the terminal device 200-1 to transmit the above-mentioned frame using the above-mentioned shared band. For example, the communication control unit 151 uses another frequency band for the cellular system 1 to instruct the terminal device 200-1 to transmit the above-mentioned frame using the above-mentioned shared band.

As an example, through control by the communication control unit 151, the base station 100-1 transmits a frame transmission instruction message to the terminal device 200-1 using the above-mentioned other frequency band. Thereby, the terminal device 200-1 transmits the above-mentioned frame using the above-mentioned shared band.

Provision of Timing Information

For example, the communication control unit 151 provides the terminal device 200-1 with information which specifies the timing at which the above-mentioned frame is transmitted (hereinafter referred to as "timing information").

Specifically, for example, through control by the communication control unit 151, the base station 100-1 transmits the frame transmission instruction message including the above-mentioned timing information to the terminal device 200-1 using the above-mentioned other frequency band.

According to the provision of the above-mentioned timing information, for example, the base station 100-1 can control the timing of the transmission of the frame by the terminal device 200-1. Also, according to the provision of the above-mentioned timing information, for example, it is possible to cause a plurality of terminal devices 200-1 to simultaneously transmit frames.

Provision of Duration Information

Also, for example, the communication control unit 151 provides the terminal device 200-1 with the above-mentioned duration information included in the above-mentioned frame. Alternatively, the communication control unit 151 provides the terminal device 200-1 with information which specifies the duration information.

Specifically, for example, through control by the communication control unit 151, the base station 100-1 transmits a frame transmission instruction message including the above-mentioned duration information included in the above-mentioned frame (or information which specifies the above-mentioned duration information) to the terminal device 200-1 using the above-mentioned other frequency band.

According to the provision of the above-mentioned duration information, for example, the base station 100-1 can control a period in which a wireless LAN device for receiving the above-mentioned frame avoids transmitting of a signal.

Frame, Duration Information, Timing of Transmission

The frame transmitted by terminal device 200-1, the duration information included in the frame, and the transmission timing of the frame will be described in relation to the communication control unit 241 of the terminal device 200-2.

(b) Cellular Communication Using Shared Band

As described above, the communication control unit 151 controls the base station 100-1 so that the cellular communication is performed using the above-mentioned shared band in the period after the transmission of the above-mentioned frame.

Period

Start Time-Point of Period

For example, the above-mentioned period after the transmission of the above-mentioned frame is a period after the transmission of the above-mentioned frame. Thereby, for example, it is possible to avoid interference between cellular communication and wireless LAN communication of a wireless LAN device for receiving a signal of the above-mentioned frame.

Specific Example

Figure 17:
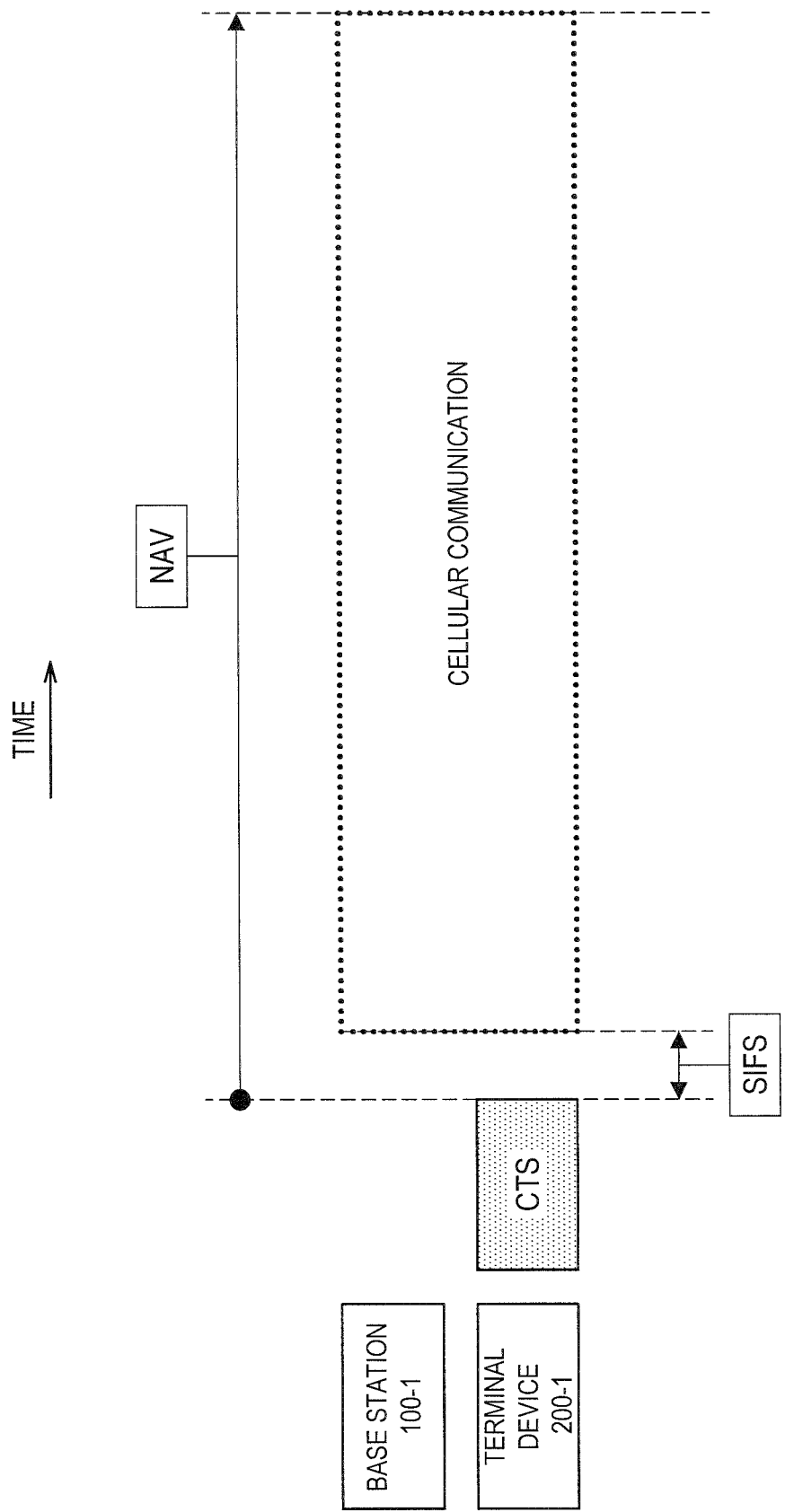
FIG. 17 is an explanatory diagram illustrating a period in which cellular communication is performed using a shared band in a third modified example of the first embodiment.

FIG. 17 is an explanatory diagram illustrating a period in which cellular communication is performed using a shared band in the third modified example of the first embodiment. Referring to FIG. 17, the terminal device 200-1 transmits a CTS frame at a timing indicated by timing information provided by the base station 100-1. At a point in time at which the SIFS has elapsed from an end time-point of the transmission (or the reception) of the CTS frame, the base station 100-1 starts the cellular communication with the terminal device 200-1 using the shared band. Also, the base station 100-1 terminates the cellular communication before the passage of a period of an NAV set according to the CTS frame.

(Terminal Device 200-1: Communication Control Unit 241)

In the third modified example, the communication control unit 241 controls the terminal device 200-1 so that the terminal device 200-1 transmits the frame including the duration information for setting the NAV using the above-mentioned shared band according to an instruction from the base station 100-1.

Frame

For example, the above-mentioned frame has a duration field and includes the duration information in the duration field.

As an example, the above-mentioned frame is a CTS frame. As another example, the above-mentioned frame may be an RTS frame. As still another example, the above-mentioned frame may be another type of frame similar to the CTS frame and the RTS frame.

Duration Information

As described above, the above-mentioned duration information included in the above-mentioned frame is information for setting the NAV. For example, the above-mentioned duration information indicates a duration. Also, the duration is a period after the transmission of the above-mentioned frame and covers the period in which the cellular communication is performed using the above-mentioned shared band. As described above, the duration information is provided, for example, by the base station 100-1.

According to the transmission of the above-mentioned frame including such duration information, for example, it is possible to cause a wireless LAN device for receiving the above-mentioned frame to set the NAV to cover the period in which the cellular communication is performed using the above-mentioned shared band. Consequently, the use of the above-mentioned frequency band by the wireless LAN device can be prevented while the cellular communication is performed using the above-mentioned shared band.

Also, the duration indicated by the above-mentioned duration information included in the above-mentioned frame may cover a part of the above-mentioned period in which the cellular communication is performed using the above-mentioned shared band. An additional frame including the duration information for setting the NAV may be transmitted through control by the communication control unit 241 at any timing after the transmission of the above-mentioned frame. The description of this regard is the same as the corresponding description of the communication control unit 151 according to the first embodiment. Consequently, redundant description will be omitted here.

Timing of Transmission

The above-mentioned frame is transmitted, for example, at the timing specified from the above-mentioned timing information provided by the base station 100-1.

(Flow of Process)

Figure 18:
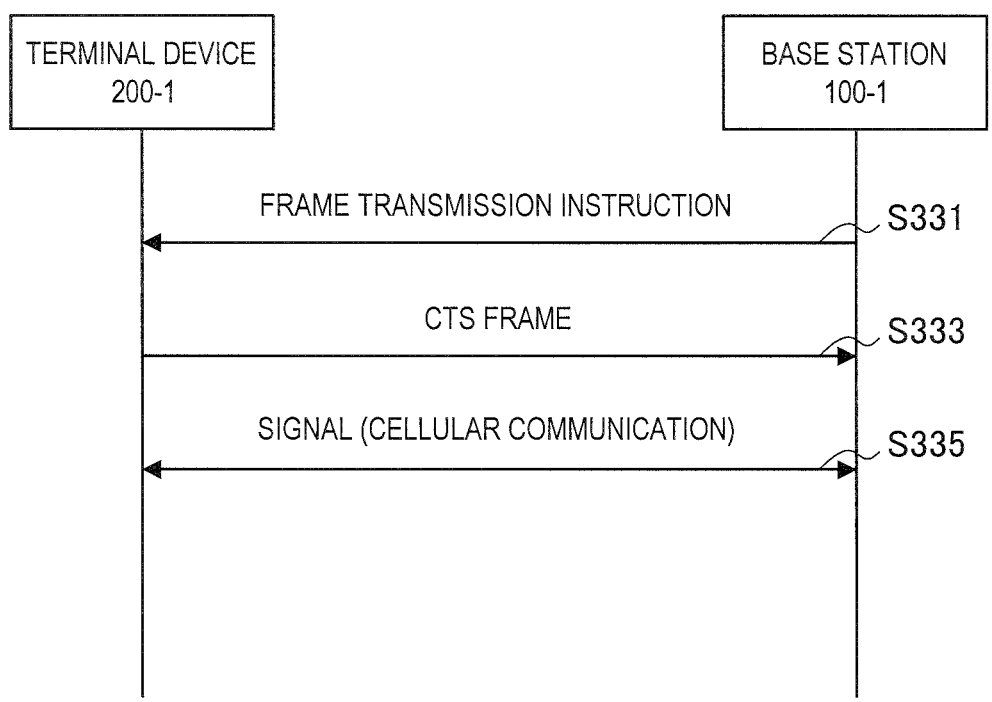
FIG. 18 is a sequence diagram illustrating an example of a schematic flow of a process according to the third modified example of the first embodiment.

FIG. 18 is a sequence diagram illustrating an example of a schematic flow of the process according to the third modified example of the first embodiment. Also, the process is executed, for example, when it is determined (for example, by the base station 100-1) that the shared band (that is, a frequency band shared between the cellular communication and other wireless communication) is used in the cellular communication.

Also, the base station 100-1 transmits a frame transmission instruction message including timing information and duration information to the terminal device 200-1 (S331).

The terminal device 200-1 transmits a CTS frame including the above-mentioned duration information at a timing specified from the above-mentioned timing information (S333).

The base station 100-1 and the terminal device 200-1 perform cellular communication using the above-mentioned shared band in a period after the transmission of the CTS frame (S335). That is, the base station 100-1 and the terminal device 200-1 transmit a signal of the cellular communication in the period.

Also, a group of terminal devices 200-1 for transmitting the CTS frame and a group of terminal devices 200-1 for performing cellular communication may be the same, may partially overlap, or may not overlap.

Also, as described above, the terminal device 200-1 may transmit another type of frame in place of the CTS frame.

4. SECOND EMBODIMENT

Figure 20:
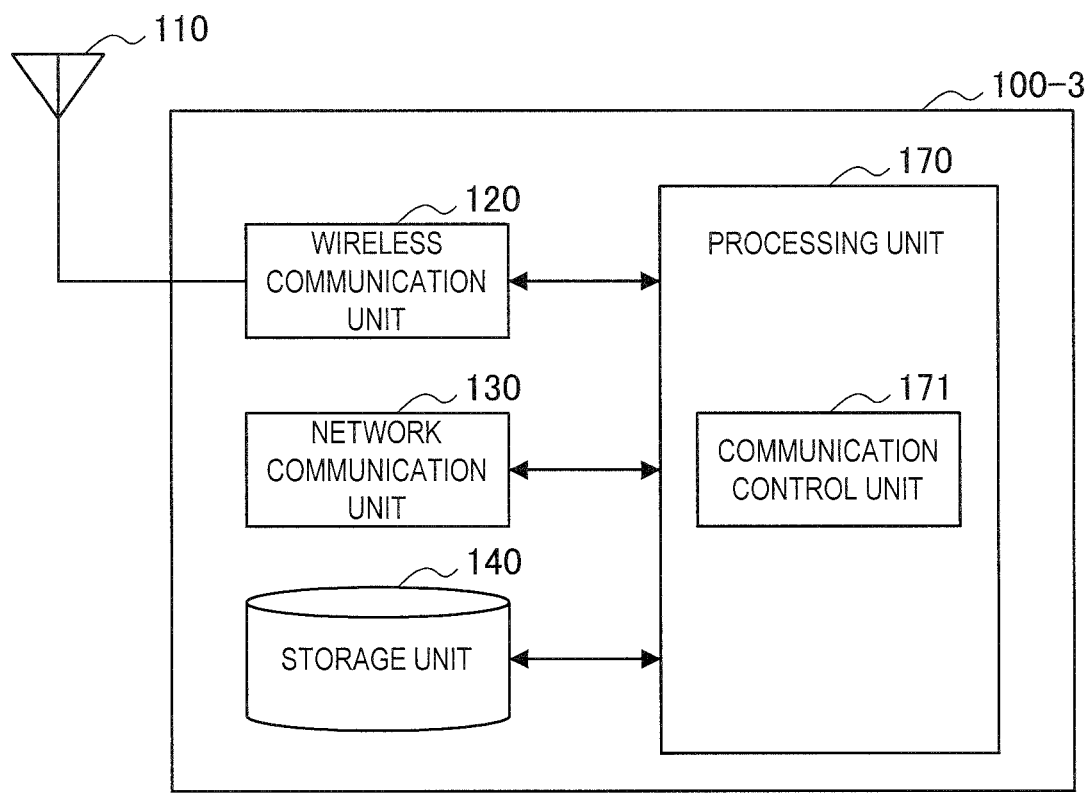
FIG. 20 is a block diagram illustrating an example of a configuration of a base station according to a third embodiment.

Next, the second embodiment of the present disclosure will be described with reference to FIGS. 20 and 21.

4.1. Summary

First, the summary of the second embodiment will be described.

According to the first embodiment, through control by the base station 100-1, the wireless communication device for performing the cellular communication transmits the frame including duration information for setting the NAV using the shared band (that is, a frequency band shared between the cellular communication and wireless LAN communication). Through control by the base station 100-1, the cellular communication is performed using the above-mentioned frequency band in the period after the transmission of the above-mentioned frame. Also, the above-mentioned wireless communication device is the base station 100-1 or the terminal device 200-1.

On the other hand, according to the second embodiment, through control by a terminal device 200-2, a wireless communication device for performing cellular communication transmits a frame including duration information for setting an NAV using a shared band. Through control by the terminal device 200-2, the cellular communication is performed using the above-mentioned frequency band in a period after the transmission of the above-mentioned frame. Also, the above-mentioned wireless communication device is the terminal device 200-2 or another terminal device 200-2.

Thereby, for example, while the shared band (that is, the frequency band shared between the cellular communication and the wireless LAN communication) is used in wireless communication between the terminal devices in the cellular system, the above-mentioned shared band can be prevented from being used in wireless LAN communication.

4.2. Configuration of Terminal Device

Figure 19:
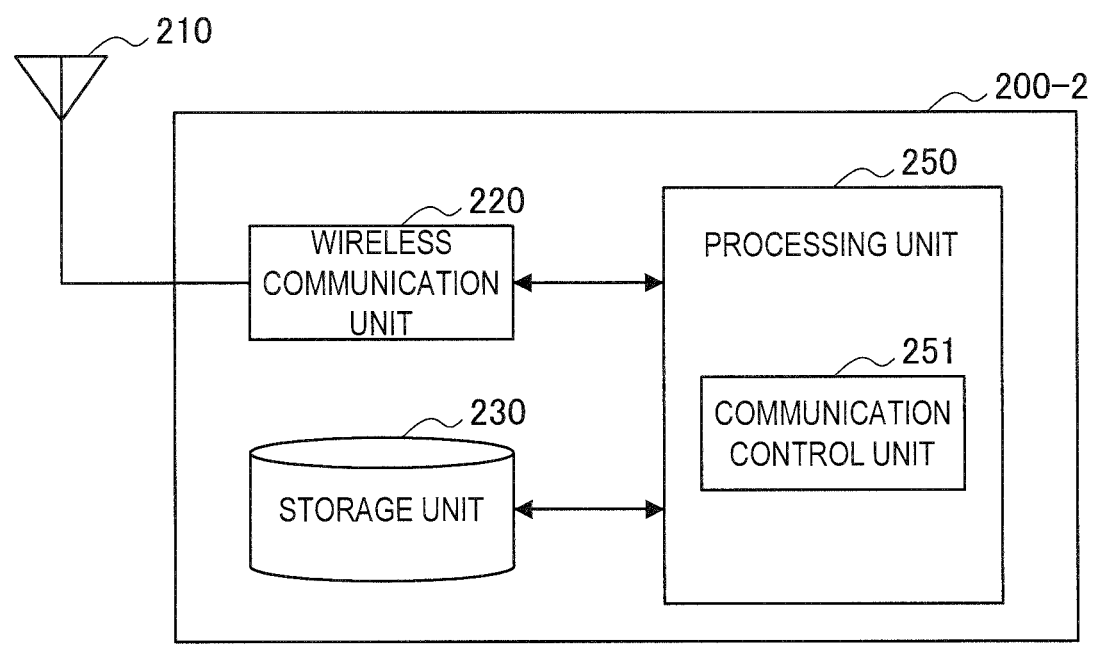
FIG. 19 is a block diagram illustrating an example of a configuration of a terminal device according to the second embodiment.

Next, an example of the configuration of a terminal device 200-2 according to the second embodiment will be described with reference to FIG. 19. FIG. 19 is a block diagram illustrating the example of the configuration of the terminal device 200-2 according to the second embodiment. Referring to FIG. 19, the terminal device 200-2 includes an antenna unit 210, a wireless communication unit 220, a storage unit 230, and a processing unit 250.

Here, the description of the antenna unit 210, the wireless communication unit 220, and the storage unit 230 is not different between the first embodiment and the second embodiment except for a difference of reference signs. Consequently, here, only the processing unit 250 will be described and redundant description will be omitted.

(Processing Unit 250)

The processing unit 250 provides various functions of the terminal device 200-2. The processing unit 250 includes a communication control unit 251. Also, the processing unit 250 can further include another component in addition to the communication control unit 251.

(Communication Control Unit 251)

For example, the terminal device 200-1 operates in a first mode or a second mode, and the communication control unit 251 performs control according to the first mode or the second mode.

(a) First Mode

Frame Transmission Using Shared Band

In the first mode, the communication control unit 251 controls a wireless communication device for performing cellular communication so that the above-mentioned wireless communication device transmits a frame including duration information for setting an NAV using a frequency band shared between cellular communication and wireless LAN communication (that is, a shared band). For example, the above-mentioned wireless communication device includes the terminal device 200-2 (which operates in the first mode) or another terminal device 200-2 (which operates in the second mode).

The description of the communication control unit 251 in this regard is the same as the corresponding description for the communication control unit 151 of the base station 100-1 according to the above-mentioned first embodiment, except for differences related to entities (the base station 100-1 and the terminal device 200-2) which perform control and a control target (that is, the wireless communication device). Consequently, redundant description will be omitted here.

Also, additionally, in the first embodiment, through control by the communication control unit 151 of the base station 100-1, the base station 100-1 or the terminal apparatus 200-1 transmits the above-mentioned frame using the above-mentioned shared band. On the other hand, in the second embodiment, the terminal device 200-1 or the other terminal device 200-1 transmits the above-mentioned frame using the above-mentioned shared band through control by the communication control unit 251 of the terminal device 200-2. However, the description of the technique of the control, the frame to be transmitted, the duration information, and the timing of the transmission are the same, for example, between the first and second embodiments.

Cellular Communication Using Shared Band

In the first mode, the communication control unit 251 controls the terminal device 200-2 so that the cellular communication is performed using the above-mentioned shared band in the period after the transmission of the above-mentioned frame.

For example, the communication control unit 251 controls the terminal device 200-2 so that the wireless communication between terminal devices in the cellular system 1 is performed using the above-mentioned shared band in the above-mentioned period.

The description of the communication control unit 251 in this regard is the same as the corresponding description for the communication control unit 151 of the base station 100-1 according to the above-mentioned first embodiment, except for differences related to the entities (the base station 100-1 and the terminal device 200-2) which perform control and a type of cellular communication. Consequently, redundant description will be omitted here.

Also, additionally, in the first embodiment, through control by the communication control unit 151 of the base station 100-1, cellular communication between the base station 100-1 and the terminal apparatus 200-1 is performed using the above-mentioned shared band. On the other hand, in the second embodiment, the cellular communication between the terminal device 200-2 and the other terminal device 200-2 is performed using the above-mentioned shared band through control by the communication control unit 251 of the terminal device 200-2. However, the description of the period and the duplex operation are the same, for example, between the first and second embodiments.

(b) Second Mode

Frame Transmission Using Shared Band

In the second mode, the communication control unit 251 controls the terminal device 200-1 so that the terminal device 200-2 transmits a frame including duration information for setting an NAV using the above-mentioned shared band.

For example, the communication control unit 251 controls the terminal device 200-1 so that the terminal device 200-2 transmits a frame including duration information for setting the NAV using the above-mentioned shared band according to the reception of the frame (that is, the frame including the duration information for setting the NAV) transmitted using the above-mentioned shared band by the terminal device 200-2 (which operates in the first mode).

Also, for example, the communication control unit 251 controls the terminal device 200-2 so that the terminal device 200-2 transmits the frame including the duration information for setting the NAV using the above-mentioned shared band according to an instruction from the terminal device 200-2 (which operates in the first mode).

The description of the communication control unit 251 in this regard is the same as the corresponding description for the communication control unit 241 of the terminal device 200-1 according to the above-mentioned first embodiment, except for differences related to a partner device (the base station 100-1 and the terminal device 200-2 (which operates in the first mode)). Consequently, redundant description will be omitted here.

Also, additionally, in the first embodiment, through control by the communication control unit 241 of the terminal device 200-1, the terminal device 200-1 transmits a frame including duration information for setting the NAV using the above-mentioned shared band according to a frame transmitted by the base station 100-1 or an instruction from the base station 100-1. On the other hand, in the second embodiment, through control by the communication control unit 251 of the terminal device 200-2, the terminal device 200-2 (which operates in the second mode) transmits a frame including duration information for setting the NAV using the above-mentioned shared band according to a frame transmitted by another terminal device 200-2 (which operates in the first mode) or an instruction from the other terminal device 200-2. However, the description of the technique of the control, the frame to be transmitted, the duration information, and the timing of the transmission are the same, for example, between the first and second embodiments.

Also, in the first embodiment, for example, frame transmission and cellular communication are performed between the base station 100-1 and the terminal device 200-1, for example, in FIGS. 7, 8, 9, 10, 13, 15, 17, and 20. On the other hand, in the second embodiment, for example, the frame transmission/reception and the cellular communication (wireless communication between the terminal devices in the cellular system) between the terminal device 200-2 (which operates in the first mode) and the terminal device 200-2 (which operates in the second mode) are similarly performed.

4.3. Flow of Process

The example of the process according to the second embodiment is the same as the examples of the process described with reference to FIGS. 12, 14, 16, and 18, except for differences related to the entities. Consequently, redundant description will be omitted here.

Also, additionally, the process according to the first embodiment is a process by the base station 100-1 and the terminal device 200-1, and the process according to the second embodiment is a process by the terminal device 200-2 (which operates in the first mode) and the terminal device 200-2 (which operates in the second mode).

5. THIRD EMBODIMENT

Next, the third embodiment of the present disclosure will be described with reference to FIGS. 20 to 28.

5.1. Summary

First, the summary of the third embodiment will be described.

Problem According to Third Embodiment

For example, a device for performing wireless LAN communication can transmit a signal (for example, a signal of an RTS frame) using a frequency band (channel) when a period in which no signal is transmitted using the frequency band reaches a sum of a DIFS and a backoff time. For example, the DIFS is shorter than a symbol of LTE (an OFDM symbol or an SC-FDMA symbol).

For example, a frequency band (for example, a channel of a wireless LAN) is shared between the cellular communication and the wireless LAN communication. In this case, for example, it may be impossible to transmit any signal of the cellular system using the above-mentioned frequency band in any symbol even while the above-mentioned frequency band is used in the cellular communication. Thus, the device for performing the wireless LAN communication is likely to transmit a signal (for example, a signal of an RTS frame) using the above-mentioned frequency band even while the above-mentioned frequency band is used in cellular communication. Thus, the interference between the cellular communication and the wireless LAN communication occurs in the above-mentioned frequency band and the communication quality of the above-mentioned cellular communication and/or the above-mentioned other wireless communication is likely to deteriorate.

Therefore, it is desirable to provide a mechanism for enabling the frequency band shared between the cellular communication and the other wireless communication to be more appropriately used in the cellular system. More specifically, it is desirable to provide a mechanism capable of preventing the above-mentioned frequency band from being used in the above-mentioned other wireless communication while the frequency band shared between the cellular communication and the other wireless communication (for example, wireless LAN communication) is used in the cellular communication.

Characteristics of Third Embodiment

According to the third embodiment, at any time, a wireless communication device for performing cellular communication is controlled so that the above-mentioned wireless communication device transmits a signal using a frequency band shared between the cellular communication and other wireless communication (that is, a shared band). Thereby, for example, it is possible to prevent the above-mentioned frequency band from being used in the above-mentioned other wireless communication while the frequency band shared between the cellular communication and the other wireless communication (for example, wireless LAN communication) is used in the cellular communication.

5.2. Configuration of Base Station

Next, an example of the configuration of a base station 100-3 according to the third embodiment will be described with reference to FIGS. 20 to 25. FIG. 20 is a block diagram illustrating an example of the configuration of the base station 100-3 according to the third embodiment. Referring to FIG. 20, the base station 100-3 is equipped with an antenna unit 110, a wireless communication unit 120, a network communication unit 130, a storage unit 140, and a processing unit 170.

Here, the description of the antenna unit 110, the wireless communication unit 120, the network communication unit 130, and the storage unit 140 is not different between the first embodiment and the third embodiment, except for a difference of reference signs. Consequently, here, only the processing unit 170 will be described and redundant description will be omitted.

(Processing unit 170)

The processing unit 170 provides various functions of the base station 100-3. The processing unit 170 includes a communication control unit 171. Also, the processing unit 170 can further include another component in addition to the communication control unit 171.

(Communication Control Unit 171)

The communication control unit 171 controls a wireless communication device for performing the cellular communication so that the above-mentioned wireless communication device transmits a signal using the above-mentioned shared at any time. The above-mentioned shared band is a frequency band shared between wireless communication (that is, a cellular communication) of the cellular system 1 and other wireless communication.

(a) Other Wireless Communication

For example, the above-mentioned wireless communication is wireless communication (that is, wireless LAN communication) conforming to a wireless LAN standard. In this case, the above-mentioned shared band is shared between the cellular communication and the wireless LAN communication. The above-mentioned shared band is, for example, a channel of a wireless LAN.

(b) Unit of Time

The communication control unit 171 controls the above-mentioned wireless communication device so that the above-mentioned wireless communication device transmits a signal using the above-mentioned shared band in each symbol. The above-mentioned symbol is, for example, an OFDM symbol or an SC-FDMA symbol.

Thereby, for example, it is possible to eliminate a non-signal time.

(c) Wireless Communication Device

The above-mentioned wireless communication device is at least one of the base station 100-3 and the terminal device 200-3.

Case of FDD

Downlink Band

As a first example, the FDD is adopted in the cellular system 1 (that is, the duplex operation of the cellular system 1 is the FDD) and the above-mentioned shared band is used as the downlink band in the cellular system 1. In this case, the above-mentioned wireless communication device is the base station 100-3. That is, the communication control unit 171 controls the base station 100-3 so that the base station 100-3 transmits a signal using a shared band (downlink band) at any time.

Specifically, for example, the communication control unit 171 maps a signal to one or more resource elements within the above-mentioned shared band in each symbol. Thereby, the base station 100-3 transmits the signal using the above-mentioned shared band in each symbol.

Uplink Band

As a second example, the FDD is adopted in the cellular system 1 (that is, the duplex operation of the cellular system 1 is the FDD) and the above-mentioned shared band is used as the uplink band in the cellular system 1. In this case, the above-mentioned wireless communication device is a terminal device 200-3. That is, the communication control unit 171 controls the terminal device 200-3 so that the base station 100-3 transmits a signal using the above-mentioned shared band (uplink band) at any time.

Specifically, for example, the communication control unit 171 instructs the terminal device 200-3 to transmit a signal using the above-mentioned shared band at any time for the uplink.

Thereby, for example, the terminal device 200-3 can transmit a signal using the above-mentioned shared band at any time (in each symbol). Also, for example, this instruction can be performed according to RRC signaling or system information.

Case of TDD

As a third example, the TDD is adopted in the cellular system 1 (that is, the duplex operation of the cellular system 1 is the TDD) and the above-mentioned shared band is used as the downlink and uplink bands in the cellular system 1. In this case, the above-mentioned wireless communication device is the base station 100-3 and the terminal device 200-3.

For example, the communication control unit 171 controls the base station 100-3 so that the base station 100-3 transmits a signal using the above-mentioned shared band at any downlink time. Specifically, for example, the communication control unit 171 maps a signal to one or more resource elements within the above-mentioned shared band in each symbol for a downlink sub-frame. Thereby, the base station 100-3 transmits a signal using the above-mentioned shared band in each symbol within the downlink sub-frame.

Also, for example, the communication control unit 171 controls the terminal device 200-3 so that the terminal device 200-3 transmits a signal using the above-mentioned shared band at any uplink time. Specifically, for example, the communication control unit 171 instructs the terminal device 200-3 to transmit a signal using the above-mentioned shared band at any time for the uplink. Thereby, for example, the terminal device 200-3 can transmit a signal using the above-mentioned shared band at any uplink time (in each symbol within the uplink sub-frame). Also, for example, this instruction can be performed according to RRC signaling or system information.

(d) Transmission Power

For example, the communication control unit 171 controls the above-mentioned wireless communication device so that transmission power of a signal to be transmitted using the above-mentioned shared band is greater than or equal to predetermined transmission power at any time.

For example, the above-mentioned wireless communication device is a base station 100-3 and the communication control unit 171 controls the base station 100-3 so that the transmission power of the signal to be transmitted using the above-mentioned shared band is greater than or equal to the predetermined transmission power at any time for the downlink. Specifically, for example, the communication control unit 171 allocates power greater than or equal to the above-mentioned predetermined transmission power to the signal to be transmitted using the above-mentioned shared band in each symbol.

Also, for example, the above-mentioned wireless communication system is the terminal device 200-3 and the communication control unit 171 controls the terminal device 200-3 so that the transmission power of the signal to be transmitted using the above-mentioned shared band is greater than or equal to the predetermined transmission power at any time for the uplink. Specifically, for example, the communication control unit 171 indicates the transmission power of a signal to be transmitted using the above-mentioned shared band to the terminal device 200-3.

Thereby, for example, in a device for performing other wireless communication (for example, wireless LAN communication), reception power of the above-mentioned signal can reach desired power. As a result, the device can more reliably avoid the transmission of a signal using the above-mentioned shared band.

(e) Technique of Transmission of Signal

Transmission of Dummy Signal

For example, the communication control unit 171 controls the base station 100-3 so that the base station 100-3 transmits a dummy signal using the above-mentioned shared band in at least a symbol in which neither a data signal nor a control signal of the cellular system 1 is transmitted using the above-mentioned shared band. Thereby, for example, it is possible to reliably transmit a signal in each symbol of downlink.

Also, the above-mentioned dummy signal is, for example, any signal other than signals (a control signal and a data signal) of the cellular system. The above-mentioned dummy signal is a busy tone for a device for performing wireless LAN communication.

Transmission of Dummy Signal in Some Radio Resources

For example, the communication control unit 171 controls the base station 100-3 so that the base station 100-3 transmits the above-mentioned dummy signal in some radio resources among radio resources arranged in a frequency direction across the above-mentioned shared band in at least the above-mentioned symbol.

Specifically, for example, the communication control unit 171 maps a dummy signal to one or more resource elements (REs) within the above-mentioned shared band in at least a symbol in which a data signal and a control signal are not transmitted.

Transmission in Some Resource Blocks (RBs)

For example, some radio resources mentioned above are some RBs among RBs arranged in a frequency direction across the above-mentioned shared band. That is, the base station 100-3 transmits a dummy signal in some RBs among the RBs arranged in the frequency direction across the above-mentioned shared band. Hereinafter, in this regard, a specific example will be described with reference to FIGS. 21 and 22.

FIG. 21 is an explanatory diagram illustrating an example of some RBs in which a dummy signal is transmitted. Referring to FIG. 21, a shared band 71 and RBs arranged across a plurality of slots are illustrated. In this example, a dummy signal is transmitted in one specific RB among the RBs arranged in the frequency direction across the shared band 71 within each slot. Also, no dummy signal is transmitted in the other RBs.

FIG. 22 is an explanatory diagram illustrating a first example of an RE in which a dummy signal is transmitted. Referring to FIG. 22, one of some RBs in which the dummy signal (for example, illustrated in FIG. 21) is transmitted is illustrated. In this example, the dummy signal is transmitted in all REs other than a cell-specific reference signal (CRS) RE among REs included in the RB.

Thereby, for example, it is possible to allocate an RB in which no dummy signal is transmitted. Consequently, backward compatibility can be more easily secured.

Also, the dummy signal is transmitted in only one RB in the example of FIG. 21, but, of course, the dummy signal may be transmitted in two or more RBs. Also, an RB band in which the dummy signal is transmitted is common between slots in the example of FIG. 21, but, of course, the RB band in which the dummy signal is transmitted may be different between slots.

Also, the dummy signal is transmitted in all REs except for a CRS RE in the RB in the example of FIG. 22, but, of course, the dummy signal may be transmitted in some REs in the RB. As an example, no dummy signal may be transmitted in one or more sub-carriers among 12 sub-carriers of the RB. As another example, no dummy signal may be transmitted in one or more symbols in which another signal is transmitted. As a specific example, no dummy signal may be transmitted in one or more symbols (that is, first to third OFDM symbols in a first slot of a sub-frame) in which signals of control channels such as a PDCCH and a PCFICH are transmitted. Also, as still another specific example, no dummy signal may be transmitted in one or more symbols in which a data signal is transmitted.

Transmission in Each RB

Also, some radio resources mentioned above may be some REs included in each RB arranged in the frequency direction across the above-mentioned shared band. That is, the base station 100-3 may transmit a dummy signal in some REs included in each RB arranged in the frequency direction across the above-mentioned shared band. Hereinafter, in this regard, a specific example will be described with reference to FIG. 23.

FIG. 23 is an explanatory diagram illustrating a second example of an RE in which a dummy signal is transmitted. Referring to FIG. 23, an RB when a dummy signal is transmitted in each RB is illustrated. In this example, the dummy signal is transmitted in one or two specific REs among 12 REs arranged in the frequency direction across an RB within each symbol. Also, no dummy signal is transmitted in other REs.

Also, a dummy signal is transmitted in only REs of two sub-carriers in the example of FIG. 23, but, of course, the dummy signal may be transmitted in an RE of one sub-carrier or may be transmitted in REs of three or more sub-carriers. Also, a sub-carrier of an RE in which the dummy signal is transmitted is common between symbols in the example of FIG. 23, but, of course, the sub-carrier of the RE in which the dummy signal is transmitted may be different between symbols. Also, no dummy signal may be transmitted in one or more symbols in which another signal is transmitted among seven symbols of an RB. As a specific example, no dummy signal may be transmitted in one or more symbols (that is, first to third OFDM symbols of a first slot of a sub-frame) in which signals of control channels such as the PDCCH and the PCFICH are transmitted. As another specific example, no dummy signal may be transmitted in one or more symbols in which the data signal is transmitted.

(f) Transmission of Signal by Plurality of Terminal Devices

Instruction for Plurality of Terminal Devices

For example, the communication control unit 171 instructs each of the plurality of terminal devices 200-3 to transmit a signal using the above-mentioned shared band at any time for the uplink. For example, this instruction can be performed according to RRC signaling or system information.

Thereby, for example, because the plurality of terminal devices 200-3 transmit signals, the signals reach a wider area. Thus, the transmission of a signal using the above-mentioned shared band by the device for performing other wireless communication (for example, wireless LAN communication) can be more reliably suppressed.

Radio Resource for Transmitting Dummy Signal

Also, for example, the communication control unit 171 instructs a plurality of terminal devices to transmit the above-mentioned dummy signal in some radio resources among radio resources arranged in a frequency direction across the above-mentioned shared band in at least a symbol in which neither a data signal nor a control signal of the cellular system 1 is transmitted using the above-mentioned shared band for the uplink.

Specifically, for example, the communication control unit 171 instructs the plurality of terminal devices to transmit the dummy signal. Also, the communication control unit 171 designates a radio resource for transmitting the dummy signal at the time of such an instruction.

Common Radio Resource

Some radio resources mentioned above are common among a plurality of terminal devices 200-3. That is, the communication control unit 171 instructs the plurality of terminal devices 200-3 to transmit the above-mentioned dummy signals in a common radio resource among the above-mentioned plurality of terminal devices 200-3 in at least the above-mentioned symbol for the uplink. Hereinafter, a specific example of the radio resource will be described with reference to FIG. 24.

FIG. 24 is an explanatory diagram illustrating a first example of radio resources in which dummy signals are transmitted by the plurality of terminal devices 200-3. Referring to FIG. 24, a shared band 71 and RBs arranged across a plurality of slots are illustrated. In this example, the plurality of terminal devices 200-3 transmit the dummy signals in the same RB among the RBs arranged in the frequency direction across the shared band 71 within each slot.

Thereby, for example, in the cellular system 1, it is possible to allocate more RBs in which no dummy signal is transmitted.

Separate Radio Resources

Also, some radio resources mentioned above may be different between at least two of the plurality of terminal devices 200-3. That is, the communication control unit 171 may instruct the at least two of the plurality of terminal devices 200-3 to transmit the above-mentioned dummy signals in different radio resources. Hereinafter, a specific example of the radio resource will be described with reference to FIG. 25.

FIG. 25 is an explanatory diagram illustrating a second example of radio resources in which dummy signals are transmitted by the plurality of terminal devices 200-3. Referring to FIG. 25, a shared band 71 and RBs arranged across a plurality of slots are illustrated. In this example, first to third terminal devices 200-3 transmit dummy signals in different RBs among the RBs arranged in the frequency direction across the shared band 71 within each slot.

As described above, the communication control unit 171 controls a wireless communication device for performing the cellular communication so that the above-mentioned wireless communication device transmits a signal using the shared band at any time. Thereby, for example, while a frequency band shared between the cellular communication and other wireless communication (for example, wireless LAN communication) (that is, a shared band) is used in the cellular communication, it is possible to prevent the above-mentioned frequency band from being used in the above-mentioned other wireless communication. Also, according to this technique, for example, a wireless LAN communication device which cannot set the NAV can be prevented from using the above-mentioned frequency band (that is, the shared band).

5.3. Configuration of Base Station

Figure 26:
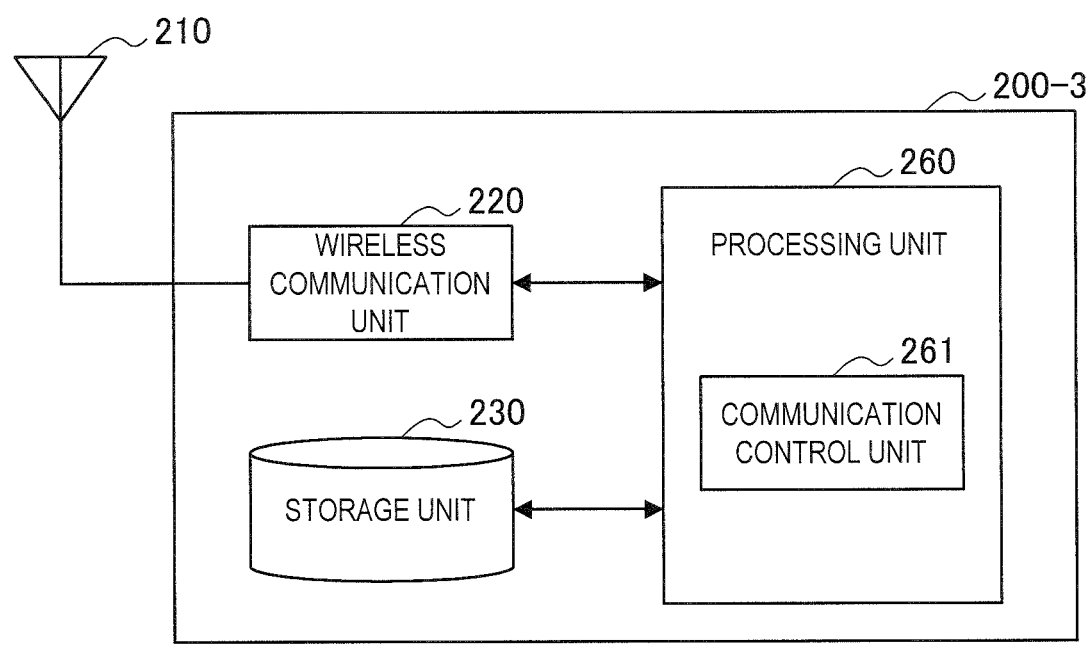
FIG. 26 is a block diagram illustrating an example of a configuration of a terminal device according to the third embodiment.

Next, an example of the configuration of terminal device 200-3 according to the third embodiment will be described with reference to FIG. 26. FIG. 26 is a block diagram illustrating an example of the configuration of the terminal device 200-3 according to the third embodiment. Referring to FIG. 26, the terminal device 200-3 is equipped with an antenna unit 210, a wireless communication unit 220, a storage unit 230, and a processing unit 260.

Here, the description of the antenna unit 210, the wireless communication unit 220, and the storage unit 230 is not different between the first embodiment and the third embodiment, except for a difference of reference signs. Consequently, here, only the processing unit 260 will be described and redundant description will be omitted.

(Processing Unit 260)

The processing unit 260 provides various functions of the terminal device 200-3. The processing unit 260 includes a communication control unit 261. Also, the processing unit 260 can further include another component in addition to the communication control unit 261.

(Communication Control Unit 261)

The communication control unit 261 controls the terminal device 200-3 so that the terminal device 200-3 transmits a signal using a shared band at any time for the uplink. The above-mentioned shared band is a frequency band to be shared between cellular communication and other wireless communication.

Also, the above-mentioned frequency band is an uplink band when an FDD is adopted or downlink and uplink bands when a TDD is adopted.

(a) Other Wireless Communication and Unit of Time

For example, the above-mentioned other wireless communication is wireless communication (that is, wireless LAN communication) conforming to the wireless LAN standard.

Also, for example, the communication control unit 261 controls the terminal device 200-3 so that the terminal device 200-3 transmits a signal using the above-mentioned shared band in each symbol. The above-mentioned symbol is, for example, an SC-FDMA symbol.

(b) Trigger of Control

For example, the communication control unit 261 controls the terminal device 200-3 so that the terminal device 200-3 transmits a signal using a shared band at any time according to an instruction by the base station 100-3.

(c) Transmission Power

For example, the communication control unit 261 controls the terminal device 200-3 so that transmission power of a signal to be transmitted using the above-mentioned shared band is greater than or equal to predetermined transmission power at any time. Specifically, for example, the communication control unit 261 allocates power greater than or equal to the above-mentioned predetermined transmission power to a signal to be transmitted using the above-mentioned shared band in each symbol. Also, for example, the predetermined transmission power is indicated by the base station 100-3.

Thereby, for example, in a device for performing other wireless communication (for example, wireless LAN communication), reception power of the above-mentioned signal can reach desired power. As a result, the device can reliably avoid the transmission of a signal using the above-mentioned shared band.

(d) Technique of Transmission of Signal

Transmission of Dummy Signal

For example, the communication control unit 261 controls the terminal device 200-3 so that the terminal device 200-3 transmits a dummy signal using the above-mentioned shared band in at least a symbol in which neither a data signal nor a control signal of the cellular system 1 is transmitted using the above-mentioned shared band. Thereby, for example, it is possible to reliably transmit a signal in each symbol of uplink.

Also, the description of a specific technique of transmission of a dummy signal by the terminal device 200-3 is the same as the description of the specific technique of transmission of a dummy signal by the base station 100-3 described above, except for a difference related to a link direction (downlink and uplink). Consequently, here, redundant description will be omitted.

As described above, the communication control unit 261 controls the terminal device 200-3 so that the terminal device 200-3 transmits a signal using the shared band at any time. Thereby, it is possible to prevent a frequency band shared between cellular communication and other wireless communication (for example, wireless LAN communication) (that is, a shared band) from being used in the above-mentioned other wireless communication, for example, while the above-mentioned frequency band is used in the uplink communication.

5.4. Flow of Process

Next, an example of a process according to the third embodiment will be described with reference to FIGS. 27 and 28.

(Process by Base Station)

Figure 27:
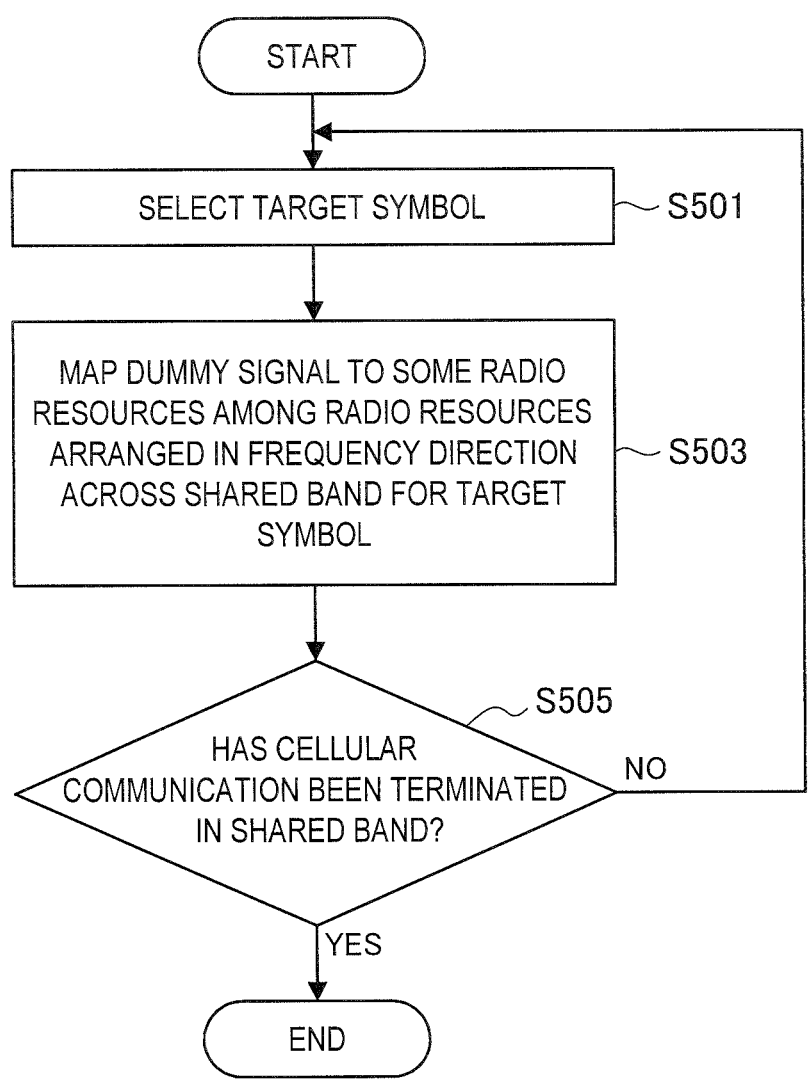
FIG. 27 is a flowchart illustrating an example of a schematic flow of a process by a base station according to the third embodiment.

FIG. 27 is a flowchart illustrating an example of a schematic flow of a process by the base station 100-3 according to the third embodiment.

The communication control unit 171 selects a target symbol (S501).

The communication control unit 171 maps a dummy signal to some radio resources among radio resources arranged in the frequency direction across the shared band for the target symbol (S503).

When cellular communication using the shared band has been terminated (S505: YES), the process ends. Otherwise (S505: NO), the communication control unit 171 selects the next symbol as the target symbol (S501).

(Process by Terminal Device)

Figure 28:
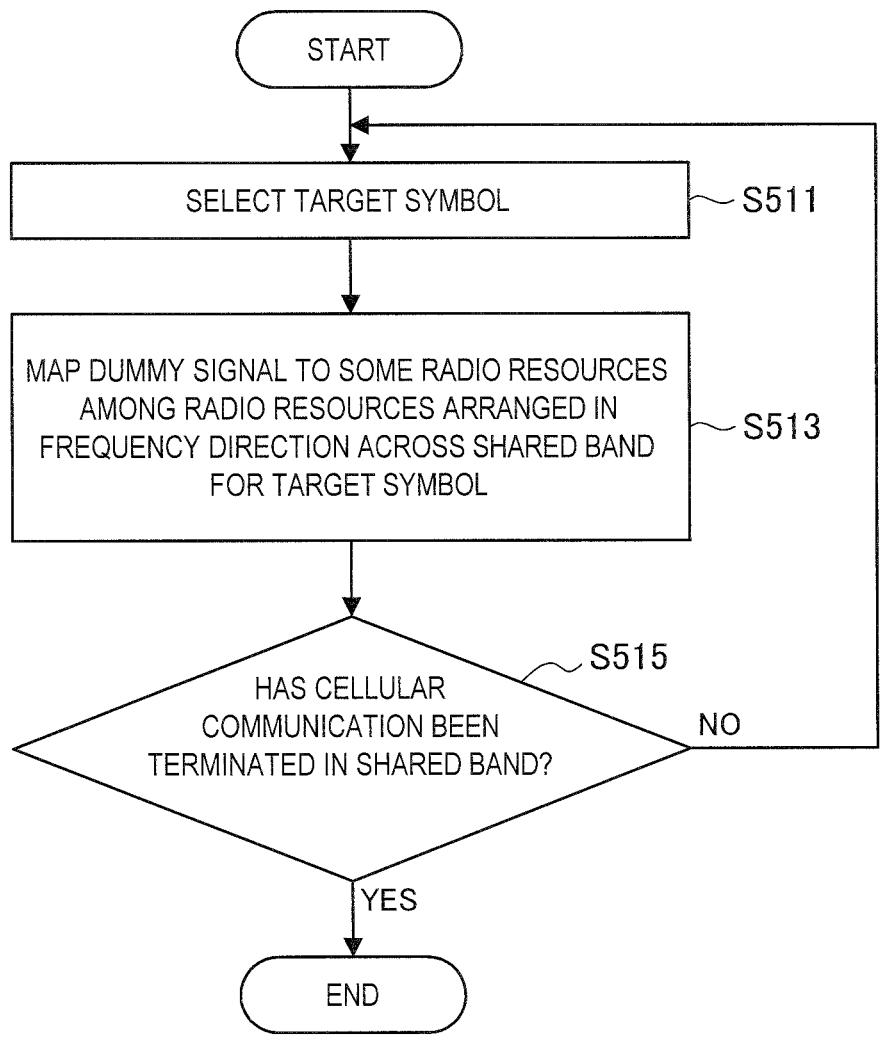
FIG. 28 is a flowchart illustrating an example of a schematic flow of a process by the terminal device according to the third embodiment.

FIG. 28 is a flowchart illustrating an example of a schematic flow of a process by the terminal device 200-3 according to the third embodiment. The process is executed by the terminal device 200-3 according to an instruction by the base station 100-3.

The communication control unit 261 selects a target symbol (S511).

The communication control unit 261 maps a dummy signal to some radio resources among radio resources arranged in the frequency direction across the shared band for the target symbol (S513).

When the cellular communication using the shared band has been terminated (S515: YES), the process ends. Otherwise (S515: NO), the communication control unit 261 selects the next symbol as the target symbol (S511).

5.5. Modified Example (Summary)

In the above-mentioned example of the third embodiment, for example, the base station 100-3 instructs the terminal device 200-3 to transmit a signal using a shared band (for example, in each symbol) at any time for the uplink. Also, for example, the terminal device 200-3 transmits a signal using the shared band (for example, in each symbol) at any time according to an instruction by the base station 100-3.

On the other hand, in the modified example of the third embodiment, the terminal device 200-3 transmits a signal using the shared band at any time (for example, in each symbol) independently without depending upon the instruction by the base station 100-3.

Thereby, for example, while a frequency band shared between cellular communication and other wireless communication (that is, a shared band) is used in wireless communication between the terminal devices (for example, D2D communication or wireless communication within the LN) in the cellular system, the above-mentioned frequency band can be prevented from being used in the above-mentioned other wireless communication.

(Terminal Device 200-3: Communication Control Unit 261)

In the modified example of the third embodiment, the communication control unit 261 controls the terminal device 200-3 so that the terminal device 200-3 transmits a signal using the shared band at any time.

The description of the communication control unit 261 in this regard is the same as the corresponding description for the communication control unit 261 according to the above-mentioned third embodiment, except for differences related to the involvement of a base station and a link direction. Consequently, here, redundant description will be omitted.

Also, in the above-mentioned example of the third embodiment, for example, the communication control unit 261 controls the terminal device 200-3 so that the terminal device 200-3 transmits a signal using the shared band at any time according to an instruction by the base station 100-3. On the other hand, in the modified example of the third embodiment, the communication control unit 261 controls the terminal device 200-3 so that the terminal device 200-3 transmits a signal using the shared band at any time independently (for example, in a period in which the shared band is used in the cellular communication).

Also, in the above-mentioned example of the third embodiment, for example, the communication control unit 261 controls the terminal device 200-3 so that the terminal device 200-3 transmits a signal using the shared band at any time for the uplink. On the other hand, in the modified example of the third embodiment, for example, the communication control unit 261 controls the terminal device 200-3 so that the terminal device 200-3 transmits a signal using a shared band at any time during wireless communication between the terminal devices in the cellular system 1.

(Flow of Process)

An example of the process of the terminal device 200-3 according to the modified example of the third embodiment is the same as the example of the process of the terminal device 200-3 described with reference to FIG. 30. Consequently, here, redundant description will be omitted.

5.6. Combination of Third Embodiment and First Embodiment/Second Embodiment (Combination of Third Embodiment and First Embodiment)

The third embodiment may be combined with the above-mentioned first embodiment. For example, an operation according to the third embodiment may be applied to the above-mentioned first embodiment.

For example, the communication control unit 151 of the base station 100-1 may further perform an operation of the communication control unit 171 of the base station 100-3 and the communication control unit 241 of the terminal device 200-1 may further perform an operation of the communication control unit 261 of the terminal device 200-3.

Specifically, for example, when the cellular communication is performed using the shared band in the first embodiment, a technique according to the third embodiment may be used. Specifically, for example, a signal may be transmitted using the shared band at any time (for example, in each symbol) while the cellular communication is performed using the shared band. Thereby, for example, it is possible to more reliably prevent the shared band from being used in the wireless LAN communication while the shared band is used in the cellular communication. For example, a wireless LAN device which cannot set the NAV is also prevented from using the above-mentioned shared band.

(Combination of Third Embodiment and Second Embodiment>

The third embodiment may be combined with the above-mentioned second embodiment. For example, an operation according to the third embodiment may be applied to the above-mentioned second embodiment.

For example, the communication control unit 251 of the terminal device 200-2 may further perform an operation of the communication control unit 171 of the base station 100-3 and/or an operation of the communication control unit 261 of the terminal device 200-2.

Specifically, for example, when the cellular communication (for example, wireless communication between terminal devices in the cellular system 1) is performed using the shared band in the second embodiment, a technique according to the third embodiment may be used. Specifically, for example, a signal may be transmitted using the shared band at any time (for example, in each symbol) while the cellular communication is performed using the shared band. Thereby, for example, it is possible to more reliably prevent the shared band from being used in the wireless LAN communication while the shared band is used in the cellular communication. For example, a wireless LAN device which cannot set the NAV is also prevented from using the above-mentioned shared band.

6. APPLICATIONS

Technology according to the present disclosure is applicable to various products. For example, the base station 100 may be implemented as a type of eNB such as a macro eNB or a small eNB. The small eNB may be an eNB to cover a cell smaller than a macro cell such as a pico eNB, a micro eNB, or a home (femto) eNB. Conversely, the base station 100 may also be realized as another type of base station, such as a NodeB or a base transceiver station (BTS). The base station 100 may also include a main unit that controls wireless communication (also called a base station device), and one or more remote radio heads (RRHs) placed in a location separate from the main unit. Also, various types of terminals to be described below temporarily or semi-permanently execute a base station function and therefore may operate as the base station 100.

In addition, the terminal device 200 may be realized as, for example, a mobile terminal such as a smartphone, a tablet personal computer (PC), a notebook PC, a portable game console, a portable/dongle-style mobile router, or a digital camera, or as an in-vehicle terminal such as a car navigation device. In addition, the terminal device 200 may also be realized as a terminal that conducts machine-to-machine (M2M) communication (also called a machine-type communication (MTC) terminal). Furthermore, at least a part of constituent elements of the terminal device 200 may be realized as a module mounted onboard these terminals (for example, an integrated circuit module configured on a single die).

6.1. Application Examples Regarding Base Station

First Application Example

Figure 31:
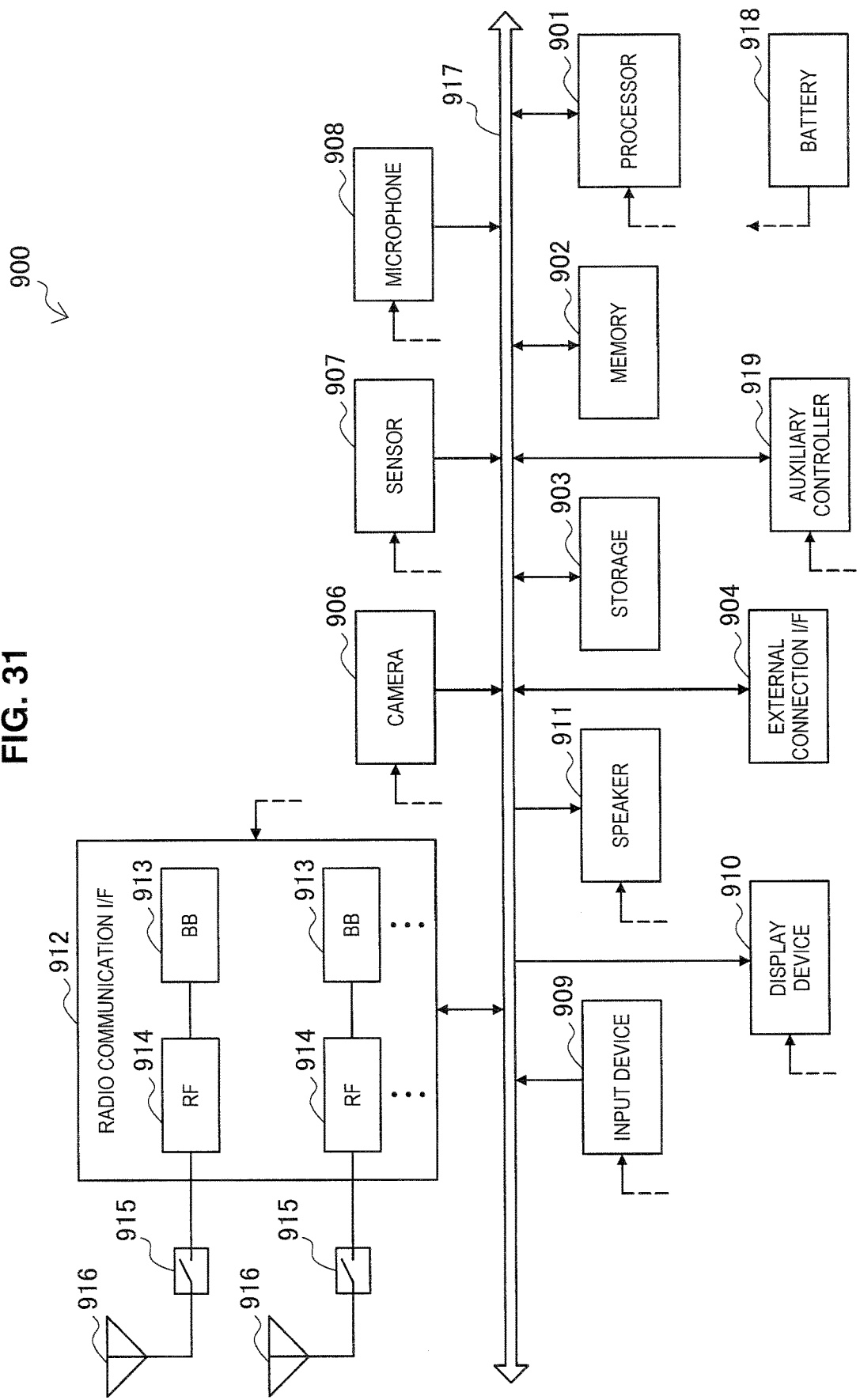
FIG. 31 is a block diagram illustrating an example of a schematic configuration of a smartphone.

FIG. 31 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Figure 29:
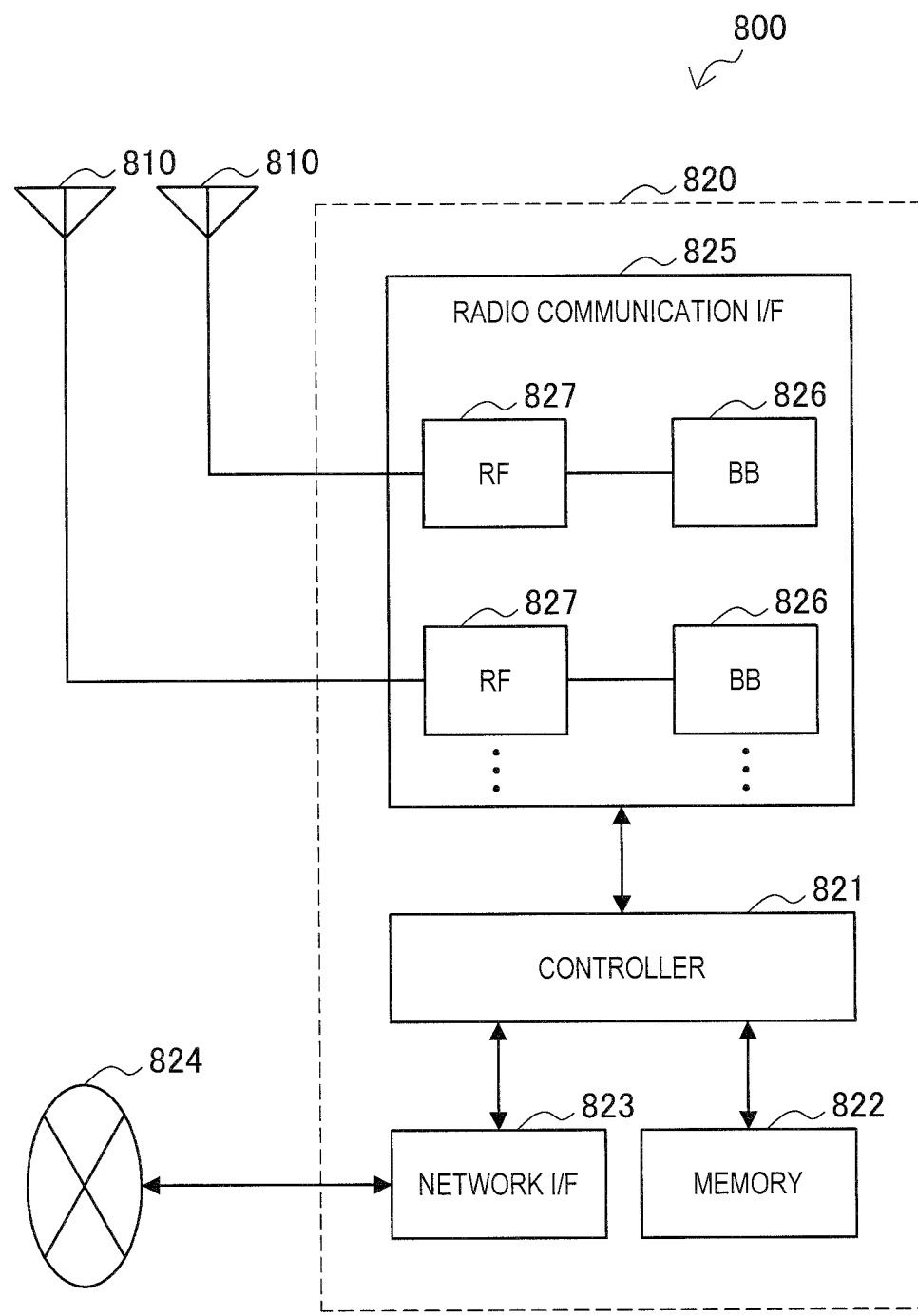
FIG. 29 is a block diagram illustrating a first example of a schematic configuration of an eNB.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 29. For example, the multiple antennas 810 may be compatible with multiple frequency bands used by the eNB 800. Although FIG. 29 illustrates the example in which the eNB 800 includes the multiple antennas 810, the eNB 800 may also include a single antenna 810.

The base station device 820 includes a controller 821, a memory 822, a network interface 823, and a wireless communication interface 825.

The controller 821 may be, for example, a CPU or a DSP, and operates various functions of a higher layer of the base station device 820. For example, the controller 821 generates a data packet from data in signals processed by the wireless communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a wireless communication interface for radio backhaul. If the network interface 823 is a wireless communication interface, the network interface 823 may use a higher frequency band for wireless communication than a frequency band used by the wireless communication interface 825.

The wireless communication interface 825 supports any cellular communication scheme such as LTE and LTE-Advanced, and provides radio connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-mentioned logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The wireless communication interface 825 may include the multiple BB processors 826, as illustrated in FIG. 29. For example, the multiple BB processors 826 may be compatible with multiple frequency bands used by the eNB 800. The wireless communication interface 825 may include the multiple RF circuits 827, as illustrated in FIG. 29. For example, the multiple RF circuits 827 may be compatible with multiple antenna elements. Although FIG. 29 illustrates the example in which the wireless communication interface 825 includes the multiple BB processors 826 and the multiple RF circuits 827, the wireless communication interface 825 may also include a single BB processor 826 or a single RF circuit 827.

Furthermore, in addition to a cellular communication scheme, the wireless communication interface 825 may support a radio LAN communication scheme. In that case, the wireless communication interface 825 may include the BB processor 826 and the RF circuit 827 in the radio LAN communication scheme.

In the eNB 800 illustrated in FIG. 29, the communication control unit 151 described with reference to FIG. 6 may be implemented in the wireless communication interface 825 (for example, the BB processor). Alternatively, at least a part of the communication control unit 151 may be implemented in the controller 821. As one example, the eNB 800 is equipped with a module including a part (for example, the BB processor 826) or all of the wireless communication interface 825 and/or the controller 821, and the communication control unit 151 may be implemented in the module. In this case, the above-mentioned module may store a program for causing the processor to function as the communication control unit 151 (in other words, a program for causing the processor to execute the operation of the communication control unit 151) and execute the program. As another example, a program for causing the processor to function as the communication control unit 151 is installed in the eNB 800, and the wireless communication interface 825 (for example, the BB processor 826) and/or the controller 821 may execute the program. As mentioned above, the eNB 800, the base station device 820, or the above-mentioned module may be provided as the device including the communication control unit 151, and the program for causing the processor to function as the communication control unit 151 may be provided. Also, a readable storage medium storing the above-mentioned program may be provided. With respect to these points, the communication control unit 171 described with reference to FIG. 20 are also similar to the communication control unit 151.

Also, in the eNB 800 illustrated in FIG. 29, the wireless communication unit 120 described with reference to FIG. 6 may be implemented in the wireless communication interface 825 (for example, the RF circuit 827). Also, the antenna unit 110 may be implemented in the antenna 810. Also, the network communication unit 130 may be implemented in the controller 821 and/or the network interface 823.

Second Application Example

Figure 30:
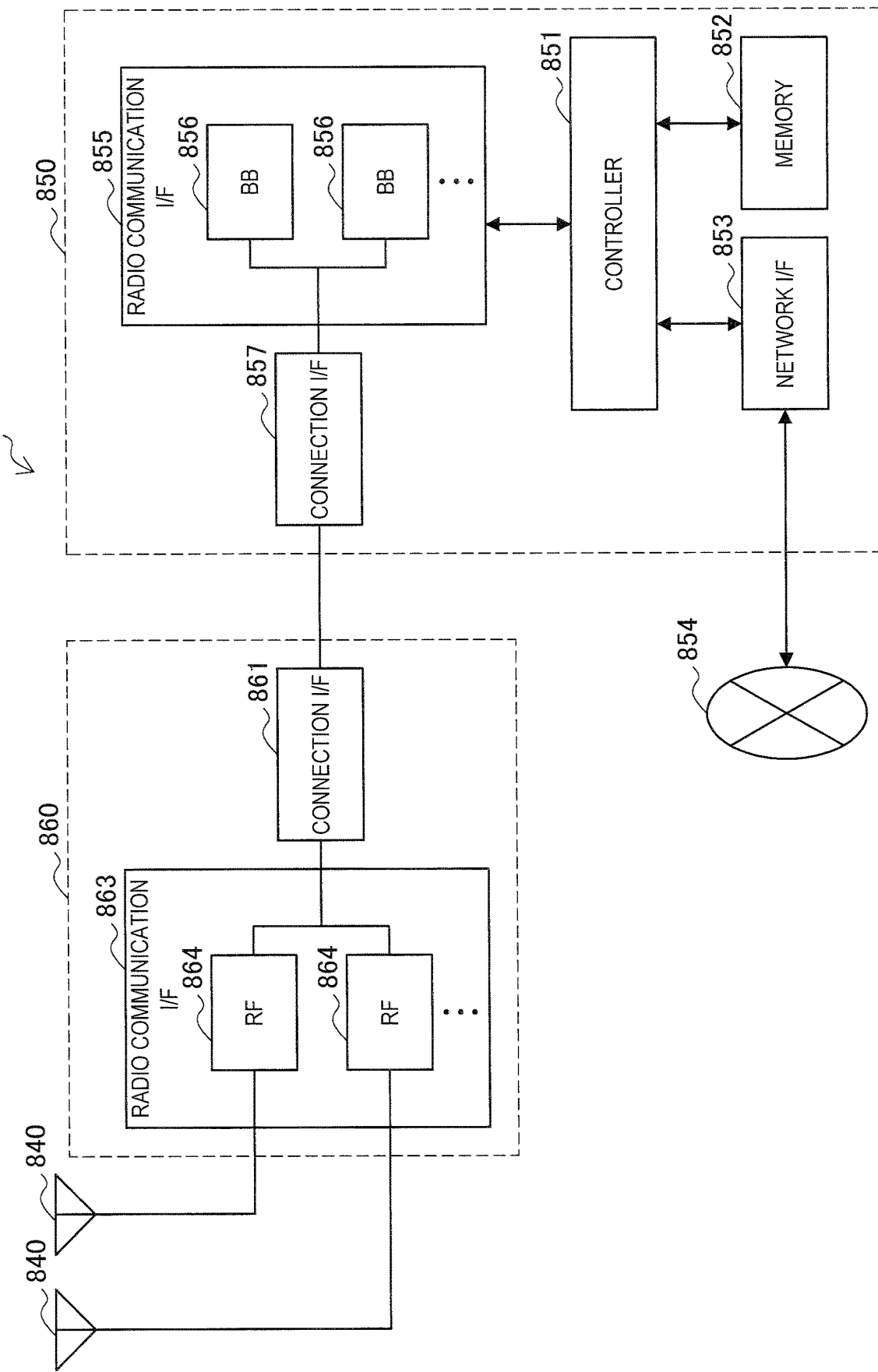
FIG. 30 is a block diagram illustrating a second example of a schematic configuration of an eNB.

FIG. 30 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 30. For example, the multiple antennas 840 may be compatible with multiple frequency bands used by the eNB 830. Although FIG. 30 illustrates the example in which the eNB 830 includes the multiple antennas 840, the eNB 830 may also include a single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 29.

The wireless communication interface 855 supports any cellular communication scheme such as LTE and LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 29, except the BB processor 856 is connected to the RF circuit 864 of the RRH 860 via the connection interface 857. The wireless communication interface 855 may include the multiple BB processors 856, as illustrated in FIG. 30. For example, the multiple BB processors 856 may be compatible with multiple frequency bands used by the eNB 830. Although FIG. 30 illustrates the example in which the wireless communication interface 855 includes the multiple BB processors 856, the wireless communication interface 855 may also include a single BB processor 856.

Furthermore, in addition to a cellular communication scheme, the wireless communication interface 855 may support a radio LAN communication scheme. In that case, the wireless communication interface 825 may include the BB processor 856 in the radio LAN communication scheme.

The connection interface 857 is an interface for connecting the base station device 850 (wireless communication interface 855) to the RRH 860. The connection interface 857 may also be a communication module for communication in the above-mentioned high speed line that connects the base station device 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above-mentioned high speed line.

The wireless communication interface 863 transmits and receives radio signals via the antenna 840. The wireless communication interface 863 may typically include, for example, the RF circuit 864. The RF circuit 864 may include, for example, a mixer, a filter, and an amplifier, and transmits and receives radio signals via the antenna 840. The wireless communication interface 863 may include multiple RF circuits 864, as illustrated in FIG. 30. For example, the multiple RF circuits 864 may support multiple antenna elements. Although FIG. 30 illustrates the example in which the wireless communication interface 863 includes the multiple RF circuits 864, the wireless communication interface 863 may also include a single RF circuit 864.

In the eNB 830 illustrated in FIG. 32, the communication control unit 151 described with reference to FIG. 6 may be implemented in the wireless communication interface 855 (for example, the BB processor). Alternatively, at least a part of the communication control unit 151 may be implemented in the controller 851. As one example, the eNB 830 is equipped with a module including a part (for example, the BB processor 856) or all of the wireless communication interface 855 and/or the controller 851, and the communication control unit 151 may be implemented in the module. In this case, the above-mentioned module may store a program for causing the processor to function as the communication control unit 151 (in other words, a program for causing the processor to execute the operation of the communication control unit 151) and execute the program. As another example, a program for causing the processor to function as the communication control unit 151 is installed in the eNB 830, and the wireless communication interface 855 (for example, the BB processor 856) and/or the controller 851 may execute the program. As mentioned above, the eNB 830, the base station device 850, or the above-mentioned module may be provided as the device including the communication control unit 151, and the program for causing the processor to function as the communication control unit 151 may be provided. Also, a readable storage medium storing the above-mentioned program may be provided. With respect to these points, the communication control unit 171 described with reference to FIG. 20 is also similar to the communication control unit 151.

Also, in the eNB 830 illustrated in FIG. 30, the wireless communication unit 120 described, for example, with reference to FIG. 6 may be implemented in the wireless communication interface 863 (for example, the RF circuit 864). Also, the antenna unit 110 may be implemented in the antenna 840. Also, the network communication unit 130 may be implemented in the controller 851 and/or the network interface 853.

6.2. Application Examples Regarding Terminal Device

First Application Example

FIG. 31 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives radio signals via the antenna 916. The wireless communication interface 912 may also be a one chip module that has the BB processor 913 and the RF circuit 914 integrated thereon. The wireless communication interface 912 may include the multiple BB processors 934 and the multiple RF circuits 914, as illustrated in FIG. 31. Although FIG. 31 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support a radio LAN communication scheme. In that case, the wireless communication interface 912 may include the BB processor 913 and the RF circuit 914 in the radio LAN communication scheme. Furthermore, in addition to a cellular communication scheme, the wireless communication interface 912 may support another type of wireless communication scheme such as a short-distance wireless communication scheme and a near field communication scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna), and is used for the wireless communication interface 912 to transmit and receive radio signals. The smartphone 900 may include the multiple antennas 916, as illustrated in FIG. 31. Although FIG. 31 illustrates the example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 31 via feeder lines, which are partially shown as dashed lines in the figure. The auxiliary controller 919 operates a minimum necessary function of the smartphone 900, for example, in a sleep mode.

In the smartphone 900 illustrated in FIG. 31, the communication control unit 241 described with reference to FIG. 11 may be implemented in the wireless communication interface 912 (for example, the BB processor 913). Alternatively, at least a part of the communication control unit 241 may be implemented in the processor 901 or the auxiliary controller 919. As one example, the smartphone 900 is equipped with a module including a part (for example, the BB processor 913) or all of the wireless communication interface 912, the processor 901 and/or the auxiliary controller 919, and the communication control unit 241 may be implemented in the module. In this case, the above-mentioned module may store a program for causing the processor to function as the communication control unit 241 (in other words, a program for causing the processor to execute the operation of the communication control unit 241) and execute the program. As another example, a program for causing the processor to function as the communication control unit 241 is installed in the smartphone 900, and the wireless communication interface 912 (for example, the BB processor 913), the processor 901, and/or the auxiliary controller 919 may execute the program. As mentioned above, the smartphone 900, the base station device 820, or the above-mentioned module may be provided as the device including the communication control unit 241, and the program for causing the processor to function as the communication control unit 241 may be provided. Also, a readable storage medium storing the above-mentioned program may be provided. With respect to these points, the communication control unit 251 described with reference to FIG. 19 and the communication control unit 261 described with reference to FIG. 26 are also similar to the communication control unit 241.

Also, in the smartphone 900 illustrated in FIG. 31, the wireless communication unit 220 described, for example, with reference to FIG. 11 may be implemented in the wireless communication interface 912 (for example, the RF circuit 914). Also, the antenna unit 210 may be implemented in the antenna 916.

Second Application Example

Figure 32:
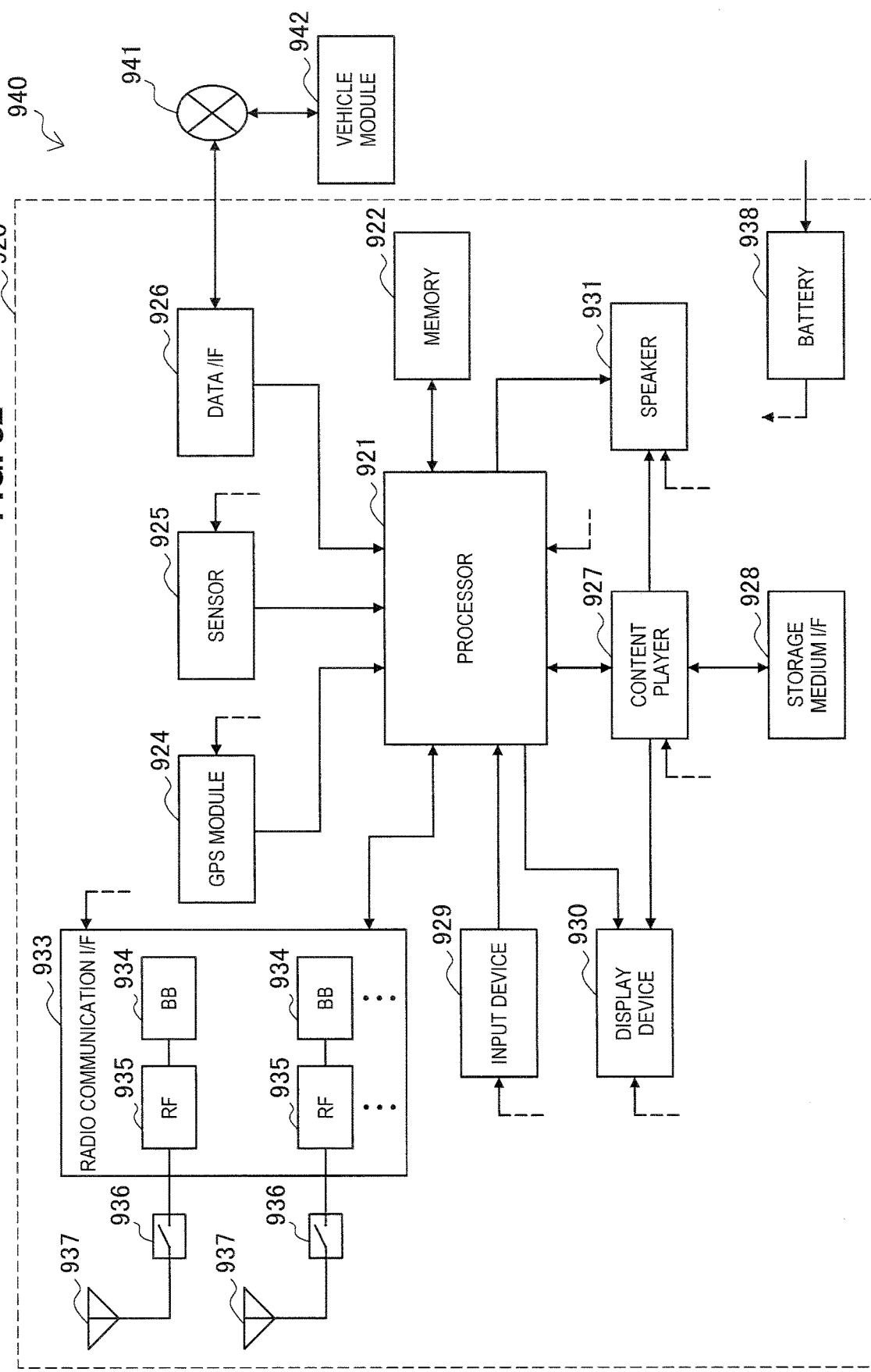
FIG. 32 is a block diagram illustrating an example of a schematic configuration of a car navigation device.

FIG. 32 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports any cellular communication scheme such as LET and LTE-Advanced, and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives radio signals via the antenna 937. The wireless communication interface 933 may be a one chip module having the BB processor 934 and the RF circuit 935 integrated thereon. The wireless communication interface 933 may include the multiple BB processors 934 and the multiple RF circuits 935, as illustrated in FIG. 32. Although FIG. 32 illustrates the example in which the wireless communication interface 933 includes the multiple BB processors 934 and the multiple RF circuits 935, the wireless communication interface 933 may also include a single BB processor 934 or a single RF circuit 935.

Furthermore, in addition to a cellular communication scheme, the wireless communication interface 933 may support a radio LAN communication scheme. In that case, the wireless communication interface 933 may include the BB processor 934 and the RF circuit 935 in the radio LAN communication scheme. Furthermore, in addition to a cellular communication scheme, the wireless communication interface 933 may support another type of wireless communication scheme such as a short-distance wireless communication scheme and a near field communication scheme. In that case, the wireless communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna), and is used for the wireless communication interface 933 to transmit and receive radio signals. The car navigation device 920 may include the multiple antennas 937, as illustrated in FIG. 32. Although FIG. 32 illustrates the example in which the car navigation device 920 includes the multiple antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 32 via feeder lines that are partially shown as dashed lines in the figure. The battery 938 accumulates power supplied form the vehicle.

In the car navigation device 920 illustrated in FIG. 32, the communication control unit 241 described with reference to FIG. 11 may be implemented in the wireless communication interface 933 (for example, the BB processor 934). Alternatively, at least a part of the communication control unit 241 may be implemented in the processor 921. As one example, the car navigation device 920 is equipped with a module including a part (for example, the BB processor 934) or all of the wireless communication interface 933, and/or processor 921, and the communication control unit 241 may be implemented in the module. In this case, the above-mentioned module may store a program for causing the processor to function as the communication control unit 241 (in other words, a program for causing the processor to execute the operation of the communication control unit 241) and execute the program. As another example, a program for causing the processor to function as the communication control unit 241 is installed in the car navigation device 920, and the wireless communication interface 933 (for example, the BB processor 934), and/or the processor 921 may execute the program. As mentioned above, the car navigation device 920, the base station device 820, or the above-mentioned module may be provided as the device including the communication control unit 241, and the program for causing the processor to function as the communication control unit 241 may be provided. Also, a readable storage medium storing the above-mentioned program may be provided. With respect to these points, the communication control unit 251 described with reference to FIG. 19 and the communication control unit 261 described with reference to FIG. 26 are also similar to the communication control unit 241.

Also, in the car navigation device 920 illustrated in FIG. 32, the wireless communication unit 220 described, for example, with reference to FIG. 11 may be implemented in the wireless communication interface 933 (for example, the RF circuit 935). Also, the antenna unit 210 may be implemented in the antenna 937.

The technology of the present disclosure may also be realized as an in-vehicle system (or a vehicle) 940 including one or more blocks of the car navigation device 920, the in-vehicle network 941, and a vehicle module 942. That is, the in-vehicle system (or the vehicle) 940 may be provided as a device including the communication control unit 241 (or the communication control unit 251 or 261). The vehicle module 942 generates vehicle data such as vehicle speed, engine speed, and trouble information, and outputs the generated data to the in-vehicle network 941.

7. CONCLUSION

The devices and the processes according to the embodiments of the present disclosure have been described with reference to FIGS. 1 to 32.

First Embodiment

According to the first embodiment, through control by the base station 100-1, the wireless communication device for performing the cellular communication transmits a frame including duration information for setting an NAV using a frequency band shared between the cellular communication and wireless LAN communication. Through control by the base station 100-1, the cellular communication is performed using the above-mentioned frequency band in a period after the transmission of the above-mentioned frame. Also, the above-mentioned wireless communication device is the base station 100-1 or the terminal device 200-1.

Thereby, for example, while the frequency band shared between the cellular communication and the wireless LAN communication is used in wireless communication between the terminal devices in the cellular system, the above-mentioned frequency band can be prevented from being used in wireless LAN communication.

Second Embodiment

According to the second embodiment, through control by the terminal device 200-2, a wireless communication device for performing cellular communication transmits a frame including duration information for setting an NAV using a frequency band shared between the cellular communication and wireless LAN communication. Through control by the terminal device 200-2, the cellular communication is performed using the above-mentioned shared band in a period after the transmission of the above-mentioned frame. Also, the above-mentioned wireless communication device is the terminal device 200-2 or another terminal device 200-2.

Thereby, for example, while the frequency band shared between the cellular communication and the wireless LAN communication is used in wireless communication between the terminal devices in the cellular system, the above-mentioned frequency band can be prevented from being used in wireless LAN communication.

Third Embodiment

According to the third embodiment, a wireless communication device for performing cellular communication is controlled so that the above-mentioned wireless communication device transmits a signal using a frequency band (that is, shared band) shared between the cellular communication and other wireless communication.

Thereby, for example, a frequency band shared between the cellular communication and the other wireless communication (for example, wireless LAN communication) can be prevented from being used in the above-mentioned other wireless communication while the frequency band is used for the cellular communication.

As described above, according to the embodiment of the present disclosure, for example, it is possible to more appropriately use a frequency band shared between wireless communication of a cellular system and other wireless communication in the above-mentioned cellular system.

The preferred embodiment(s) of the present disclosure has/have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Although an example in which the cellular system is a system conforming to LTE, LTE-Advanced, or a compliant communication scheme has been described, the present disclosure is not limited to such an example. For example, the communication system may be a system conforming to another communication standard.

Also, for example, an example in which other wireless communication different from wireless communication of the cellular system is wireless LAN communication (that is, wireless communication conforming to the wireless LAN standard) has been described, but the present disclosure is not limited to the relevant examples. For example, the above-mentioned other wireless communication may be wireless communication (wireless communication conforming to another communication standard adopting CSMA) other than the wireless LAN communication.

Also, the processing steps in each process in this specification are not strictly limited to execution in a time series following the sequence described in a flowchart or a sequence diagram. For example, the processing steps in each process may be executed in a sequence that differs from a sequence described herein as a flowchart or a sequence diagram, and furthermore may be executed in parallel.

Also, it is possible to create a computer program for causing the processor (for example, a CPU, a DSP, etc.) provided in a device (for example, the base station and/or the terminal device) of the present description to function as the components (for example, the communication control unit) of the above-mentioned device (in other words, a computer program for causing the above-mentioned processor to execute the operation of the components of the above-mentioned device). Also, a storage medium storing the computer program may be provided. Also, a device (for example, a completed product or a module (a component, a processing circuit, a chip, etc.) for a completed product) including a memory that stores the above-mentioned computer program and one or more processors capable of executing the above-mentioned computer program may be provided. Also, a method including the operation of the components of the above-mentioned device (for example, the communication control unit) is included in the technology according to the present disclosure.

In addition, the advantageous effects described in this specification are merely for the sake of explanation or illustration, and are not limiting. In other words, instead of or in addition to the above advantageous effects, technology according to the present disclosure may exhibit other advantageous effects that are clear to persons skilled in the art from the description of this specification.

Additionally, the present technology may also be configured as below.

(1)

A device including:

a control unit configured to control a wireless communication device for performing wireless communication of a cellular system so that the wireless communication device transmits a frame including duration information for setting a network allocation vector (NAV) using a frequency band shared between the wireless communication of the cellular system and wireless communication conforming to a wireless local area network (LAN) standard, wherein the control unit controls a base station of the cellular system so that the wireless communication of the cellular system is performed using the frequency band in a period after the transmission of the frame.

(2)

The device according to (1), wherein the wireless communication device includes the base station.

(3)

The device according to (2), wherein the period is a period which starts at a point in time at which a short inter-frame space (SIFS) has elapsed from an end time-point of the transmission of the frame.

(4)

The device according to (2), wherein the frame is a frame for causing another frame including the duration information for setting the NAV to be transmitted to a specific device for receiving the frame.

(5)

The device according to (4), wherein the frame is a request to send (RTS) frame, and wherein the other frame is a clear to send (CTS) frame.

(6)

The device according to (4) or (5), wherein the period is a period after the transmission of the other frame.

(7)

The device according to (1) or (2), wherein the wireless communication device includes a terminal device for performing wireless communication of the cellular system.

(8)

The device according to (7), wherein the control unit instructs the terminal device to transmit the frame using the frequency band.

(9)

The device according to (8), wherein, the control unit uses another frequency band for the cellular system to instruct the terminal device to transmit the frame using the frequency band.

(10)

The device according to (8) or (9), wherein the control unit provides the terminal device with information which specifies a timing at which the frame is transmitted.

(11)

The device according to any one of (8) to (10), wherein the control unit provides the terminal device with the duration information or information which specifies the duration information.

(12)

The device according to any one of (1) to (11), wherein the duration information indicates a duration which covers at least the period.

(13)

The device according to any one of (1) to (12), wherein the frame is an RTS frame or a CTS frame.

(14)

The device according to any one of (1) to (13), wherein the control unit controls a wireless communication device for performing wireless communication of the cellular system so that the wireless communication device transmits a signal using the frequency band at any time during the period.

(15)

The device according to any one of (1) to (14), wherein the device is the base station, a base station device for the base station, or a module for the base station device.

(16)

A device including:

a control unit configured to control a terminal device for performing wireless communication of a cellular system so that the terminal device transmits a frame including duration information for setting a NAV using a frequency band shared between the wireless communication of the cellular system and wireless communication conforming to a wireless LAN standard according to an instruction from a base station of the cellular system.

(17)

A device including:

a control unit configured to control a wireless communication device for performing wireless communication of a cellular system so that the wireless communication device transmits a frame including duration information for setting a NAV using a frequency band shared between the wireless communication of the cellular system and wireless communication conforming to a wireless LAN standard, wherein the control unit controls a terminal device for performing wireless communication of the cellular system so that the wireless communication of the cellular system is performed using the frequency band in a period after the transmission of the frame.

(18)

The device according to (17), wherein the control unit controls the terminal device so that wireless communication between terminal devices in the cellular system is performed using the frequency band in the period.

(19)

A device including:

a control unit configured to control a wireless communication device for performing wireless communication of a cellular system so that the wireless communication device transmits a signal using a frequency band shared between the wireless communication of the cellular system and other wireless communication at any time.

(20)

The device according to (19), wherein the control unit controls the wireless communication device so that a transmission power of a signal to be transmitted using the frequency band is greater than or equal to a predetermined transmission power at any time.

(21)

The device according to (19) or (20), wherein the control unit controls the wireless communication device so that the wireless communication device transmits the signal using the frequency band in each symbol.

(22)

The device according to (21), wherein the control unit controls the wireless communication device so that the wireless communication device transmits a dummy signal using the frequency band in at least a symbol in which neither a data signal nor a control signal of the cellular system are transmitted using the frequency band.

(23)

The device according to (22), wherein the control unit controls the wireless communication device so that the wireless communication device transmits the dummy signal in some radio resources among radio resources arranged in a frequency direction across the frequency band in at least the symbol.

(24)

The device according to (23), wherein the some radio resources are some resource blocks among resource blocks arranged in the frequency direction across the frequency band.

(25)

The device according to (23), wherein the some radio resources are some resource elements included in each resource block arranged in the frequency direction across the frequency band.

(26)

The device according to any one of (19) to (25), wherein the device is a base station for performing wireless communication of the cellular system, a base station device for the base station, or a module for the base station device, and wherein the control unit instructs a terminal device for performing wireless communication of the cellular system to transmit the signal using the frequency band at any time for an uplink.

(27)

The device according to (26), wherein the control unit instructs each of a plurality of terminal devices for performing wireless communication of the cellular system to transmit the signal using the frequency band at any time for the uplink.

(28)

The device according to (26) or (27), wherein the control unit instructs a plurality of terminal devices to transmit a dummy signal in some radio resources among radio resources arranged in a frequency direction across the frequency band in at least a symbol in which neither a data signal nor a control signal of the cellular system are transmitted using the frequency band for the uplink, and wherein the some radio resources are common among the plurality of terminal devices.

(29)

The device according to any one of (19) to (25), wherein the device is a terminal device for performing wireless communication of the cellular system or a module for the terminal device, and wherein the control unit controls the terminal device so that the terminal device transmits the signal using the frequency band at any time for an uplink.

(30)

The device according to any one of (19) to (25), wherein the device is a base station for performing wireless communication of the cellular system, a base station device for the base station, or a module for the base station device.

(31)

The device according to any one of (19) to (25), wherein the device is a terminal device for performing wireless communication of the cellular system or a module for the terminal device.

(32)

The device according to any one of (1) to (16), (19) to (25), and (30), wherein a duplex operation of the cellular system is frequency division duplex (FDD), and wherein the frequency band is used as a downlink band in the cellular system.

(33)

A method including:

controlling, by a processor, a wireless communication device for performing wireless communication of a cellular system so that the wireless communication device transmits a frame including duration information for setting a network allocation vector (NAV) using a frequency band shared between the wireless communication of the cellular system and wireless communication conforming to a wireless local area network (LAN) standard; and controlling, by a processor, a base station of the cellular system so that the wireless communication of the cellular system is performed using the frequency band in a period after the transmission of the frame.

(34)

A program for causing a processor to execute:

controlling a wireless communication device for performing wireless communication of a cellular system so that the wireless communication device transmits a frame including duration information for setting a network allocation vector (NAV) using a frequency band shared between the wireless communication of the cellular system and wireless communication conforming to a wireless local area network (LAN) standard; and controlling a base station of the cellular system so that the wireless communication of the cellular system is performed using the frequency band in a period after the transmission of the frame.

(35)
A readable recording medium having a program recorded thereon, the program causing a processor to execute:
controlling a wireless communication device for performing wireless communication of a cellular system so that the wireless communication device transmits a frame including duration information for setting a network allocation vector (NAV) using a frequency band shared between the wireless communication of the cellular system and wireless communication conforming to a wireless local area network (LAN) standard; and
controlling a base station of the cellular system so that the wireless communication of the cellular system is performed using the frequency band in a period after the transmission of the frame.

(36)
A method including:
controlling, by a processor, a terminal device for performing wireless communication of a cellular system so that the terminal device transmits a frame including duration information for setting a NAV using a frequency band shared between the wireless communication of the cellular system and wireless communication conforming to a wireless LAN standard according to an instruction from a base station of the cellular system.

(37)
A program for causing a processor to execute:
controlling a terminal device for performing wireless communication of a cellular system so that the terminal device transmits a frame including duration information for setting a NAV using a frequency band shared between the wireless communication of the cellular system and wireless communication conforming to a wireless LAN standard according to an instruction from a base station of the cellular system.

(38)
A readable recording medium having a program recorded thereon, the program causing a processor to execute:
controlling a terminal device for performing wireless communication of a cellular system so that the terminal device transmits a frame including duration information for setting a NAV using a frequency band shared between the wireless communication of the cellular system and wireless communication conforming to a wireless LAN standard according to an instruction from a base station of the cellular system.

(39)
A method including:
controlling, by a processor, a wireless communication device for performing wireless communication of a cellular system so that the wireless communication device transmits a frame including duration information for setting a NAV using a frequency band shared between the wireless communication of the cellular system and wireless communication conforming to a wireless LAN standard; and
controlling, by a processor, a terminal device for performing wireless communication of the cellular system so that the wireless communication of the cellular system is performed using the frequency band in a period after the transmission of the frame.

(40)
A program for causing a processor to execute:
controlling a wireless communication device for performing wireless communication of a cellular system so that the wireless communication device transmits a frame including duration information for setting a NAV using a frequency band shared between the wireless communication of the cellular system and wireless communication conforming to a wireless LAN standard; and
controlling a terminal device for performing wireless communication of the cellular system so that the wireless communication of the cellular system is performed using the frequency band in a period after the transmission of the frame.

(41)
A readable recording medium having a program recorded thereon, the program causing a processor to execute:
controlling a wireless communication device for performing wireless communication of a cellular system so that the wireless communication device transmits a frame including duration information for setting a NAV using a frequency band shared between the wireless communication of the cellular system and wireless communication conforming to a wireless LAN standard; and
controlling a terminal device for performing wireless communication of the cellular system so that the wireless communication of the cellular system is performed using the frequency band in a period after the transmission of the frame.

(42)
A method including:
controlling, by a processor, a wireless communication device for performing wireless communication of a cellular system so that the wireless communication device transmits a signal using a frequency band shared between the wireless communication of the cellular system and other wireless communication at any time.

(43)
A program for causing a processor to execute:
controlling a wireless communication device for performing wireless communication of a cellular system so that the wireless communication device transmits a signal using a frequency band shared between the wireless communication of the cellular system and other wireless communication at any time.

(44)
A readable recording medium having a program recorded thereon, the program causing a processor to execute:
controlling a wireless communication device for performing wireless communication of a cellular system so that the wireless communication device transmits a signal using a frequency band shared between the wireless communication of the cellular system and other wireless communication at any time.

REFERENCE SIGNS LIST

1 cellular system
10 cell
30 access point
40 communication area
50 terminal device
71 shared band
100 base station
151, 171 communication control unit
200 terminal device
241, 251, 261 communication control unit

The invention claimed is:
1. A device comprising:
circuitry configured to
determine a period in which wireless communication of a cellular system is performed using a frequency band shared between a primary component carrier of the wireless communication of the cellular system and a plurality of secondary component carriers of wireless communication conforming to a wireless local area network (LAN) standard;

control a wireless communication device for performing the wireless communication of the cellular system so that the wireless communication device transmits, using the frequency band, a frame including duration information for setting a network allocation vector (NAV), the duration information indicating the determined period;

control a base station of the cellular system so that the wireless communication of the cellular system is performed using the frequency band in the determined period, the determined period being after the transmission of the frame; and control the base station to transmit a dummy signal using the frequency band shared between the primary component carrier and the plurality of secondary component carriers, the dummy signal including neither a data signal nor a control signal, wherein a feature of the dummy signal includes at least one of (1) the dummy signal being transmitted after performing carrier sense, or (2) the dummy signal being a busy tone for a device that performs wireless LAN communication.

2. The device according to claim 1, wherein the wireless communication device includes the base station.

3. The device according to claim 2, wherein the period is a period which starts at a point in time at which a short inter-frame space (SIFS) has elapsed from an end time-point of the transmission of the frame.

4. The device according to claim 2, wherein the frame is a frame for causing another frame including the duration information for setting the NAV to be transmitted to a specific device for receiving the frame.

5. The device according to claim 4,
wherein the frame is a request to send (RTS) frame, and
wherein the other frame is a clear to send (CTS) frame.

6. The device according to claim 4, wherein the period is a period after the transmission of the other frame.

7. The device according to claim 1, wherein the wireless communication device includes a terminal device for performing wireless communication of the cellular system.

8. The device according to claim 7, wherein the circuitry instructs the terminal device to transmit the frame using the frequency band.

9. The device according to claim 8, wherein, the circuitry uses another frequency band for the cellular system to instruct the terminal device to transmit the frame using the frequency band.

10. The device according to claim 8, wherein the circuitry provides the terminal device with information which specifies a timing at which the frame is transmitted.

11. The device according to claim 8, wherein the circuitry provides the terminal device with the duration information or information which specifies the duration information.

12. The device according to claim 1, wherein the frame is an RTS frame or a CTS frame.

13. The device according to claim 1, wherein the circuitry controls a wireless communication device for performing wireless communication of the cellular system so that the wireless communication device transmits a signal using the frequency band at any time during the period.

14. The device according to claim 1, wherein the device is the base station, a base station device for the base station, or a module for the base station device.

15. A device comprising:
circuitry configured to
determine a period in which wireless communication of a cellular system is performed using a frequency band shared between a primary component carrier of the wireless communication of the cellular system and a plurality of secondary component carriers of wireless communication conforming to a wireless local area network (LAN) standard;

control a terminal device for performing the wireless communication of the cellular system so that the terminal device transmits, using the frequency band, a frame including duration information for setting a network allocation vector (NAV) according to an instruction from a base station of the cellular system, the duration information indicating the determined period; and control the base station to transmit a dummy signal using the frequency band shared between the primary component carrier and the plurality of secondary component carriers, the dummy signal including neither a data signal nor a control signal, wherein a feature of the dummy signal includes at least one of (1) the dummy signal being transmitted after performing carrier sense, or (2) the dummy signal being a busy tone for a device that performs wireless LAN communication.

16. A device comprising:
circuitry configured to
determine a period in which wireless communication of a cellular system is performed using a frequency band shared between a primary component carrier of the wireless communication of the cellular system and a plurality of secondary component carriers of wireless communication conforming to a wireless local area network (LAN) standard;

control a wireless communication device for performing the wireless communication of the cellular system so that the wireless communication device transmits, using the frequency band, a frame including duration information for setting a network allocation vector (NAV), the duration information indicating the determined period;

control a terminal device for performing the wireless communication of the cellular system so that the wireless communication of the cellular system is performed using the frequency band in the determined period, the determined period being after the transmission of the frame; and control a base station to transmit a dummy signal using the frequency band shared between the primary component carrier and the plurality of secondary component carriers, the dummy signal including neither a data signal nor a control signal, wherein a feature of the dummy signal includes at least one of (1) the dummy signal being transmitted after performing carrier sense, or (2) the dummy signal being a busy tone for a device that performs wireless LAN communication.

17. The device according to claim 1,
wherein a duplex operation of the cellular system is frequency division duplex (FDD), and
wherein the frequency band is used as a downlink band in the cellular system.

18. The device according to claim 1, wherein the circuitry is further configured to map the dummy signal to one or more resource elements (REs) within the frequency band shared between the primary component carrier and the plurality of secondary component carriers in at least a symbol in which a data signal and a control signal are not transmitted.

* * * * *